US009932907B2

(12) United States Patent
Tiwari et al.

(10) Patent No.: US 9,932,907 B2
(45) Date of Patent: Apr. 3, 2018

(54) METHODS AND SYSTEMS FOR ENHANCING CONTROL OF POWER PLANT GENERATING UNITS

(71) Applicant: General Electric Company, Schenectady, NY (US)

(72) Inventors: Awadesh Kumar Tiwari, Bangalore (IN); Mahesh Kumar Asati, Banglore (IN)

(73) Assignee: General Electric Company, Schenectady, NY (US)

( * ) Notice: Subject to any disclaimer, the term of this patent is extended or adjusted under 35 U.S.C. 154(b) by 456 days.

(21) Appl. No.: 14/636,802

(22) Filed: Mar. 3, 2015

(65) Prior Publication Data

US 2016/0258363 A1 Sep. 8, 2016

(51) Int. Cl.
*F02C 9/42* (2006.01)
*G05B 13/02* (2006.01)
*F02C 6/18* (2006.01)

(52) U.S. Cl.
CPC .............. *F02C 9/42* (2013.01); *F02C 6/18* (2013.01); *G05B 13/026* (2013.01); *Y02E 20/16* (2013.01)

(58) Field of Classification Search
CPC ...... F02C 9/00; F02C 9/26; F02C 9/28; F02C 9/42; F02C 6/18; F01K 23/10;
(Continued)

(56) References Cited

U.S. PATENT DOCUMENTS 4,117,670 A * 10/1978 Dombkowsi ............. F02C 9/28
307/651
4,227,093 A * 10/1980 Uram ...................... F01D 19/00
290/40 R
(Continued)

OTHER PUBLICATIONS

Piche et al., "Nonlinear Model Predictive Control Using Neural Networks", IEEE Control Systems Magazine, vol. No. 20, Issue No. 02, pp. 53-62, Jun. 2000.
(Continued)

*Primary Examiner* — Phutthiwat Wongwian
*Assistant Examiner* — Loren Edwards
(74) *Attorney, Agent, or Firm* — Mark E. Henderson; Ernest G. Cusick; Frank A. Landgraff

(57) ABSTRACT

A combined cycle power plant system that includes: a gas turbine operably connected to a heat recovery steam generator; a first controller for optimizing a shutdown operation defined between an initiating shutdown command and a terminating event, wherein the first is controller configured to execute the steps of: receiving the shutdown initiating command; receiving operating parameters measured by sensors for each of a first component and a second component of the combined cycle power plant, and, based thereupon, determining a current state for each of the first and the second component; based on the current state, deriving an optimized shutdown operating mode for transitioning the first component and the second component from the current state to a shutdown state. A second controller may be configured to: transform the optimized shutdown operating mode into commands configured to actuate mechanical control devices of the first component and the second component so that the shutdown operation proceeds according to the optimized shutdown operating mode.

9 Claims, 29 Drawing Sheets

(58) Field of Classification Search
 CPC ....... G05B 13/026; Y02E 20/16; F01D 21/00;
 F01D 21/04; F01D 21/06; F05D 2270/00;
 F05D 2270/11; F05D 2270/20
 USPC ...................................................... 60/39.281
 See application file for complete search history.

(56) References Cited

U.S. PATENT DOCUMENTS

| | | | |
|---|---|---|---|
| 4,638,630 A * | 1/1987 | Martens | F01D 21/12 |
| | | | 60/39.182 |
| 6,164,057 A | 12/2000 | Rowen et al. | |
| 6,167,547 A | 12/2000 | Senechal et al. | |
| 6,278,899 B1 | 8/2001 | Piche et al. | |
| 6,304,539 B1 | 10/2001 | Okamoto | |
| 6,335,913 B1 | 1/2002 | Okamoto | |
| 6,529,849 B2 * | 3/2003 | Umezawa | G05B 23/024 |
| | | | 60/39.182 |
| 7,058,552 B2 | 6/2006 | Stothert et al. | |
| 7,356,383 B2 | 4/2008 | Pechtl et al. | |
| 7,474,080 B2 | 1/2009 | Huff et al. | |
| 7,805,207 B2 | 9/2010 | El Rifai | |
| 7,974,826 B2 | 7/2011 | Davari et al. | |
| 8,080,887 B2 | 12/2011 | Radl | |
| 8,126,629 B2 | 2/2012 | Buchalter et al. | |
| 8,135,568 B2 | 3/2012 | Pandey et al. | |
| 8,156,251 B1 | 4/2012 | Sorenson et al. | |
| 8,352,148 B2 | 1/2013 | D'Amato et al. | |
| 8,381,507 B2 * | 2/2013 | Hannula | F01D 21/06 |
| | | | 60/39.281 |
| 8,396,608 B2 | 3/2013 | Subbloie | |
| 8,504,407 B2 | 8/2013 | Sacks et al. | |
| 8,538,593 B2 | 9/2013 | Sun et al. | |
| 8,620,482 B2 | 12/2013 | Muller | |
| 8,639,480 B2 | 1/2014 | Arnold et al. | |
| 8,797,199 B1 | 8/2014 | Goodnow | |
| 8,798,801 B2 | 8/2014 | Subbloie | |
| 8,816,531 B2 | 8/2014 | Krok et al. | |
| 2004/0257858 A1 | 12/2004 | Mansingh et al. | |
| 2010/0292813 A1 | 11/2010 | Boiko et al. | |
| 2012/0010758 A1 | 1/2012 | Francino et al. | |
| 2013/0197676 A1 | 8/2013 | Salsbury et al. | |
| 2013/0282195 A1 | 10/2013 | O'Connor et al. | |
| 2014/0150438 A1 | 6/2014 | Ellis et al. | |

OTHER PUBLICATIONS

European Search Report and Opinion issued in connection with corresponding EP Application No. 16158498.2 dated Jul. 11, 2016.

* cited by examiner

METHODS AND SYSTEMS FOR ENHANCING CONTROL OF POWER PLANT GENERATING UNITS

BACKGROUND OF THE INVENTION

The invention of the present application relates generally to power generation and, more particularly, to methods and systems related to the economic and performance optimization and/or enhancement of power plants having thermal generating units.

In electric power systems, a number of participants or power plants generate electricity that is then distributed over common transmission lines to residential and commercial customers. As will be appreciated, thermal generating units, such as gas turbines, steam turbines, and combined-cycle plants, are still relied on to generate a significant portion of the power such systems require. Each of the power plants within such systems include one or more power generating units, and each of these units typically includes a control system that controls operation, and, in case of power plants having more than one generating unit, the performance of the power plant as a whole. As an example, one of the responsibilities of a plant operator is the generation of an offer curve representing the cost of power production. An offer curve typically includes an incremental variable cost curve, an average variable cost curve, or another suitable indication of variable power generating expense, which typically is expressed in dollars per megawatt-hour versus output in megawatts. It will be appreciated that an average variable cost curve may represent a cumulative cost divided by a cumulative power output for a given point, and an incremental variable cost curve may represent a change in cost divided by a change in power output. An incremental variable cost curve may be obtained, for example, by taking a first derivative of an input-output curve of the power plant that represents cost per hour versus power generated. In a combined-cycle power plant in which waste heat from a fuel burning generator is used to produce steam to power a supplemental steam turbine, an incremental variable cost curve may also be obtained with known techniques, but its derivation may be more complex.

In most power systems, a competitive process commonly referred to as economic dispatch is used to divide system load among power plants over a future time period. As part of this process, power plants periodically generate offer curves and send the offer curves to a power system authority or dispatcher. Such offer curves represent bids from the power plants to generate a portion of the electricity required by the power system over a future market period. The dispatch authority receives the offer curves from the power plants within its system and evaluates them to determine the level at which to engage each power plant so to most efficiently satisfy the predicted load requirements of the system. In doing this, the dispatch authority analyzes the offer curves and, with the objective of finding the lowest generating cost for the system, produces a commitment schedule that describes the extent to which each of the power plants will be engaged over the relevant time period.

Once the commitment schedule is communicated to the power plants, each power plant may determine the most efficient and cost-effective manner by which to satisfy its load commitment. It will be appreciated that the generating units of the power plant include control systems that monitor and control operation. When the generating units include thermal generators, such control systems govern the combustion systems and other aspects of the operation. (For illustrative purposes, both a gas turbine and combined-cycle power plants are described herein; however, it will be appreciated that certain embodiments of the present invention may be applied to other types of power generating units or be used in conjunction there with.) The control system may execute scheduling algorithms that adjust the fuel flow, inlet guide vanes, and other control inputs to ensure efficient operation of the engine. However, the actual output and efficiency of a power plant is impacted by external factors, such as variable ambient conditions, that cannot be fully anticipated. As will be appreciated, the complexity of such systems and the variability of operating conditions make it difficult to predict and control performance, which often result in inefficient operation.

Machine degradation that occurs over time is another difficult to quantify fact, which may have a significant effect on the performance of the generating units. It will be appreciated that rate of degradation, replacement of worn components, timing of maintenance routines, and other factors impact the short term performance of the plant, and thus need to be accounted for when generating cost curves during the dispatching process as well as when assessing the long term cost-effectiveness of the plant. As an example, gas turbine life typically includes limits expressed in both hours of operation and number of starts. If a gas turbine or a component thereof reaches its starts limit before its hours limit, it must be repaired or replaced, even if it has hours-based life remaining Hours-based life in a gas turbine may be prolonged by reducing firing temperature, but this reduces efficiency of the gas turbine, which increases cost of operation. Conversely, increasing the firing temperature increases efficiency, but shortens gas turbine life and increases maintenance and/or replacement costs. As will be appreciated, life cycle cost of a thermal engine is dependent on many complex factors, while also representing a significant consideration in the economic efficiency of the power plant.

Given the complexity of modern power plants, particularly those having multiple generating units, and the market within which it competes, power plant operators continued to struggle to maximize economic return. For example, grid compliance and dispatch planning for a power plant is adversely impacted by controlling thermal generating units in an overly-static manner, i.e., using static control profiles, such as heat rate curves gathered derived from only periodic performance tests. Between these periodic updates, turbine engine performance may change (e.g., from degradation), which may affect start-up and load performance. Moreover, intraday changes in the external factors, without accounting for the same in the turbine control profiles, may lead to inefficient operation. To compensate for this type of variability, power plant operators often become overly conservative in planning for future operation, which results in underutilized generating units. Other times, plant operators are forced to operate units inefficiently to satisfy over-commitments.

Without identifying the short-term inefficiencies and/or long-term deterioration as each is realized, the conventional control systems of power plants either have to be retuned frequently, which is an expensive process, or conservatively operated so to preemptively accommodate component deterioration. The alternative is to risk violating operational boundaries that leads to excessive fatigue or failure. Similarly, conventional power plant control systems lack the ability to most cost-effectively accommodate changing conditions. As will be appreciated, this results in power plant utilization that is often far from optimal. As such, there exists a need for improved methods and systems for monitoring, modeling, and controlling power plant operation, particularly those that enable a more complete understanding of the myriad operating modes available to operators of complex modern power plants and the economic trade-offs associated with each.

BRIEF DESCRIPTION OF THE INVENTION

The present application thus describes a combined cycle power plant system that may include: a gas turbine operably connected to a heat recovery steam generator; a first controller for optimizing a shutdown operation defined between an initiating shutdown command and a terminating event, wherein the first is controller configured to execute the steps of: receiving the shutdown initiating command; receiving operating parameters measured by sensors for each of a first component and a second component of the combined cycle power plant, and, based thereupon, determining a current state for each of the first and the second component; based on the current state, deriving an optimized shutdown operating mode for transitioning the first component and the second component from the current state to a shutdown state. The system may further include a second controller configured to: transform the optimized shutdown operating mode into commands configured to actuate mechanical control devices of the first component and the second component so that the shutdown operation proceeds according to the optimized shutdown operating mode.

These and other features of the present application will become more apparent upon review of the following detailed description of the preferred embodiments when taken in conjunction with the drawings and the appended claims.

DETAILED DESCRIPTION OF THE INVENTION

Example embodiments of the invention will be described more fully hereinafter with reference to the accompanying drawings, in which some, but not all embodiments are shown. Indeed, the invention may be embodied in many different forms and should not be construed as limited to the embodiments set forth herein; rather, these embodiments are provided so that this disclosure will satisfy applicable legal requirements. Like numbers may refer to like elements throughout.

According to aspects of the present invention, systems and methods are disclosed which may be used to optimize the performance of power systems, power plants, and/or thermal power generating units. In exemplary embodiments, this optimization includes an economic optimization by which an operator of a power plant decides between alternative modes of operation so to enhance profitability. Embodiments may be utilized within a particular power system so to provide a competitive edge in procuring advantageous economic commitment terms during the dispatch process. An adviser function may allow operators to make choices between operating modes based on accurate economic comparisons and projections. As another feature, the process of prospectively purchasing fuel for future generating periods may be improved so that fuel inventory is minimized, while not increasing the risk of a shortfall. Other configurations of the present invention, as described below, provide computer-implemented methods and apparatus for modeling power systems, and power plants having multiple thermal generating units. Technical effects of some configurations of the present invention include the generation and solution of energy system models that predict performance under varying physical, operational, and/or economic conditions. Exemplary embodiments of the present invention combine a power plant model that predicts performance under varying ambient and operational conditions with an economic model that includes economic constraints, objectives, and market conditions so to optimize profitability. In doing this, the optimization system of the present invention may predict optimized setpoints that maximize profitability for particular combinations of ambient, operational, contractual, regulatory, legal, and/or economic and market conditions.

Figure 1:
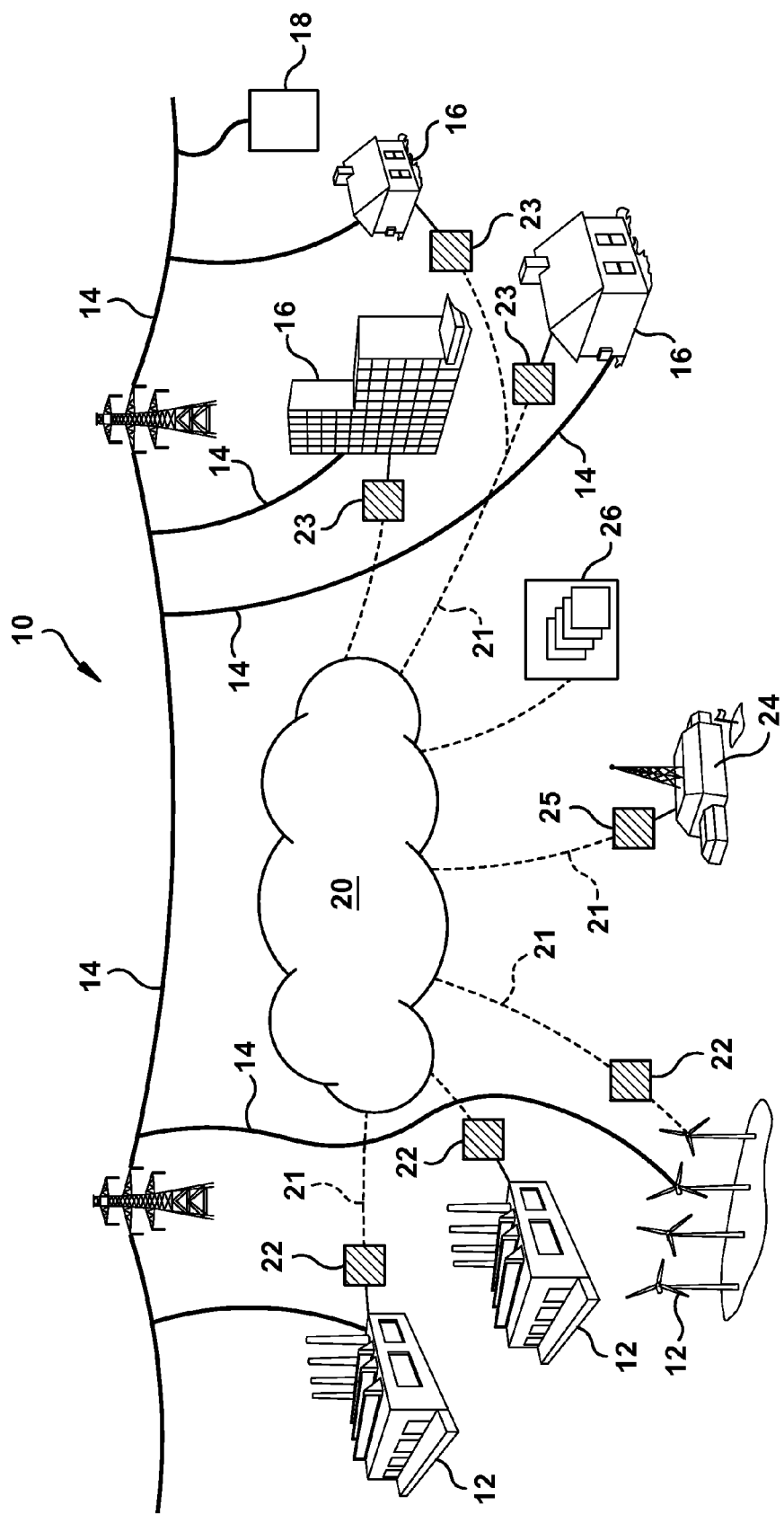
FIG. 1 shows a schematic diagram of a power system according to aspects of the present invention.

FIG. 1 illustrates a schematic representation of a power system 10 that includes aspects of the present invention as well as an exemplary environment in which embodiments may operate. Power system 10 may include power generators or plants 12, such as, for example, the illustrated wind and thermal power plants. It will be appreciated that thermal power plants may include generating units such as gas turbines, coal-fired steam turbines, and/or combined-cycle plants. In addition, power system 10 may include other types of power plants (not shown), such as solar power installations, hydroelectric, geothermal, nuclear, and/or any other suitable power sources now known or discovered hereafter. Transmission lines 14 may connect the various power plants 12 to customers or loads 16 of power system 10. It should be understood that transmission lines 14 represent a grid or distribution network for the power system and may include multiple sections and/or substations as may be desired or appropriate. The power generated from power plants 12 may be delivered via transmission lines 14 to loads 16, which, for example, may include municipalities, residential, or commercial customers. Power system 10 may also include storage devices 18 that are connected to transmission lines 14 so to store energy during periods of excess generation.

Power system 10 also includes control systems or controllers 22, 23, 25 that manage or control the operation of several of the components contained therein. For example, a plant controller 22 may control the operation of each of the power plants 12. Load controllers 23 may control the operation of the different loads 16 that are part of the power system 10. For example, a load controller 23 may manage the manner or timing of a customer's power purchase. A dispatch authority 24 may manage certain aspects of the operation of power system 10, and may include a power system controller 25 that controls the economic dispatch procedure by which load commitments are distributed among participating power plants. Controllers 22, 23, 25, which are represented by rectangular blocks, may be connected via communications lines or connections 21 to a communications network 20 over which data is exchanged. The connections 21 may be wired or wireless. It will be appreciated that communications network 20 may be connected to or part of a larger communications system or network, such as the internet or a private computer network. In addition, the controllers 22, 23, 25 may receive information, data, and instructions from and/or send information, data, and instructions to data libraries and resources, which may be referred to herein generally as "data resources 26", through communications network 20, or, alternatively, may store or house one or more such data repositories locally. Data resources 26 may include several types of data, including but not limited to: market data, operating data, and ambient data. Market data includes information on market conditions, such as energy sales price, fuel costs, labor costs, regulations, etc. Operating data includes information relating to the operating conditions of the power plant or its generating units, such as temperature or pressure measurements within the power plant, air flow rates, fuel flow rates, etc. Ambient data includes information related to ambient conditions at the plant, such as ambient air temperature, humidity, and/or pressure. Market, operating, and ambient data each may include historical records, present condition data, and/or data relating to forecasts. For example, data resources 26 may include present and forecast meteorological/climate information, present and forecast market conditions, usage and performance history records about the operation of the power plant, and/or measured parameters regarding the operation of other power plants having similar components and/or configurations, as well as other data as may be appropriate and/or desired. In operation, for example, power system controller 25 of dispatch authority 24 may receive data from and issue instructions to the other controllers 22, 23 within power system 10. Each of the plant and the load controllers then controls the system component for which it is responsible and relays information about it to and receive instruction from power system controller 25.

Figure 2:
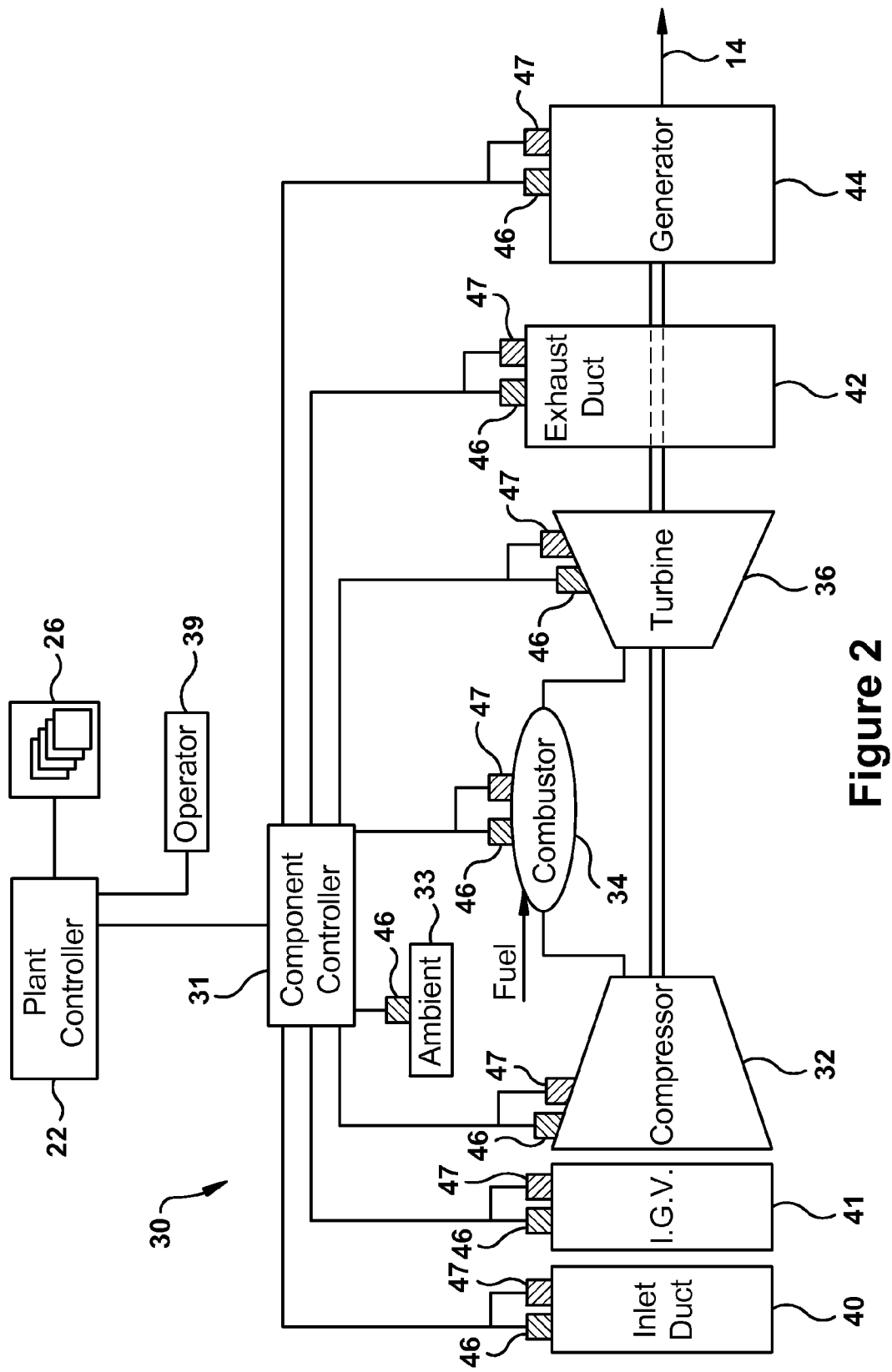
FIG. 2 illustrates a schematic diagram of an exemplary thermal generating unit as may be employed within power plants according to embodiments of the present invention.

FIG. 2 is a schematic diagram of an exemplary thermal generating unit, a gas turbine system 30, that may be used within a power plant according to the present invention. As illustrated, gas turbine system 30 includes a compressor 32, a combustor 34, and a turbine 36 that is drivingly coupled to the compressor 32, as well as a component controller 31. The component controller 31 may connect to the plant controller 22, which may connect to an user input device for receiving communications from an operator 39. Alternatively, it will be appreciated that the component controller 31 and the plant controller 22 may be combined into a single controller. An inlet duct 40 channels ambient air to the compressor 32. As discussed in FIG. 3, injected water and/or other humidifying agent may be channeled to the compressor through inlet duct 40. Inlet duct 40 may have filters, screens and sound absorbing devices that contribute to a pressure loss of ambient air flowing through inlet duct 40 into inlet guide vanes 41 of compressor 32. An exhaust duct 42 channels combustion gases from an outlet of turbine 36 through, for example, emission control and sound absorbing devices. The sound adsorbing materials and emission control devices may apply a backpressure to the turbine 36. The turbine 36 may drive a generator 44 that produces electrical power, which then may be distributed through power system 10 via transmission lines 14.

The operation of the gas turbine system 30 may be monitored by several sensors 46 that detect various operating conditions or parameters throughout it, including, for example, conditions within the compressor 32, combustor 34, turbine 36, generator 44, and ambient environment 33. For example, temperature sensors 46 may monitor ambient temperatures, compressor discharge temperature, turbine exhaust temperature, and other temperatures within the flow path of the gas turbine system 30. Likewise, the pressure sensors 46 may monitor ambient pressure, static and dynamic pressure levels at the compressor inlet, compressor outlet, turbine exhaust, and that other suitable locations within the gas turbine system. Humidity sensors 46, such as wet and dry bulb thermometers, may measure ambient humidity in the inlet duct of the compressor. Sensors 46 may also include flow sensors, speed sensors, flame detector sensors, valve position sensors, guide vane angle sensors and other sensors that are typically used to measure various operating parameters and conditions relative to the operation of the gas turbine system 30. As used herein, the term "parameter" refers to measurable physical properties of operation which may be used to define the operating conditions within a system, such as gas turbine system 30 or other generating system described herein. Operating parameters may include temperature, pressure, humidity and gas flow characteristics at locations defined along the path of the working fluid, as well as ambient conditions, fuel characteristics, and other measurables as may be suitable without limit. It will be appreciated that control system 31 also includes several actuators 47 by which it mechanically controls the operation of the gas turbine system 30. Actuators 47 may include electro-mechanical devices having variable setpoints or settings that allow the manipulation of certain process inputs (i.e., manipulated variables) for the control of process outputs (i.e., controlled variables) in accordance with a desired result or mode of operation. For example, commands generated by the component controller 31 may cause one or more actuators 47 within the turbine system 30 to adjust valves between the fuel supply and combustor 34 that regulate the flow level, fuel splits, and/or type of fuel being combustor. As another example, commands generated by control system 31 may cause one or more actuators to adjust an inlet guide vane setting that alters their angle of orientation.

The component controller 31 may be a computer system having a processor that executes program code to control the operation of the gas turbine system 30 using sensor measurements and instructions from user or plant operator (hereinafter "operator 39"). As discussed in more detail below, software executed by the controller 31 may include scheduling algorithms for regulating any of the subsystems described herein. The component controller 31 may regulate gas turbine system 30 based, in part, on algorithms stored in its digital memory. These algorithms, for example, may enable the component controller 31 to maintain the NOx and CO emissions in the turbine exhaust to within certain predefined emission limits, or, in another instance, maintain the combustor firing temperature to within predefined limits. It will be appreciated that algorithms may include inputs for parameter variables such as compressor pressure ratio, ambient humidity, inlet pressure loss, turbine exhaust backpressure, as well as any other suitable parameters. The schedules and algorithms executed by the component controller 31 accommodate variations in ambient conditions that affect emissions, combustor dynamics, firing temperature limits at full and part-load operating conditions, etc. As discussed in more detail below, the component controller 31 may apply algorithms for scheduling the gas turbine, such as those setting desired turbine exhaust temperatures and combustor fuel splits, with the objective of satisfying performance objectives while complying with operability boundaries of the gas turbine system. For example, the component controller 31 may determine combustor temperature rise and NOx during part-load operation in order to increase the operating margin to the combustion dynamics boundary and thereby improve operability, reliability, and availability of the generating unit.

Figure 3:
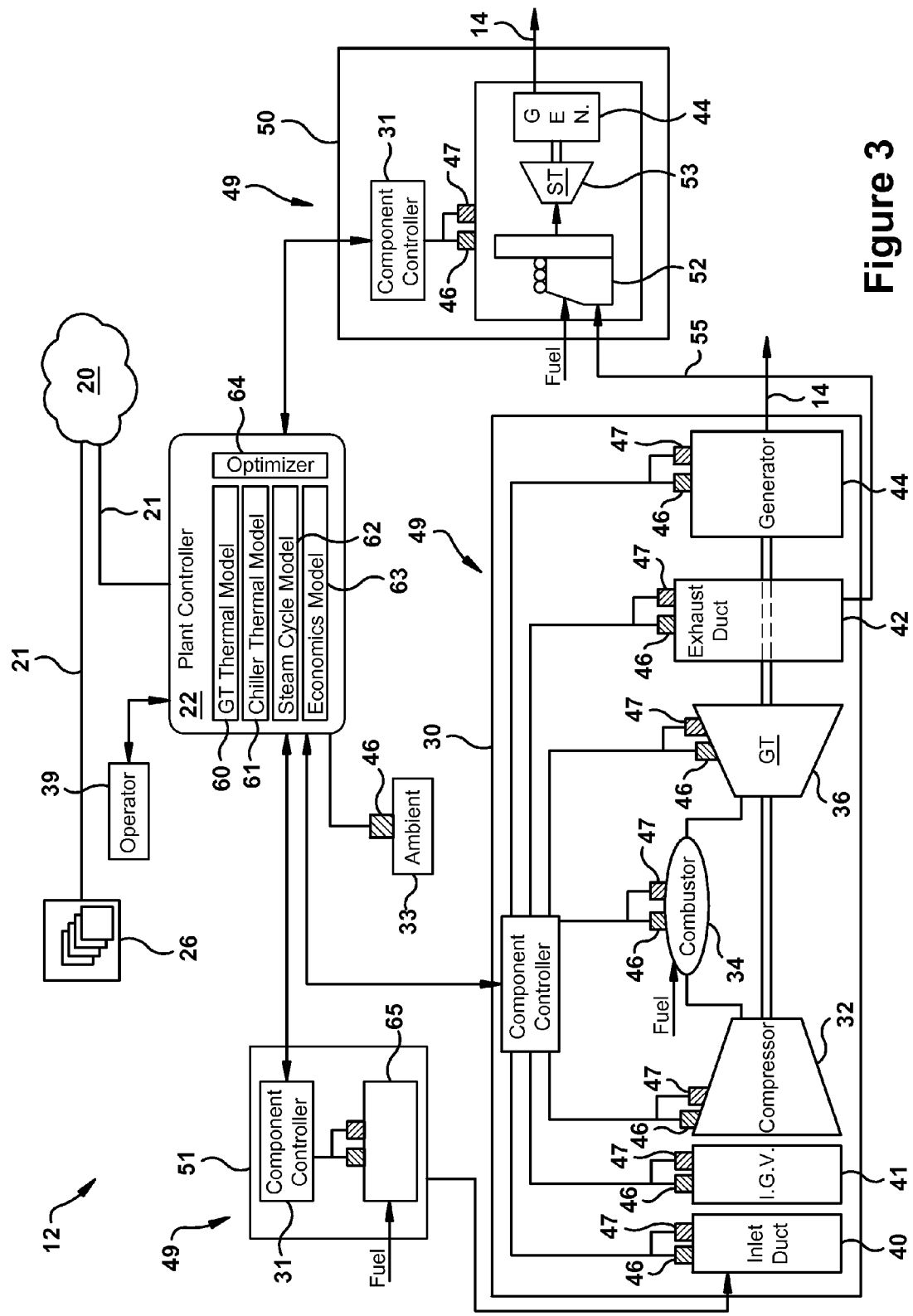
FIG. 3 shows a schematic diagram of an exemplary power plant having a plurality of gas turbines in accordance with embodiments of the present invention.

Turning to FIG. 3, a schematic diagram is provided of an exemplary power plant 12 having a plurality of generating units or plant components 49 in accordance with aspects of the present invention. The illustrated power plant 12 of FIG. 3 is a common configuration, and thus will be used to discuss several of the exemplary embodiments of the present invention that are presented below. However, as will be appreciated, the methods and systems described herein may be more generally applicable and scalable to power plants having more generating units than those shown in FIG. 3, while still also applicable to power plants having a single generating component such as the one illustrated in FIG. 2. It will be appreciated that the power plant 12 of FIG. 3 is a combined-cycle plant that includes several plant components 49, including a gas turbine system 30 and a steam turbine system 50. Power generation may be augmented by other plant components 49, such as an inlet conditioning system 51 and/or a heat recovery steam generator having a duct firing system (hereinafter, "HRSG duct firing system 52"). It will be appreciated that each of the gas turbine system 30, the steam turbine system 50 that includes the HRSG duct firing system 52, and the inlet conditioning system 51 includes a control system or the component controller 31 that communicates electronically with sensors 46 and actuators 47 that are dedicated to each plant component. As used herein, the inlet conditioning system 51, unless otherwise stated, may refer to components used to condition air before entering the compressor, which may include an inlet chilling system or chiller, evaporator, fogger, water injection system, and/or, in some alternative cases, a heating element.

In operation, the inlet conditioning system 51 cools the air entering the gas turbine system 30 so to enhance the power generating capacity of the unit. The HRSG duct firing system 52 burns fuel to provide additional heat so to increase the supply of steam that is expanded through a turbine 53. In this manner the HRSG duct firing system 52 augments the energy supplied by the hot exhaust gases 55 from the gas turbine system, and thereby increases the power generating capacity of the steam turbine system.

By way of exemplary operation, the power plant 12 of FIG. 3 directs a flow of fuel to the combustor 34 of gas turbine system 30 for combustion. The turbine 36 is powered by combustion gases and drives the compressor 32 and generator 44, which delivers electrical energy to the transmission lines 14 of the power system 10. The component controller 31 of gas turbine system 30 may set commands for the gas turbine system regarding fuel flow rate and receive sensor data from the gas turbine system, such as the air inlet temperature, humidity, power output, shaft speed, and temperatures of the exhaust gas. The component controller 31 may also collect other operating data from pressure and temperature sensors, flow control devices and other devices monitoring the operation of the gas turbine system. The component controller 31 may send data regarding the operation of the gas turbine system and receive instruction from the plant controller 22 regarding setpoints for actuators that control process inputs.

During certain modes of operation, the air entering gas turbine system 30 may be cooled or otherwise conditioned by inlet conditioning system 51 so to augment the generating capacity of gas turbine system. The inlet conditioning system 51 may include a refrigeration system 65 for cooling water, and a component controller 31 that controls its operation. In this instance, the component controller 31 may receive information regarding the temperature of the cooling water as well as instruction regarding the desired level of injection, which may come from the plant controller 22. The component controller 31 of inlet conditioning system 51 may also issue commands causing refrigeration system 65 to produce cooling water having a certain temperature and flow rate. The component controller 31 of inlet conditioning system 51 may send data regarding the operation of the inlet conditioning system 51.

Steam turbine system 50 may include turbine 53 and HRSG duct firing system 52, as well as a component controller 31 that, as illustrated, is dedicated to the control of its operation. Hot exhaust gases 55 from exhaust ducts of the gas turbine system 30 may be directed into the steam turbine system 50 to produce the steam that is expanded through the turbine 53. As will be appreciated, HRSG duct firing systems are regularly used to provide additional energy for the production of steam so to increase the generating capacity of a steam turbine system. It will be appreciated that the rotation induced within the turbine 53 by the steam drives a generator 44 so to produce electrical energy that may be then sold within power system 10 across transmission lines 14. The component controller 31 of the steam turbine system 50 may set the flow rate of fuel burned by the duct firing device 52 and thereby increase the generation of steam beyond the amount that may be produced with exhaust gases 55 alone. The component controller 31 of the steam turbine system 50 may send data regarding the operation of that the plant component 49 and receive therefrom instruction as to how it should operate.

The plant controller 22 of FIG. 3, as illustrated, may be connected to each of the component controllers 31 and, via these connections, communicate with sensors 46 and actuators 47 of the several plant components 49. As part of controlling the power plant 12, the plant controller 22 may simulate its operation. More specifically, the plant controller 22 may include or communicate with digital models (or simply "models") that simulate the operation of each plant component 49. The model may include algorithms that correlate process input variables to process output variables. The algorithms may include sets of instructions, logic, mathematical formula, functional relationship descriptions, schedules, data collections, and/or the like. In this instance, the plant controller 22 includes: a gas turbine model 60, which models the operation of the gas turbine system 30; an inlet conditioning system model 61, which models the operation of inlet conditioning system 51; and a steam turbine model 62, which models the operation of the steam turbine system 50 and the HRSG duct firing system 52. As a general note, it will be appreciated that the systems and their related models, as well as the discrete steps of the methods provided herein, may be subdivided and/or combined in various ways without materially deviating from the scope of the present invention, and that the manner in which each are described is exemplary unless otherwise stated or claimed. Using these models, the plant controller 22 may simulate the operation, e.g., thermodynamic performance or parameters describing operation, of the power plant 12.

The plant controller 22 may then use results from the simulations so to determine optimized operating modes. Such optimized operating modes may be described by parameter sets that include a plurality of operating parameters and/or setpoints for actuators and/or other operating conditions. As used herein, the optimized operating mode is one that, at minimum, is preferable over at least one alternative operating mode pursuant to defined criteria or performance indicators, which may be selected by an operator to evaluate plant operation. More specifically, optimized operating modes, as used herein, are those that are evaluated as preferable over one or more other possible operating modes which were also simulated by the plant model. The optimized operating modes are determined by evaluating how the model predicts the power plant will operate under each. As discussed below, an optimizer 64, e.g., a digital software optimization program, may run the digital power plant model pursuant to various parameter sets and, then, identify preferable or optimized modes of operation by evaluating the results. The variations in the setpoints may be generated by perturbations applied around the setpoints chosen for analysis. These may be based in part on historical operation. It will be appreciated that the optimized operating mode may be determined by the optimizer 64 based on one or more defined cost functions. Such cost functions, for example, may regard a cost to produce power, profitability, efficiency, or some other criteria as defined by the operator 39.

To determine costs and profitability, the plant controller 22 may include or be in communication with an economic model 63 that tracks the price of power and certain other variable costs, such as the costs of the fuel used in the gas turbine system, the inlet conditioning system, and HRSG duct firing system. The economic model 63 may provide the data used by the plant controller 22 to judge which of the proposed setpoints (i.e., those chosen setpoints for which operation is modeled for determining optimized setpoints) represents minimal production costs or maximum profitability. According to other embodiments, as discussed in more detail with FIG. 4, the optimizer 64 of the plant controller 22 may include or operate in conjunction with a filter, such as a Kalman filter, to assist in tuning, adjusting and calibrating the digital models so that the models accurately simulate the operation of the power plant 12. As discussed below, the model may be a dynamic one that includes a learning mode in which it is tuned or reconciled via comparisons made between actual operation (i.e., values for measured operating parameters that reflect the actual operation of the power plant 12) and predicted operation (i.e., values for the same operating parameters that the model predicted). As part of the control system, the filter also may be used to adjust or calibrate the models in real time or in near real time, such as every few minutes or hour or as specified.

The optimized setpoints generated by the plant controller 22 represents a recommended mode of operation and, for example, may include fuel and air settings for the gas turbine system, the temperature and water mass flow for the inlet conditioning system, the level of duct firing within the steam turbine system 50. According to certain embodiments, these suggested operating setpoints may be provided to the operator 39 via an interface device such as a computer display screen, printer, or sound speaker. Knowing the optimized setpoints, the operator then may input the setpoints into the plant controller 22 and/or the component controller 31, which then generates control information for achieving the recommended mode of operation. In such embodiments where the optimized setpoints do not include specified control information for achieving the operating mode, the component controllers may provide the necessary control information for this and, as discussed in more detail below, may continue controlling the plant component in a closed loop manner pursuant to the recommended operating mode until the next optimization cycle. Depending on operator preference, the plant controller 22 also may directly or automatically implement optimized setpoints without operator involvement.

By way of exemplary operation, the power plant 12 of FIG. 3 directs a flow of fuel to combustor 34 of the gas turbine system 30 for combustion. The turbine 36 is powered by combustion gases to drive the compressor 32 and the generator 44, which delivers electrical energy to transmission lines 14 of the power system 10. The component controller 31 may set commands for the gas turbine system 30 regarding fuel flow rate and receive sensor data from the gas turbine system 30 such as the air inlet temperature and humidity, power output, shaft speed and temperatures of the exhaust gas. The component controller 31 may also collect other operating data from pressure and temperature sensors, flow control devices and other devices monitoring the gas turbine system 30. The component controller 31 of the gas turbine system 30 may send data regarding the operation of the system and receive instruction from the plant controller 22 regarding setpoints for actuators that control process inputs.

During certain modes of operation, the air entering gas turbine system 30 may be cooled by cold water supplied to the inlet air duct 42 from the inlet conditioning system 51. It will be appreciated that cooling the air entering a gas turbine may be done to augment the capacity of the gas turbine engine to generate power. The inlet conditioning system 51 includes a refrigeration system or refrigerator 65 for cooling water, and a component controller 31. In this instance, the component controller 31 receives information regarding the temperature of the cooling water and commands regarding the desired cooling of the intake air. These commands may come from the plant controller 22. The component controller 31 of inlet conditioning system 51 may also issue commands to cause refrigeration system 65 to produce cooling water having a certain temperature and flow rate. The component controller 31 of inlet conditioning system 51 may send data regarding the operation of the inlet conditioning system 51 and receive instruction from the controller 22.

The steam turbine system 50, which may include a HRSG with a duct firing device 52, a steam turbine 53, and a component controller 31 that may be dedicated to its operation. Hot exhaust gases 55 from an exhaust duct 42 of the gas turbine system 30 is directed into the steam turbine system 50 to produce the steam that drives it. The HRSG duct firing system 52 may be used to provide additional heat energy to produce steam so to increase the generating capacity of steam turbine system 50. The steam turbine 53 drives generator 44 to produce electrical energy that is delivered to the power system 10 via the transmission lines 14. The component controller 31 of the steam turbine system 50 may set the flow rate of fuel burned by the duct firing device 52. Heat generated by the duct firing device increases the generation of steam beyond the amount produced by exhaust gases 55 from turbine 36 alone. The component controller 31 of the steam turbine system 50 may send data regarding the operation of the system to and receive instruction from the plant controller 22.

The plant controller 22 may communicate with the operator 39 and data resources 26, for example, to receive data on market conditions such as prices and demand for power delivered. According to certain embodiments, the plant controller 22 issues recommendations to the operator 39 regarding desired operating setpoints for the gas turbine system 30, inlet conditioning system 51, and steam turbine system 50. The plant controller 22 may receive and store data on the operation of the components and subsystems of the power plant 12. The plant controller 22 may be a computer system having a processor and memory storing data, the digital models 60, 61, 62, 63, the optimizer 64 and other computer programs. The computer system may be embodied in a single physical or virtual computing device or distributed over local or remote computing devices. The digital models 60, 61, 62, 63 may be embodied as a set of algorithms, e.g. transfer functions, that relate operating parameters of each of the systems. The models may include a physics-based aero-thermodynamic computer model, a regression-fit model, or other suitable computer-implemented model. According to preferred embodiments, the models 60, 61, 62, 63 may be regularly, automatically and in real-time or near real-time tuned, adjusted or calibrated or tuned pursuant to ongoing comparisons between predicted operation and the measured parameters of actual operation. The models 60, 61, 62, 63 may include filters that receives data inputs regarding actual physical and thermodynamic operating conditions of the combined-cycle power plant. These data inputs may be supplied to the filter in real-time or periodically every 5 minutes, 15 minutes, hour, day, etc. during the operation of the power plant 12. The data inputs may be compared to data predicted by the digital models 60, 61, 62, 63 and, based on the comparisons, the models may be continuously refined.

Figure 4:
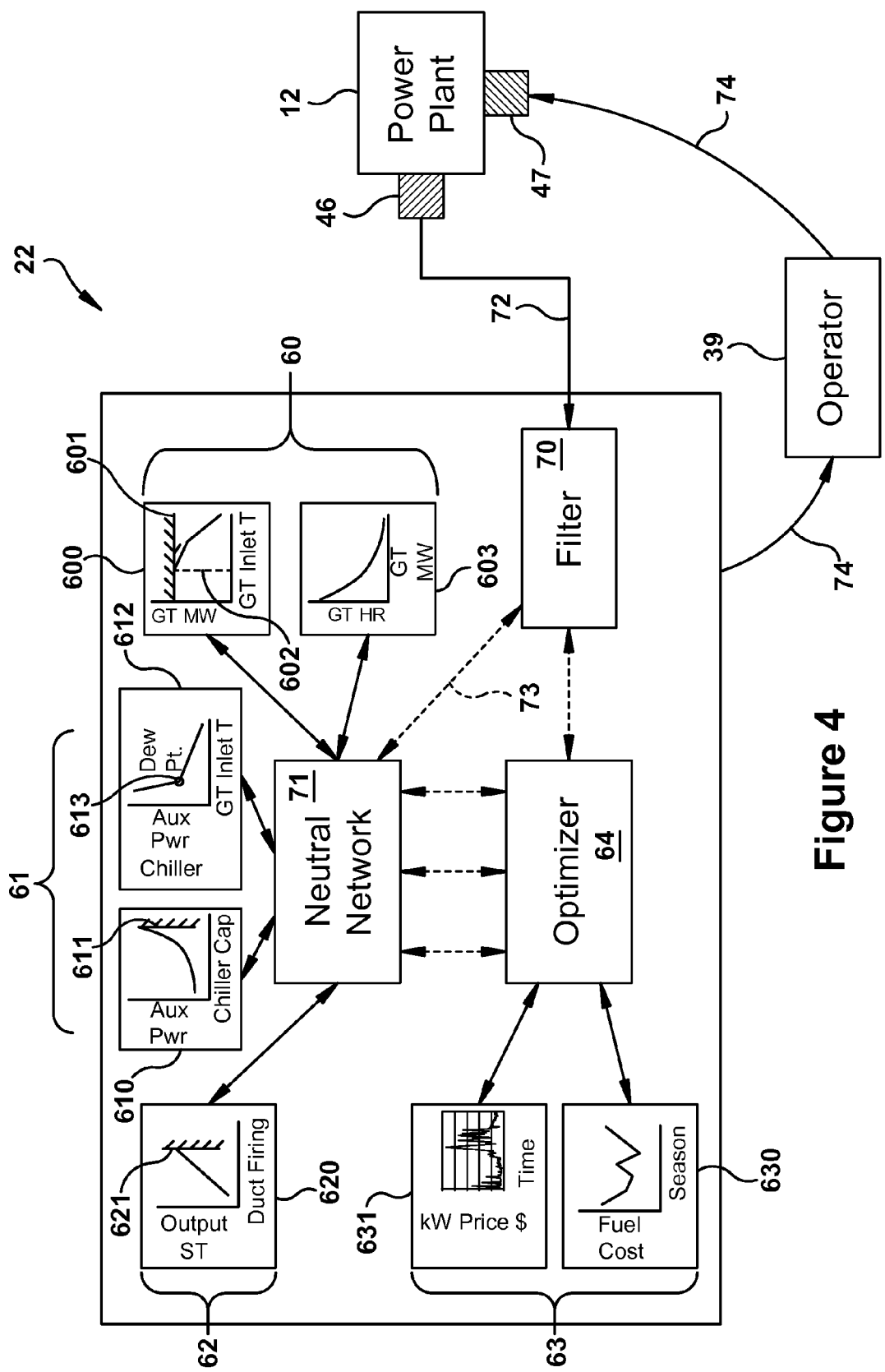
FIG. 4 illustrates an exemplary system configuration of a plant controller and optimizer according to aspects of the present invention.

FIG. 4 illustrates a schematic system configuration of a plant controller 22, which includes a filter 70, an artificial neural network configuration 71 ("neural network 71"), and an optimizer 64, according to aspects of the present invention. The filter 70, which, for example, may be a Kalman filter, may compare the actual data 72 of measured operating parameters from sensors 46 of the power plant 12 to predicted data 73 of the same operating parameters by the models 60, 61, 62, 63 and neural network 71, which is simulating the operation of the power plant 12. Differences between the actual data and predicted data then may be used by the filter 70 to tune the model of the power plant simulated by the neural network 71 and digital models.

It should be understood that while certain aspects of the present invention are described herein with reference to models in the form of neural network based models, it is contemplated that the present invention may be implemented using other types of models, including but not limited to, physics-based models, data-driven models, empirically developed models, models based upon heuristics, support vector machine models, models developed by linear regression, models developed using "first principles" knowledge, etc. Additionally, to properly capture the relationship between the manipulated/disturbance variables and the controlled variables, according to certain preferred embodiments, the power plant model may have one or more of the following characteristics: 1) nonlinearity (a nonlinear model is capable of representing a curve rather than a straight line relationship between manipulated/disturbance and controlled variables); 2) multiple input/multiple output (the model may be capable of capturing the relationships between multiple inputs—the manipulated and disturbance variables—and multiple outputs—controlled variables); 3) dynamic (changes in the inputs may not instantaneously affect the outputs, rather there may be a time delay that is followed by a dynamic response to the changes, for example, it may take several minutes for changes in the inputs to fully propagate through the system. Since optimization systems execute at a predetermined frequency, the model must represent the effects of these changes over time and take them into account); 4) adaptive (the model may be updated at the beginning of each optimization to reflect the current operating conditions); and 5) derived from empirical data (since each power plant is unique, the model may be derived from empirical data obtained from the power generating unit). Given the foregoing requirements, a neural network based approach is a preferred technology for implementing the necessary plant models. Neural networks may be developed based upon empirical data using advanced regression algorithms. As will be appreciated, neural networks are capable of capturing the nonlinearity commonly exhibited in the operation of the power plant components. Neural networks can also be used to represent systems with multiple inputs and outputs. In addition, neural networks can be updated using either feedback biasing or on-line adaptive learning. Dynamic models can also be implemented in a neural network based structure. A variety of different types of model architectures have been used for implementation of dynamic neural networks. Many of the neural network model architectures require a large amount of data to successfully train the dynamic neural network. Given a robust power plant model, it is possible to compute the effects of changes in the manipulated variables on the controlled variables. Furthermore, since the plant model is dynamic, it is possible to compute the effects of changes in the manipulated variables over a future time horizon.

The filter 70 may generate performance multipliers applied to inputs or outputs of the digital models and neural network or modify the weights applied to the logic units and algorithms used by the digital models and neural network. These actions by the filter reduce the differences between the actual condition data and the predicted data. The filter continues to operate to reduce the differences further or address fluctuations that may occur. By way of example, the filter 70 may generate performance multipliers for the predicted data regarding the compressor discharge pressure and temperature in the gas turbine, the efficiency of the gas and steam turbines, the flow of fuel to the gas turbine system, the inlet conditioning system, and HRSG duct firing system, and/or other suitable parameters. It will be appreciated that these categories of operating data reflect operating parameters that are subject to degradation of performance over time. By providing performance multipliers for these types of data, the filter 70 may be particularly useful in adjusting the models and neural network to account for degradation in the performance of the power plant.

As illustrated in FIG. 4, according to certain embodiments of the present invention, each of the digital models 60, 61, 62, 63 of the several plant components 49 of the power plant of FIG. 3 includes algorithms, which are represented by the several graphs, that are used to model the corresponding systems. The models interact and communicate within the neural network 71, and it will be appreciated that, in doing so, the neural network 71 forms a model of the entire combined-cycle power plant 12. In this manner, the neural network simulates thermodynamic and economic operation of the plant. As indicated by the solid arrows in FIG. 4, the neural network 71 collects data outputted by models 60, 61, 62, 63 and provides data to be used as inputs by the digital models.

The plant controller 22 of FIG. 4 also includes an optimizer 64, such as an computer program, that interacts with the neural network 71 to search for optimal setpoints for the gas turbine system, inlet conditioning system, steam turbine system, and HRSG duct firing system to achieve a defined performance objective. The performance objective, for example, may be to maximize the profitability of the power plant. The optimizer 64 may cause the neural network 71 to run the digital models 60, 61, 62, 63 at various operational setpoints. The optimizer 64 may have perturbation algorithms that assist in varying the operational setpoints of the models. The perturbation algorithms cause the simulation of the combine cycle power plant provided by the digital models and neural network to operate at setpoints different than the current operational setpoint for the plant. By simulating the operation of the power plant at different setpoints, the optimizer 64 searches for operational setpoints that would cause the plant to operate more economically or improve performance by some other criteria, which may be defined by operator 39.

According to exemplary embodiments, economic model 63 provides data used by the optimizer 64 to determine which setpoints are most profitable. Economic model 63, for example, may receive and store fuel cost data formatted such as a chart 630 that correlates the cost of fuel over time, such as during the seasons of a year. Another chart 631 may correlate the price received for electrical power at different times of a day, week or month. Economic model 63 may provide data regarding the price received for power and the cost of fuel (gas turbine fuel, duct firing fuel and inlet conditioning system fuel) used to produce it. The data from economic model 63 may be used by the optimizer 64 to evaluate each of the operational states of the power plant pursuant to operator defined performance objectives. The optimizer 64 may identify which of the operational states of the power plant 12 is optimal (which, as used herein, means at least preferable over an alternative operational state) given the performance objectives as defined by operator 39. As described, the digital models may be used to simulate the operation of the plant components 49 of the power plant 12, such as modeling thermodynamic operation of the gas turbine system, the inlet conditioning system, or the steam turbine system. The models may include algorithms, such as mathematical equations and look-up tables, which may be stored locally and updated periodically or acquired remotely via data resources 26, that simulate the response of plant components 49 to specific input conditions. Such look-up tables may include measured operating parameters describing the operation of the same type of components that operate at remote power plant installations.

Thermal model 60 of gas turbine system 30, for example, includes an algorithm 600 that correlates the effect of the temperature of inlet air to power output. It will be appreciated that this algorithm may show that power output decreases from a maximum value 601 as the inlet air temperature increases beyond a threshold 602 temperature. Model 60 may also include an algorithm 603 that correlates the heat rate of the gas turbine at different power output levels of the engine. As discussed, heat rate represents the efficiency of a gas turbine engine or other power generating unit, and is inversely related to efficiency. A lower heat rate indicates a higher thermodynamic performance efficiency. Digital model 61 may simulate thermodynamic operation of the inlet conditioning system 51. In this case, for example, digital model 61 includes an algorithm 610 that correlates the chilling capacity based on energy applied to run refrigeration system 65 of inlet conditioning system 51, so that the calculated chilling capacity indicates the amount of cooling applied to the air entering the gas turbine. There may be a maximum chilling capacity value 611 that can be achieved by refrigeration system 65. In another case, a related algorithm 612 may correlate the energy applied to run refrigeration system 65 to the temperature of the chilled air entering compressor 32 of gas turbine system 30. Model 61 may show, for example, that the power required to run the inlet conditioning system increases dramatically when reducing the temperature of the air entering the gas turbine below the dew point 613 of ambient air. In the case of steam turbine system 50, digital model 62 may include an algorithm 620 that correlates the power output of the steam turbine system to the energy added by HRSG duct firing system 52, such as the amount of fuel consumed by duct firing. Model 62 may indicate, for example, that there is an upper threshold level 621 to the increase in steam turbine system output that can be achieved by the HRSG duct firing system, which may be included in algorithm 620.

According to certain embodiments of the present invention, as illustrated in FIG. 4, the neural network 71 may interact with and provide communications between each of the digital models of the several plant components 49 of the power plant 12 of FIG. 3. The interaction may include collecting output data from the models and generating input data used by the models to generate further output data. The neural network 71 may be a digital network of connected logic elements. The logic elements may each embody an algorithm that accepts data inputs to generate one or more data outputs. A simple logic element may sum the values of the inputs to produce output data. Other logic elements may multiply values of the inputs or apply other mathematical relationships to the input data. The data inputs to each of the logic elements of the neural network 71 may be assigned a weight, such as multiplier between one and zero. The weights may be modified during a learning mode which adjusts the neural network to better model the performance of the power plant. The weights may also be adjusted based on commands provided by the filter. Adjusting the weights of the data inputs to the logic units in the neural network is one example of the way in which the neural network may be dynamically modified during operation of the combined-cycle power plant. Other examples include modifying weights of data inputs to algorithms (which are an example of a logic unit) in each of thermodynamic digital models for the steam turbine system, inlet conditioning system, and gas turbine. The plant controller 22 may be modified in other ways, such as, adjustments made to the logic units and algorithms, based on the data provided by the optimizer and/or filter.

The plant controller 22 may generate an output of recommended or optimized setpoints 74 for the combined-cycle power plant 12, which, as illustrated, may pass through an operator 39 for approval before being communicated and implemented by power plant actuators 47. As illustrated, the optimized setpoints 74 may include input from or be approved by the operator 39 via a computer system such as the one described below in relation to FIG. 6. The optimized setpoints 74 may include, for example, a temperature and mass flow rate for the cooling water generated by the inlet conditioning system and used to cool the air entering the gas turbine system; a fuel flow rate to the gas turbine system; and a duct firing rate. It will be appreciated that optimized setpoints 74 also may be then used by the neural network 71 and models 60, 61, 62, 63 so that the ongoing plant simulation may predict operating data that may later be compared to actual operating data so that the plant model may continually be refined.

Figure 5:
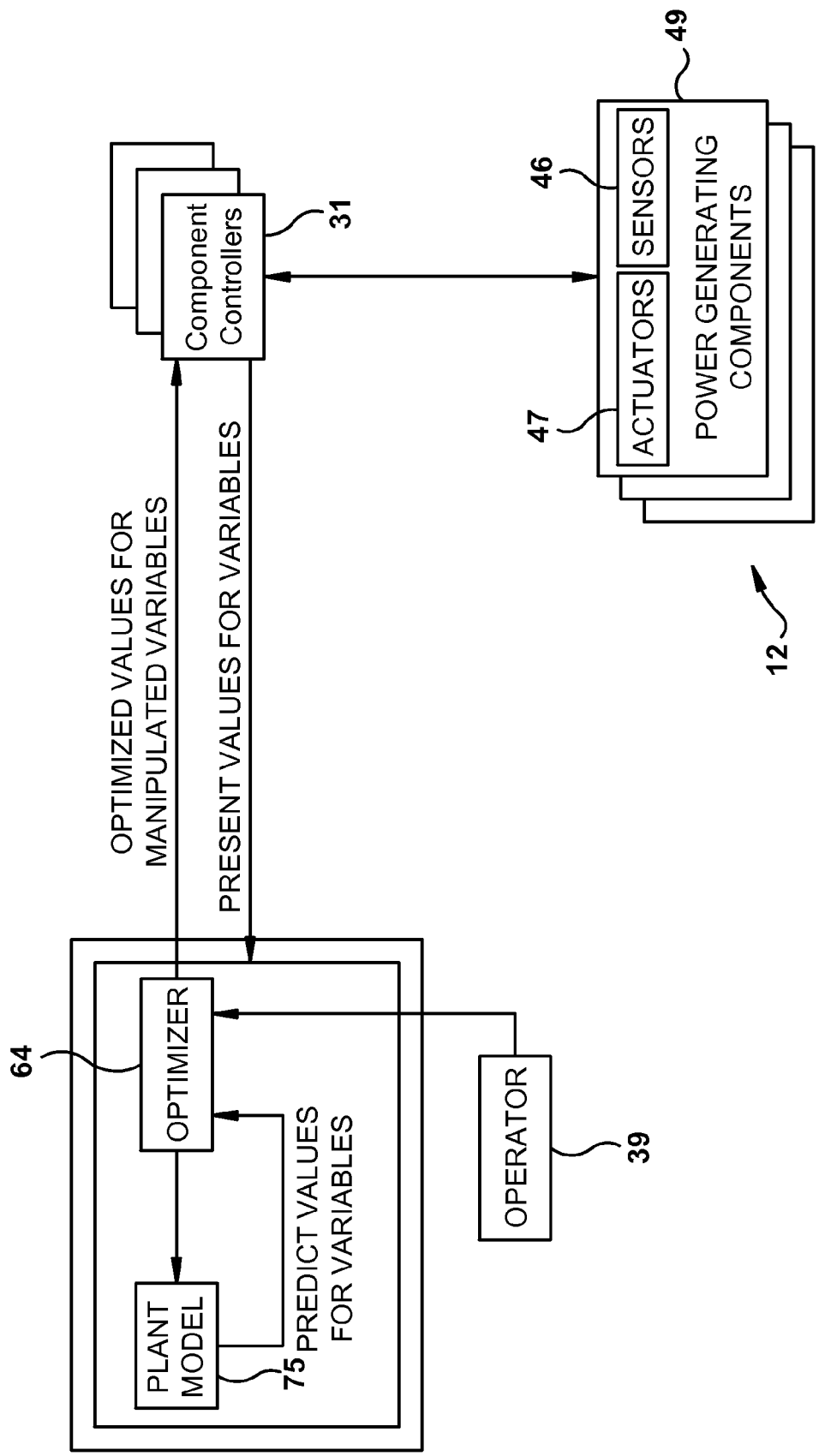
FIG. 5 illustrates a schematic diagram of a power plant with a plant controller and optimizer having a system configuration according to certain aspects of the present invention.

FIG. 5 illustrates a simplified system configuration of a plant controller 22 with an optimizer 64 and power plant model 75. In this exemplary embodiment, the plant controller 22 is shown as a system having the optimizer 64 and power plant model 75 (which, for example, includes the neural network 71 and models 60, 61, 62, 63 discussed above in relation to FIG. 4). The power plant model 75 may simulate the overall operation of a power plant 12. In accordance with the illustrated embodiment, the power plant 12 includes a plurality of generating units or plant components 49. The plant component 49, for example, may include thermal generating units, or other plant subsystems as already described, each of which may include corresponding component controllers 31. The plant controller 22 may communicate with the component controllers 31, and through and by the component controllers 31, may control the operation of the power plant 12 via connections to sensors 46 and actuators 47.

It will be appreciated that power plants have numerous variables affecting their operation. Each of these variables may be generally categorized as being either input variables or output variables. Input variables represent process inputs, and include variables that can be manipulated by plant operators, such as air and fuel flow rates. Input variables also include those variables that cannot be manipulated, such as ambient conditions. Output variables are variables, such as power output, that are controlled by manipulating those input variables that may be manipulated. A power plant model is configured to represent the algorithmic relationship between input variables, which include those that can be manipulated, or "manipulated variables", and those that cannot be manipulated, or "disturbance variables", and output or controlled variables, which will be referred to as "controlled variables". More specifically, manipulated variables are those that may be varied by the plant controller 22 to affect controlled variables. Manipulated variables include such things as valve setpoints that control fuel and air flow. Disturbance variables refer to variables that affect controlled variables, but cannot be manipulated or controlled. Disturbance variables include ambient conditions, fuel characteristics, etc. The optimizer 64 determines an optimal set of setpoint values for the manipulated variables given: (1) performance objectives of the power plant (e.g., satisfying load requirements while maximizing profitability); and (2) constraints associated with operating the power plant (e.g., emissions and equipment limitations).

According to the present invention, an "optimization cycle" may commence at a predetermined frequency (e.g., every 5 to 60 seconds, or 1 to 30 minutes). At the commencement of an optimization cycle, the plant controller 22 may obtain present data for manipulated variables, controlled variables and disturbance variables from the component controllers 31 and/or directly from sensors 46 of each of the plant components 49. The plant controller 22 then may use power plant model 75 to determine optimal setpoint values for the manipulated variables based upon the present data. In doing this, the plant controller 22 may run the plant model 75 at various operational setpoints so to determine which set of operational setpoints are most preferable given the performance objectives for the power plant, which may be referred to as "simulation runs". For example, a performance objective may be to maximize the profitability. By simulating the operation of the power plant at different setpoints, the optimizer 64 searches for the set of setpoints which the plant model 75 predicts causes the plant to operate in an optimal (or, at least, preferable manner). As stated, this optimal set of setpoints may be referred to as "optimized setpoints" or an "optimized operating mode". Typically, in arriving at the optimized setpoints, the optimizer 64 will have compared numerous sets of setpoints and the optimized setpoints will be found superior to each of the other sets given the performance objections defined by the operator. The operator 39 of the power plant 12 may have the option of approving the optimized setpoints or the optimized setpoints may be approved automatically. The plant controller 22 may send the optimized setpoints to the component controller 31 or, alternatively, directly to the actuators 47 of the plant components 49 so that settings may be adjusted pursuant to the optimized setpoints. The plant controller 22 may be run in a closed loop so to adjust setpoint values of the manipulated variables at a predetermined frequency (e.g., every 10-30 seconds or more frequently) based upon the measured current operating conditions.

The optimizer 64 may be used to minimize a "cost function" subject to a set of constraints. The cost function essentially is a mathematical representation of a plant performance objective, and the constraints are boundaries within which the power plant must operate. Such boundaries may represent legal, regulatory, environmental, equipment, or physical constraints. For instance, to minimize NOx, the cost function includes a term that decreases as the level of NOx decreases. One common method for minimizing such a cost function, for example, is known as "gradient descent optimization." Gradient descent is an optimization algorithm that approaches a local minimum of a function by taking steps proportional to the negative of the gradient (or the approximate gradient) of the function at the current point. It should be understood that a number of different optimization techniques may be used depending on the form of the model and the costs and constraints. For example, it is contemplated that the present invention may be implemented by using, individually or in combination, a variety of different types of optimization approaches. These optimization approaches include, but not limited to, linear programming, quadratic programming, mixed integer non-linear programming, stochastic programming, global non-linear programming, genetic algorithms, and particle/swarm techniques. Additionally, plant model 75 may be dynamic so that effects of changes are taken into account over a future time horizon. Therefore, the cost function includes terms over a future horizon. Because the model is used to predict over a time horizon, this approach is referred to as model predictive control, which is described in S. Piche, B. Sayyar-Rodsari, D. Johnson and M. Gerules, "Nonlinear model predictive control using neural networks," *IEEE Control Systems Magazine*, vol. 20, no. 2, pp. 53-62, 2000, and which is fully incorporated herein by reference.

Constraints may be placed upon both process inputs (which includes manipulated variables) and process outputs (which includes controlled variables) of the power plant over the future time horizon. Typically, constraints that are consistent with limits associated with the plant controller are placed upon the manipulated variables. Constraints on the outputs may be determined by the problem that is being solved. According to embodiments of the present invention and as a step in the optimization cycle, the optimizer 64 may compute the full trajectory of manipulated variable moves over the future time horizon, for example one hour. Thus, for an optimization system that executes every 30 seconds, 120 values may be computed over an one hour future time horizon for each manipulated variable. Since plant model or performance objectives or constraints may change before the next optimization cycle, the plant controller 22/optimizer 64 may only outputs the first value in the time horizon for each manipulated variable to component controllers 31 as optimized setpoints for each respective manipulated variable. At the next optimization cycle, the plant model 75 may be updated based upon the current conditions. The cost function and constraints also may be updated if they have changed. The optimizer 64 then maybe used to recompute the set of values for the manipulated variables over the time horizon and the first value in the time horizon, for each manipulated variable, is output to the component controller 31 as setpoint values for each respective manipulated variable. The optimizer 64 may repeat this process for each optimization cycle, thereby, constantly maintaining optimal performance as the power plant 12 is affected by unanticipated changes in such items as load, ambient conditions, fuel characteristics, etc.

Figure 6:
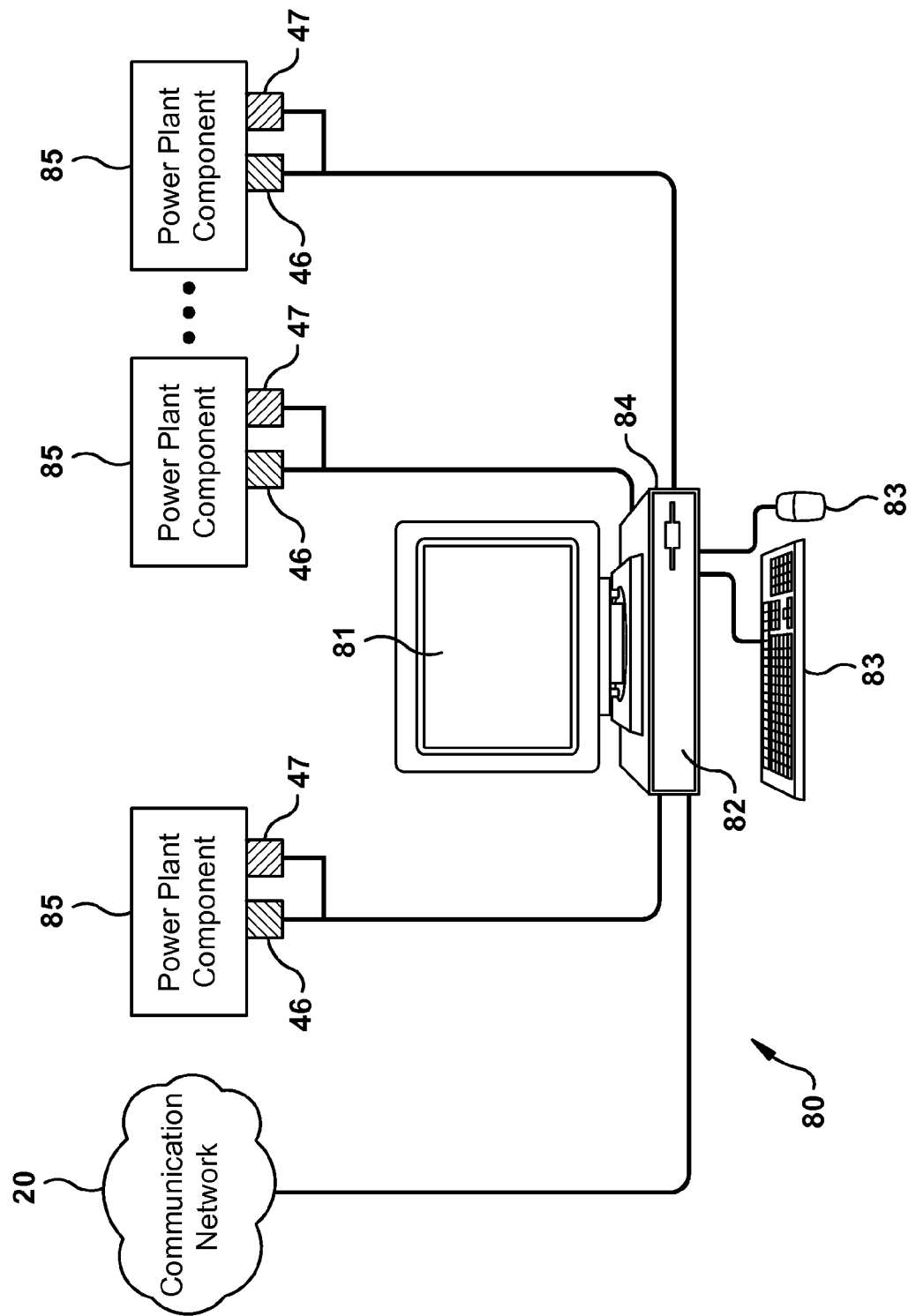
FIG. 6 shows a computer system having an exemplary user interface according to certain aspects of the present invention.

Turning to FIG. 6, an illustrative environment and user input device for a plant controller and control program is illustrated according to an exemplary embodiment. Though other configurations are possible, the embodiment includes a computer system 80 having a display 81, a processor 82, an user input device 83, and a memory 84. Aspects of the computer system 80 may be located at the power plant 12, while other aspects maybe remote and connected via communications network 20. As discussed, the computer system 80 may be connected to each generating unit or other plant component 49 of the power plant 12. The power plant components 49 may include gas turbine system 30, steam turbine system 50, inlet conditioning system 51, HRSG duct firing system 52, and/or any subsystems or subcomponents related thereto, or any combination thereof. The computer system 80 also may be connected to one or more sensors 46 and actuators 47, as may be necessary or desired. As stated, sensors 46 may be configured to sense operating conditions and parameters of the components and relay signals to the computer system 80 regarding these conditions. The computer system 80 may be configured to receive these signals and use them in manners described herein, which may include transmitting signals to one or more of actuators 47. Unless otherwise required, however, the present invention may include embodiments that are not configured to directly control the power plant 12 and/or to sense operating conditions. In configurations of the present invention that do control the power plant 12 and/or sense operating conditions, such input or control can be provided by receiving and/or transmitting signals from/to one or more separate software or hardware systems that more directly interact with physical components of the power plant and its sensors and actuators. The computer system 80 may include a power plant control program ("control program"), which makes the computer system 80 operable to manage data in a plant controller by performing the processes described herein.

In general, the processor 82 executes program code that defines the control program, which is at least partially fixed in the memory 84. While executing program code, the processor 82 may process data, which may result in reading and/or writing transformed data from/to memory 84. Display 81 and input device 83 may enable a human user to interact with the computer system 80 and/or one or more communications devices to enable a system user to communicate with computer system 80 using any type of communications link. In embodiments, a communications network, such as networking hardware/software, may enable computer system 80 to communicate with other devices in and outside of a node in which it is installed. To this extent, the control program of the present invention may manage a set of interfaces that enable human and/or system users to interact with the control program. Further, the control program, as discussed below, may manage (e.g., store, retrieve, create, manipulate, organize, present, etc.) data, such as control data, using any solution.

Computer system 80 may comprise one or more general purpose computing articles of manufacture capable of executing program code, such as the control programs defined herein, that is installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. Additionally, computer code may include object code, source code, and/or executable code, and may form part of a computer program product when on at least one computer readable medium. It is understood that the term "computer readable medium" may comprise one or more of any type of tangible medium of expression, now known or later developed, from which a copy of the program code may be perceived, reproduced, or otherwise communicated by a computing device. When the computer executes the computer program code, it becomes an apparatus for practicing the invention, and on a general purpose microprocessor, specific logic circuits are created by configuration of the microprocessor with computer code segments. A technical effect of the executable instructions is to implement a power plant control method and/or system and/or computer program product that uses models to enhance or augment or optimize operating characteristics of power plants so to more efficiently leverage the economic return of a power plant, given anticipated ambient and/or market conditions, performance parameters, and/or life cycle cost related thereto. In addition to using current information, historical and/or forecast information may be employed, and a feedback loop may be established to dynamically operate the plant more efficiently during fluctuating conditions. The computer code of the control program may be written in computer instructions executable by the plant controller 22. To this extent, the control program executed by the computer system 80 may be embodied as any combination of system software and/or application software. Further, the control program may be implemented using a set of modules. In this case, a module may enable the computer system 80 to perform a set of tasks used by control program, and may be separately developed and/or implemented apart from other portions of control program. As used herein, the term "component" means any configuration of hardware, with or without software, which implements the functionality described in conjunction therewith using any solution, while the term "module" means program code that enables computer system to implement the actions described in conjunction therewith using any solution. When fixed in the memory 84 of the computer system 80 that includes the processor 82, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of the computer system 80. When the computer system 80 comprises multiple computing devices, each computing device may have only a portion of control program fixed thereon (e.g., one or more modules). Regardless, when the computer system 80 includes multiple computing devices, the computing devices may communicate over any type of communications link. Further, while performing a process described herein, the computer system 80 may communicate with one or more other computer systems using any type of communications link.

As discussed herein, the control program enables the computer system 80 to implement a power plant control product and/or method. The computer system 80 may obtain power plant control data using any solution. For example, computer system 80 may generate and/or be used to generate power plant control data, retrieve power plant control data from one or more data stores, repositories or sources, receive power plant control data from another system or device in or outside of a power plant, plant controller, component controller, and/or the like. In another embodiment, the invention provides a method of providing a copy of program code, such as for power plant control program, which may implement some or all of a process described herein. It is understood that aspects of the invention can be implemented as part of a business method that performs a process described herein on a subscription, advertising, and/or fee basis. A service provider could offer to implement a power plant control program and/or method as described herein. In this case, the service provider can manage (e.g., create, maintain, support, etc.) a computer system, such as the computer system 80, that performs a process described herein for one or more customers.

Computer models of power plants may be constructed and then used to control and optimize power plant operation. Such plant models may be dynamic and iteratively updated via ongoing comparison between actual (i.e., measured) operating parameters versus those same parameters as predicted by the plant model. In preparing and maintaining such models, instructions may be written or otherwise provided that instruct the processor 82 of the computer system 80 to generate a library of energy system generating units and components ("library of components") in response to user input. In some configurations, user input and the generated library includes properties of the component with the library as well as rules to generate scripts in accordance with operating and property values. These property values can be compiled from data stored locally in memory 84 and/or taken from a central data repository maintained at a remote location. The library of components may include non-physical components, such as economic or legal components. Examples of economic components are fuel purchases and sales, and examples of legal components are emission limits and credits. These non-physical components can be modeled with mathematical rules, just as components representing physical equipment can be modeled with mathematical rules. The instructions may be configured to assemble a configuration of energy system components from the library, as may be configured by an operator. A library of energy system components may be provided so that an user may select from it components so to replicate an actual power plant or create a hypothetical one. It will be appreciated that each component may have several properties that may be used by the user to enter specific values matching operating conditions of an actual or hypothetical power plant being modeled. Scripts may be generated for the assembled energy system components and their configuration. The generate scripts may include mathematical relationships within and/or among the energy system components, including economic and/or legal components, if used in the energy system component configuration. The computer system 80 then may solve mathematical relationships and show results of the solution on the display 81. Configurations in which signals may be transmitted from computer 80, the signals may be used to control an energy system in accordance with the results of the solution. Otherwise, results may be displayed or printed and used for setting physical equipment parameters and/or determining and/or using determined nonphysical parameters, such as fuel purchases and/or sales, so a preferred or optimized mode of operation is achieved. The library of plant components may include a central repository of data representing an ongoing accumulation of data relating to how each plant component operates under different parameters and conditions. The central repository of data may be used to provide "plug data" for instances when sensor data is determined unreliable.

Figure 7:
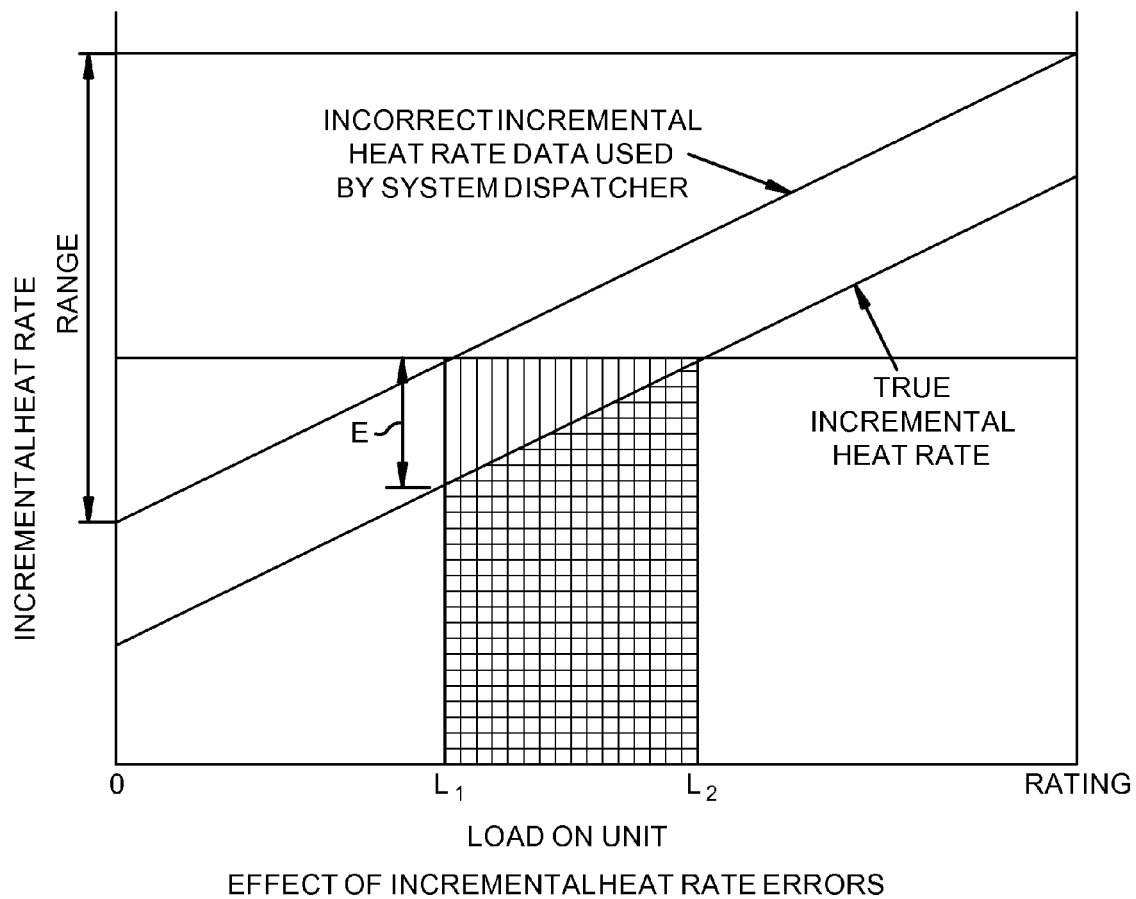
FIG. 7 is an exemplary incremental heat rate curve and an effect error may have on the economic dispatch process.
Figure 8:
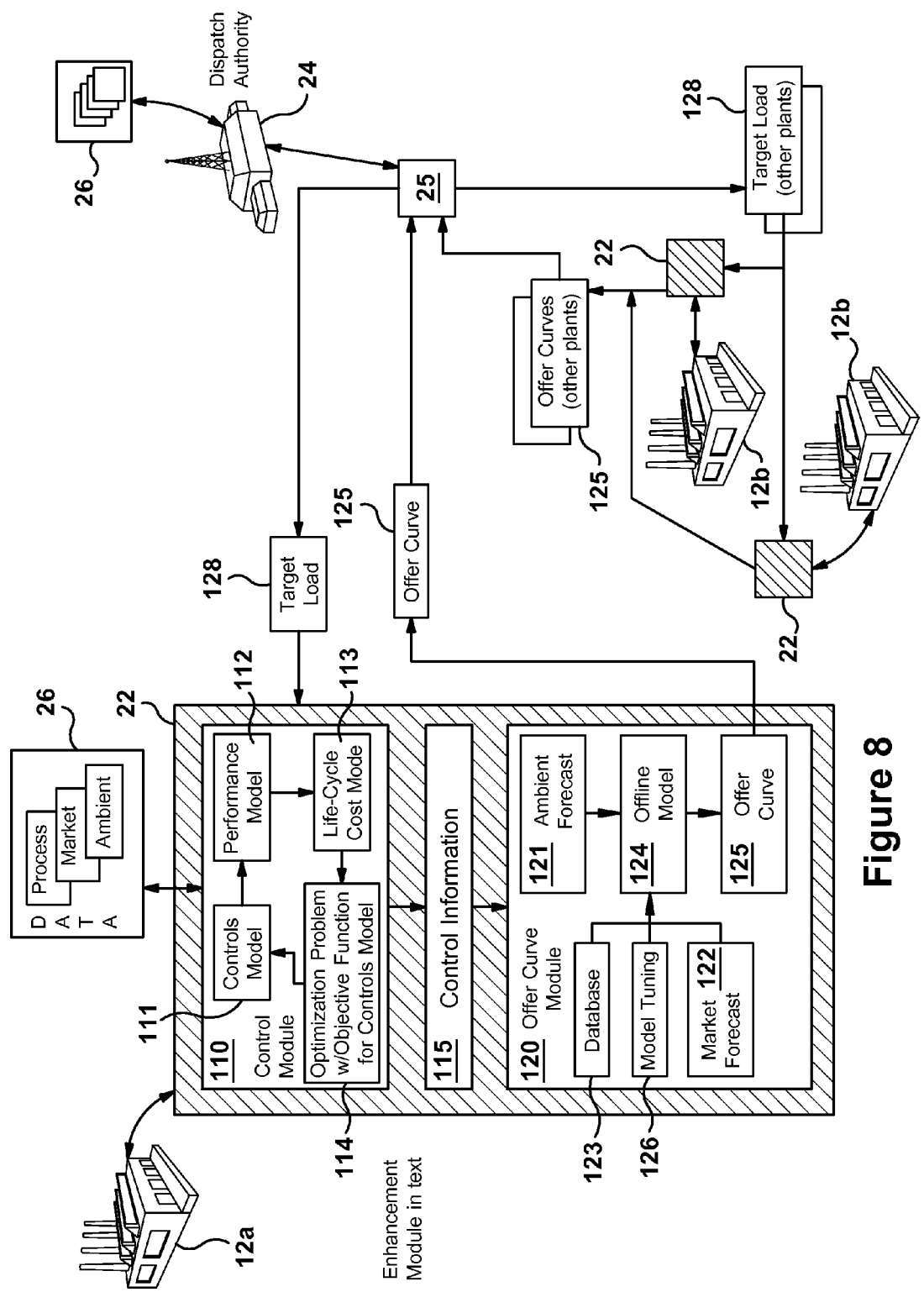
FIG. 8 shows a schematic diagram of an exemplary plant controller with a power system according to aspects of the present invention.
Figure 9:
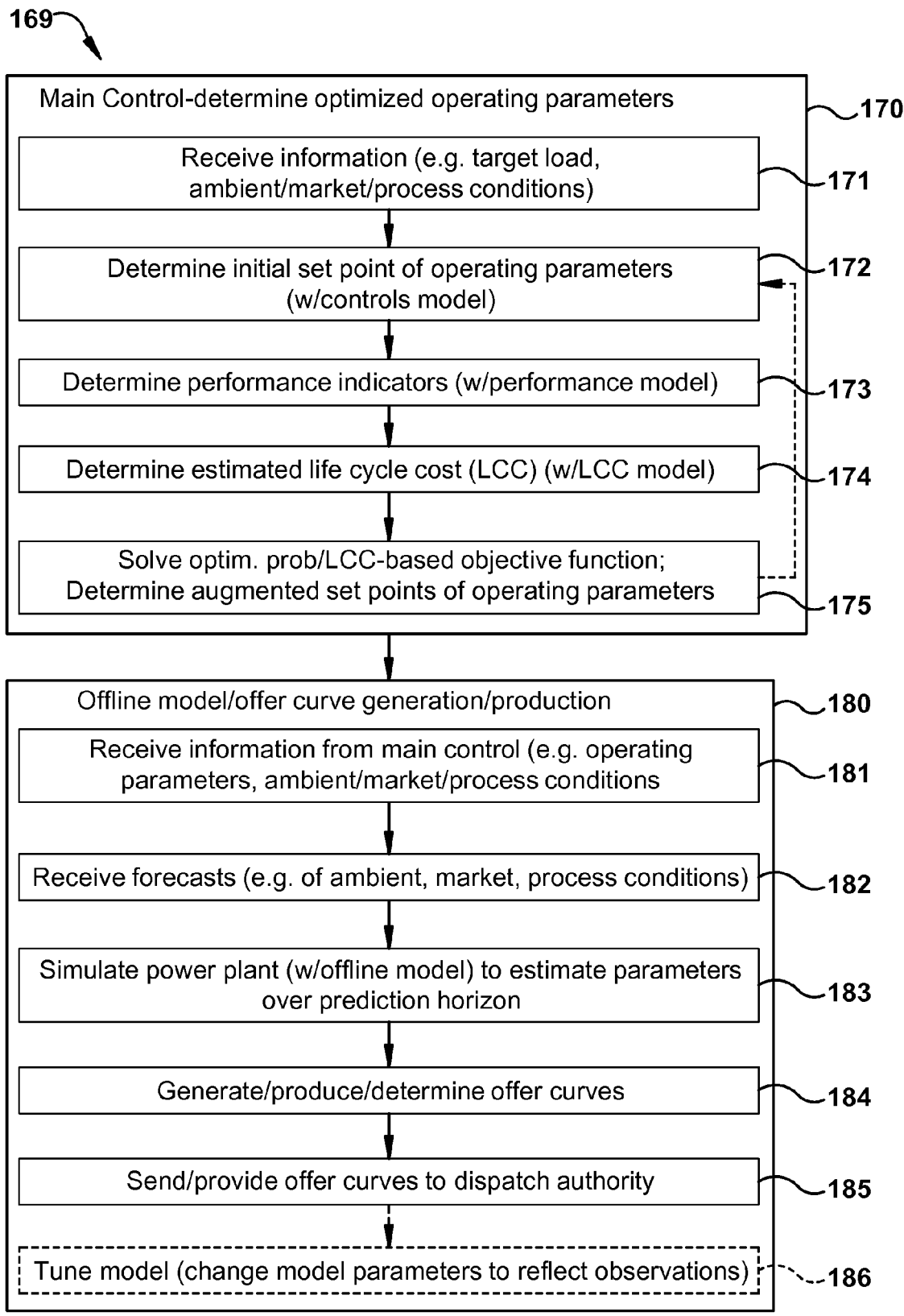
FIG. 9 illustrates a flow diagram of power plant control method according to aspects of the present invention.

Turning to FIGS. 7 through 9, a more detailed discussion of the economic dispatch process is provided, including ways in which the control systems discussed above may be used to optimize such dispatches procedures from the perspective of both a power system central authority or individual power plants participating within such systems, whichever the case may be. It will be appreciated that, from the perspective of a central authority dispatcher, the objective of the economic dispatch process is to dynamically respond to changing variables, including changing load requirements or ambient conditions, while still minimizing generating cost within system. For the participating power plants, it will be appreciated that, in general, the objective is to utilize available capacity while minimizing generating cost so to maximize economic return. Given the complexities of power systems, the process of economic dispatch typically includes the frequent adjusting of load on the participating power plants by the dispatcher. When successful, the process results in available power plants being operated at loads where their incremental generating costs are approximately the same—which results in minimizing generating costs—while also observing system constraints, such as maximum and minimum allowable loads, system stability, etc. It will be appreciated that accurate incremental cost data is necessary for economic dispatch to function optimally. Such incremental cost data has primary components that include fuel cost and incremental fuel consumption. The incremental fuel consumption data is usually given as a curve of incremental heat rate versus power output. Specifically, the incremental heat rate, IHR, of a thermal generating unit is defined as the slope of the heat rate curve, where the heat rate of the unit is the ratio of heat input plotted against electrical output at any load. Errors in this data will result in the dispatching of units at loads that do not minimize total generating cost.

A number of items can introduce errors into the incremental heat rate curves. These may be grouped into two categories. A first category includes items that produce errors present at the time the data is given to the dispatcher. For example, if the data is collected by testing, errors due to instrument inaccuracy will be included in all calculations made with them. As discussed in more detail below, certain aspects of the present invention include ways of confirming sensor accuracy during data collection and timely identifying instances when collected data may be unreliable due to sensor malfunction. A second category of errors includes items that cause data to be less accurate as time passes. For example, if performance of a generating unit changes due to equipment degradation or repair or changes in ambient conditions, the incremental heat rate data used for dispatch will be in error until such data is updated. One aspect of the present invention is to identify those parameters thermal generating units that may significantly affect incremental heat rate calculations. A knowledge of such parameters and their relative significance then may be used to determine how often dispatch data should be updated to reflect true plant performance.

Errors in incremental heat rate data lead to situations where power plants are incorrectly dispatched, which typically results in increased generating cost for the power system. For example, referring to the graph of FIG. 7, a situation is provided where the true incremental heat rate is different from the incremental heat rate that is used in the dispatch process. In dispatching the unit, the dispatch authority uses the incremental heat rate data that is in error by "E", as indicated. (It should be noted that FIG. 7 assumes that a power system's incremental heat rate is not affected by the load imposed on the given unit, which may be substantially correct if the power system is a large one in comparison to the size of the given generating unit.) As shown, the generating unit will be dispatched at $L_1$, which is the load where the unit and the system incremental heat rates are equal based on the information available. If the correct incremental heat rate information were used, the unit would be dispatched at $L_2$, the load where the true incremental heat rate of the plant equals the power system's incremental heat rate. As will be appreciated, the error results in the under-utilization of the power plant. In cases where the alternative is true, i.e., where the positioning of the incorrect incremental heat rate plot relative to the true incremental heat rate plot is reversed, the error results in the unit being overcommitted, which may require it to operate inefficiently to satisfy its dispatched load commitment. From the perspective of the central dispatch authority of the power system, it will be appreciated that reducing errors in the data used in the dispatch process will reduce total system fuel costs, increase system efficiency, and/or decrease the risk of not meeting load requirements. For the operators of power plants within the system, reducing such errors should promote full utilization of the plant and improve economic return.

FIGS. 8 and 9, respectively, illustrate a schematic diagram of a plant controller 22 and a flow diagram 169 of a control method pursuant to aspects of the present invention. In these examples, methods are provided that illustrate economic optimization within a power system that uses economic dispatch to distribute load among possible providers. The fundamental process of economic dispatch is one that may be employed in different ways and between any two levels defined within the layered hierarchy common to many power systems. In one instance, for example, the economic dispatch process may be used as part of a competitive process by which a central government authority or industry cooperative association of portions load among several competing companies. Alternatively, the same principles of economic dispatch may be used to apportion load among commonly owned power plants so to minimize generating costs for the owner of the plants. It may also be used at the plant level as a way for an operator or plant controller to apportion its load requirements among the different local generating units that are available to it. It will be appreciated that, unless otherwise stated, the systems and methods of the present invention are generally applicable to any of these possible manifestations of the economic dispatch process.

In general, the dispatch process seeks to minimize generating cost within a power system via the creation of a dispatch schedule in which the incremental generating costs for each participating power plant or generating unit is approximately the same. As will be appreciated, several terms are often used to describe the economic dispatch process, and so will be defined as follows. A "prediction horizon" is a predefined period of time over which optimization is to be performed. For example, a typical prediction horizon may be from a few hours to a few days. An "interval" within the prediction horizon is a predefined time resolution of optimization, i.e., the aforementioned "optimization cycle", which describes how often optimization is to be performed during the prediction horizon. For example, a typical time interval for an optimization cycle may be from several seconds to several minutes. Finally, a "prediction length" is the number of time intervals for which optimization is to be performed, and may be obtained by dividing the prediction horizon by the time interval. Thus, for a 12-hour prediction horizon and a 5-minute time interval, a prediction length is 144 time intervals.

Aspects of the present invention provide methods of control and/or controllers for power plants, as well as methods and systems for optimizing performance, cost-effectiveness, and efficiency. For example, according to the present invention, a minimum variable operating cost may be achieved for a thermal generating unit or power plant that balances variable performance characteristics and cost parameters (i.e., fuel cost, ambient conditions, market conditions, etc.) with life-cycle cost (i.e., variable operation and its effect on maintenance schedules, part replacement, etc.). By varying one or more parameters of a thermal generating unit taking such factors into account, more economical advantage may be taken of the unit over its useful life. For example, in power plants that include a gas turbine, firing temperature may be varied to provide a desired load level more economically based on operating profile, ambient conditions, market conditions, forecasts, power plant performance, and/or other factors. As a result, the disposal of parts with residual hours-based life remaining in starts-limited units may be reduced. Further, a power plant control system that includes a feedback loop updated with substantially real-time data from sensors that are regularly tested and confirmed as operating correctly will allow further plant optimization. That is, according to certain embodiments of the present invention, by introducing a real-time feedback loop between the power plant control system and dispatch authority, target load and unit commitment may be based on highly accurate offer curves that are constructed based on real-time engine performance parameters.

FIG. 8 illustrates a schematic design of an exemplary the plant controller 22 according to aspects of the present invention. It will be appreciated that the plant controller 22 may be particularly well-suited for implementing method 169 of FIG. 9. Because of this, FIGS. 8 and 9 will be discussed together, though it will be appreciated that each may have aspects applicable to more general usage. The power system 10 represented in FIG. 8 includes a "power plant 12a", to which the plant controller 22 is dedicated, as well as "other power plants 12b", which may represent power plants within the power system that compete against power plant 12a. As illustrated, the power system 10 also includes a dispatch authority 24 that, through a dedicated system controller 25, manages the dispatch process between all participating power plants 12a, 12b within the system.

The power plant 12a may include numerous sensors 46 and actuators 47 by which the plant controller 22 monitors operating conditions and controls the plant's operation. The plant controller 22 may communicate with numerous data resources 26, which may be located remotely to it and accessible over a communications network and/or contained locally and accessible over a local network. As illustrated, the schematic representation of the plant controller 22 includes several subsystems which have been delineated from each other by the several boxes. These subsystems or "boxes" have been separated mostly by function so to assist in description. However, it will be appreciated that separated boxes may or may not represent individual chips or processors or other individual hardware elements, and may or may not represent separated sections of computer program code executed within the plant controller, unless otherwise stated. Similarly, while the method 169 is broken into two major sections or blocks, this is for convenience and to assist with description. It will be appreciated that any or all of the separate boxes shown in FIG. 8 may be combined into one or more sections in the plant controller 22, as may any or all of the separate blocks or steps shown in FIG. 9.

The method 169 of FIG. 9 may begin, for example, with a control section 170 that receives or gathers present information and data for use (at step 171), which may include market data, operating data, and/or ambient data. Within the plant controller 22, a corresponding control module 110 may be arranged to request/receive this type of data from data resources 26 or any other suitable source. Control module 110 may also be configured to receive a target load 128 from dispatch authority 24 (though on an initial run, such a target load may not be available, and a predefined initial target load may be used). Ambient data may be received from remote or local data repositories and/or forecast services, and may be included as a component of data resources 26. Ambient data also may be gathered via ambient sensors deployed around power plant 12a, as well as received via a communication link with the dispatch authority 24. According to aspects of the present invention, ambient data includes historical, present, and/or forecast data that describe ambient conditions for power plant 12a, which, for example, may include air temperature, relative humidity, pressure, etc. Market data may be received from remote or local data repositories and/or forecast services, and may be included as a component of data resources 26. Market data may also be received via a communication link with dispatch authority 24. According to aspects of the present invention, market data includes historical, present, and/or forecast data that describe market conditions for power plant 12a, which, for example, includes energy sale price, fuel cost, labor cost, etc. Operating data also may be received from data repositories, and/or forecast services, and may be included as a component of data resources 26. Operating data may include data collected from multiple sensors 46 deployed within the power plant 12 and its plant components 49 that measure physical parameters relating to plant operation. Operating data may include historical, present, and/or forecast data, as well as a variety of process inputs and outputs.

As seen in FIG. 9, an initial setpoint for the power plant 12 may be determined, such as with a controls model 111 in the plant controller 22 of FIG. 8. For example, the controls model 111 may be configured to use thermodynamic and/or physical details of the power plant 12 and additional information, such as ambient data or market data or process data, to determine a value of an operating parameter for the power plant 12 (at step 172 of FIG. 9). In one instance, for example, the value of an operating parameter may be a value that would be required to achieve power output sufficient to meet a target load. The determined value may be used as an initial setpoint for the respective operating parameter of the power plant 12 (also step 172 of FIG. 9). It will be appreciated that examples of such operating parameters may include: fuel flow rate, firing temperature, a position for inlet guide vanes (if guide vanes are present), a steam pressure, a steam temperature, and a steam flow rate. A performance indicator then may be determined (at step 173 of FIG. 9) by using a performance model 112 of the plant controller 22. The performance indicator may provide an operating characteristic, such as efficiency, of the power plant 12. The performance model 112 may be configured to use thermodynamic and/or physical details of the power plant 12, as well as the setpoints determined by controls model 111, so to determine a value of an operating characteristic of the power plant 12. The performance model 112 may be configured to take into account additional information, such as ambient conditions, market conditions, process conditions, and/or other relevant information.

In addition, according to certain aspects of the present invention, an estimate may be determined of a life cycle cost (LCC) of the power plant 12 (at step 174 of FIG. 9), such as with a LCC model 113 that is included in the plant controller 22 of FIG. 8. The LCC model 113, which may be a computer program or the like, may be configured to use physical and/or cost information about the power plant 12, as well as setpoints from controls model 111, to determine an estimated life cycle cost of power plant 12. Life cycle cost may include, for example, a total cost, a maintenance cost, and/or an operating cost of power plant 12 over its service life. The LCC model 113 may additionally be configured to take into account the results of performance model 112 for enhanced accuracy. The LLC model 113 may therefore use the determined setpoints of controls model 111 and the operating characteristic from the performance model 112, as well as other information, as desired, to estimate the service life of the power plant 12, as well as how much it may cost to operate and/or maintain the power plant 12 during its service life. As noted above, the service life of a power plant may be expressed in hours of operation and/or number of starts, and a given power plant has an expected service life that may be provided by a manufacturer of the power plant. Thus, predefined values of expected service life may be used at least as a starting point for LCC model 113, and/or an enhancement module 114.

Using information from other embodiments of the invention, such as results from determining an initial setpoint, a performance indicator, and an estimated life cycle, an optimization problem may be solved for the power plant 12 (at step 175) as described below. Such an optimization problem may include a plurality of equations and variables, depending on a depth of analysis desired, and may include an objective function, which in embodiments may be a LCC-based objective function. The solution may include providing an enhanced or augmented operating parameter of the power plant 12, such as, for example, by minimizing a LCC-based objective function (also step 175). In embodiments, the solution of the optimization problem may be performed by an enhancement module 114 of the plant controller 22 of FIG. 8.

As is known from optimization theory, an objective function represents a characteristic or parameter to be optimized and may take into account many variables and/or parameters, depending on how the optimization problem is defined. In an optimization problem, an objective function may be maximized or minimized, depending on the particular problem and/or the parameter represented by the objective function. For example, as indicated above, an objective function expressing LCC according to embodiments would be minimized to produce at least one operating parameter that may be used to run the power plant 12 so as to keep LCC as low as feasible. An optimization problem for the power plant 12, or at least an objective function, may take into account such factors as power plant characteristics, site parameters, customer specifications, results from controls model 111, performance model 112, and/or LCC model 113, ambient condition, market condition, and/or process condition, as well as any additional information that might be suitable and/or desired. Such factors may be gathered into terms of an objective function, so that, for example, a LCC-based objective function includes maintenance cost and operation cost represent over time, where time is a prediction horizon based on an estimated component service life. It will be appreciated that complex objective functions and/or optimization problems may be used in implementations of the present invention, as each may include many or all of the various functions and/or factors that are described herein.

Maintenance cost, for example, may be determined by modeling parts of the power plant 12 to estimate wear based on various parameters, such as those already discussed. It will be appreciated that any part of the power plant 12 may be modeled for these purposes. In a practical application, however, the parts associated with fewer, larger portions, or fewer, select portions of the power plant 12 might be modeled, and/or constants or plug values might be used for some parts instead of modeling. Whatever level of detail is employed, minimization of such an LCC-based objective function is part of an optimization problem that may vary for a given power plant as a result of many factors, such as those provided above, and may include at least one enhanced or augmented operating parameter of the power plant 12, such as in accordance with minimizing LCC. In addition, those skilled in the art will recognize that at least one constraint may be imposed upon the optimization problem, such as a predefined up time and/or down time, a predefined upper and/or lower temperature at various locations in the power plant 12, a predefined torque, a predefined power output, and/or other constraints as may be desired and/or appropriate. Unless otherwise stated, it is within the purview of those skilled in the art to determine what constraints should be applied and in what manner for a given optimization problem. Further, those skilled in the art will recognize situations in which additional optimization theory techniques may be applied, such as adding a slack variable to allow a feasible solution to the optimization problem.

Known techniques may be employed, such as by enhancement module 114 (FIG. 8), to solve an optimization problem for operation of the power plant 12. For example, an integer programming, a linear, a mixed integer linear, a mixed integer nonlinear, and/or another technique may be used as may be suitable and/or desired. In addition, as seen in the example objective function, the optimization problem may be solved over a prediction horizon, providing an array of values for at least one operating parameter of the power plant 12. While enhancement or augmentation may be performed over a relatively short prediction horizon, such as 24 hours or even on the order of minutes, enhancement module 114 (FIG. 8) may employ a longer prediction horizon, such as up to an estimated service life of the power plant 12, depending on a depth of analysis desired. In embodiments, initial setpoints determined, such as by controls model 111 (FIG. 8), may be adjusted responsive to and/or as part of the solution of the optimization problem to yield an enhanced or augmented or optimized setpoint. In addition, iteration may be used with determining an initial setpoint, determining a value of a performance indicator, determining an estimated LCC cost, and enhancing or augmenting (at steps 172-175 of FIG. 9) to refine results and/or better enhance or augment control setpoints of the power plant 12.

As will be described, an offer curve section 180 may generate an offer curve or set of offer curves, an example of which was shown previous in relation to FIG. 7. In the plant controller 22, control information 115 from control module 110 and/or data resources 26 may be received (at step 181 of FIG. 9) by an offer curve module 120. According to certain embodiments, control information 115 includes: control setpoints, performance, ambient conditions, and/or market conditions. This information may also be known as "as run" information. In addition, an ambient condition forecast 121 and/or market condition forecast 122 may be received (at step 182). According to certain embodiments, a database 123 may be included and may store current information, "as run" information, and/or historical information locally, including any or all of ambient conditions, market conditions, power plant performance information, offer curves, control setpoints, and/or any other information which may be suitable. Database 123 may be used to provide information to simulate operation of the power plant 12 (at step 183), such as with an offline model 124 of the power plant 12.

Offline model 124 may include a model similar to controls model 111, but may also include additional modeling information. For example, offline model 124 may incorporate portions or entireties of controls model 111, performance model 112, LCC model 113, and/or additional modeling information. By running offline model 124 with setpoints and/or information from enhancing or augmenting LCC, output of offline model 124 may be used to determine estimated values for cost of power production for each time interval in a prediction horizon and for various values of power output of the power plant 12 to generate one or more offer curves 125 (at step 184) which may be sent or otherwise provided to dispatch authority 24 (at step 185). Offline model 124 may use any suitable information, such as historical, current, and/or forecast information, in determining estimated operating costs and/or conditions of the power plant 12. In addition, offline model 124 in embodiments may be tuned (at step 186), such as by a model tuning module 126. Tuning may include, for example, periodically adjusting parameters for offline model 124 based on information received and/or provided by other parts of the plant controller 22 to better reflect actual operation of the power plant 12 so as to better simulate operation of the power plant 12. Thus, for a given set of operating parameters, if plant controller 12 observes an actual process condition that differs from what offline model 124 had predicted, plant controller 12 may change offline model 124 accordingly.

In addition to the offer curves 125 from the power plant 12a, as illustrated, dispatch authority 24 may receive offer curves 125 from other power plants 12b under its control. Dispatch authority 24 may assess the offer curves 125 and may generate a dispatch schedule to accommodate load on power system 10. Dispatch authority 24 may additionally take into account forecasted ambient conditions, a load forecast and/or other information as may be appropriate and/or desired, which it may receive from various local or remote data resources 26 to which it has access. As illustrated in, the dispatch schedule produced by dispatch authority 24 includes a control signal for the power plant 12 that includes a target load 128, to which the plant controller 22 may respond as described above.

It will be appreciated that the inclusion of life-cycle costs considerations, as described herein, may serve to increase the scope and accuracy of the plant models used in the optimization process and, in doing this, enable enhancements to the procedure. Offer curves 125, as described above, may represent variable cost (measured in dollars per megawatt-hour versus power plant output in megawatts). Offer curves 125 may include an incremental variable cost offer curve and an average variable cost offer curve. As can be seen, embodiments of the present invention may provide accurate assessments of variable cost via their generated offer curves 125. Using embodiments of the present invention, incremental variable cost offer curves have been shown to predict very closely actual incremental variable cost curves, while average variable cost offer curve have been shown to predict very closely actual average variable cost curves. The accuracy of the offer curves generated by embodiments of the present invention indicates that the various models used in the plant controller 22 of FIG. 8 provides a suitably representative model for the purposes outlined.

Figure 10:
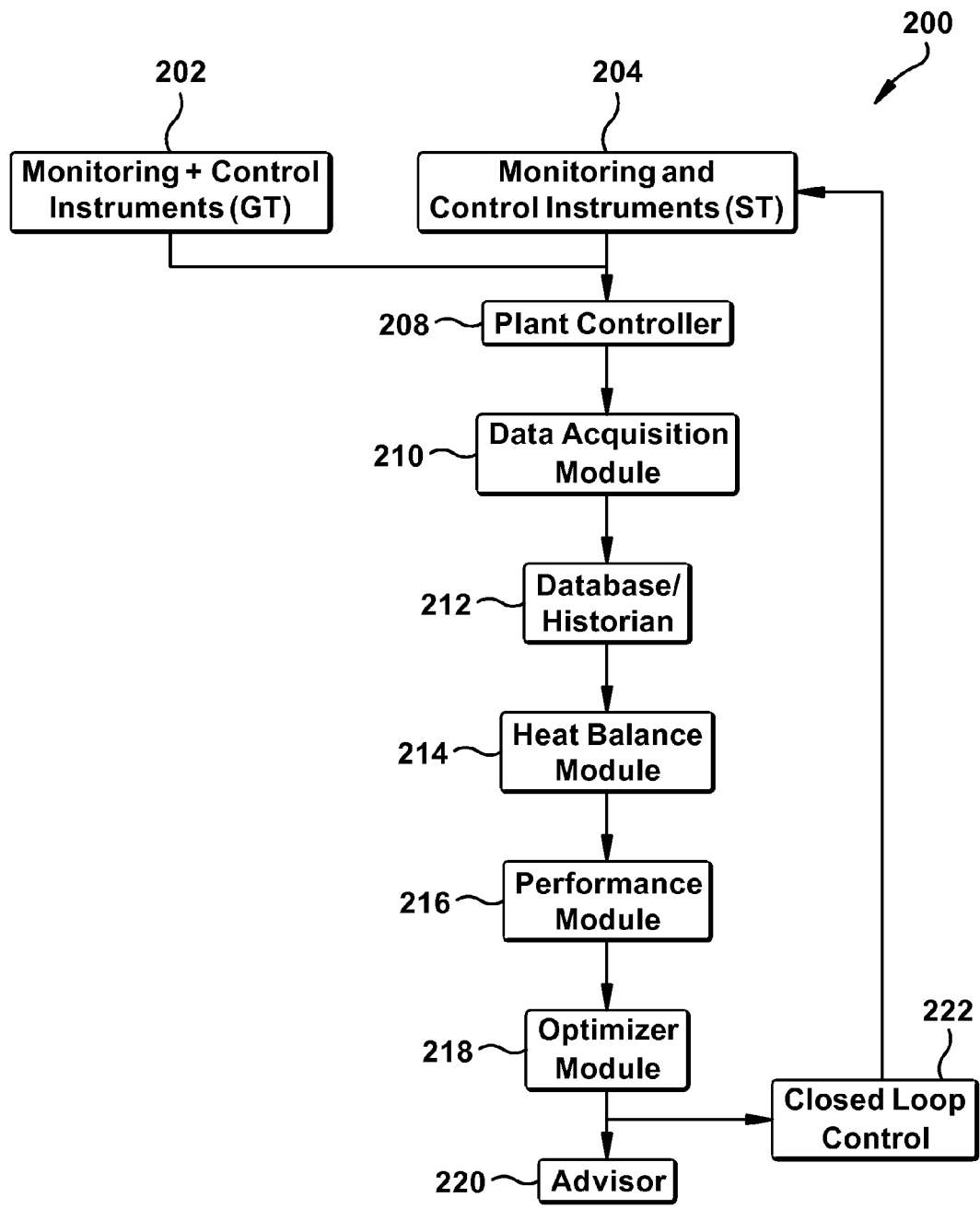
FIG. 10 illustrates a data flow diagram describing an architecture for a plant optimization system for a combined cycle power plant in accordance with aspects of the present invention.

Turning now to the FIGS. 10 through 12, other aspects of the present invention are described with reference to and inclusive of certain systems and methods provided above. FIG. 10 is a data flow diagram demonstrating an architecture for a plant optimization system 200 that may be used in a combined-cycle power plant having gas and steam turbine systems. In the embodiment provided, a system 200 includes monitoring and control instruments 202, 204, such as the sensors and actuators discussed above, associated with each of the gas turbine (202) and the steam turbine systems (204). Each of the monitoring and control instruments 202, 204 may transmit signals indicative of measured operating parameters to a plant controller 208. The plant controller 208 receives the signals, processes the signals in accordance with predetermined algorithms, and transmits control signals to monitoring and control instruments 202, 204 to affect changes to plant operations.

The plant controller 208 interfaces with a data acquisition module 210. The data acquisition model 210 may be communicatively coupled to a database/historian 212 that maintains archival data for future reference and analysis. A heat balance module 214 may receive data from data acquisition model 210 and database/historian 212 as requested to process algorithms that tunes a mass and energy balance model of the power plant to match measured data as closely as possible. Discrepancies between the model and the measured data may indicate errors in the data. As will be appreciated, a performance module 216 may use plant equipment models to predict the expected performance of major plant components and equipment. The difference between expected and current performance may represent degradation of the condition of plant equipment, parts, and components, such as, but, not limited to fouling, scaling corrosion, and breakage. According to aspects of the present invention, the performance module 216 may track degradation over time so that performance problems having the most significant effect on plant performance are identified.

As illustrated, an optimizer module 218 may be included. The optimizer module 218 may include a methodology for optimizing an economic dispatch of the plant. For example, according to embodiments, the power plant may be dispatched based on heat rate or incremental heat rate pursuant to the assumption that heat rate is equivalent to monetary resources. In an alternative scenario, in which the power plant includes an additional manufacturing process (not shown) for which steam is used directly (i.e., where the steam produced may be diverted from power generation in the steam turbine to another manufacturing use), it will be appreciated that the optimizer module 218 may solve an optimization problem wherein a component with a higher heat rate may be dispatched. For example, in certain situations, a demand for steam may outpace a demand for electricity or the electrical output may be constrained by electrical system requirements. In such cases, dispatching a lower efficiency gas turbine engine may allow greater heat to be recovered without raising electrical output in excess of a limit In such scenarios, the dispatching of the component with a higher heat rate is the economically optimized alternative.

The optimizer module 218 may be selectable between an online (automatic) and an offline (manual) mode. In the online mode, the optimizer 218 automatically computes current plant economic parameters such as cost of electricity generated, incremental cost at each level of generation, cost of process steam, and plant operating profit on a predetermined periodicity, for example, in real-time or once every five minutes. An offline mode may be used to simulate steady-state performance, analyze "what-if" scenarios, analyze budget and upgrade options, and predict current power generation capability, target heat rate, correction of current plant operation to guarantee conditions, impact of operational constraints and maintenance actions, and fuel consumption. The optimizer 218 calculates a profit optimized output for the power plant based on real-time economic cost data, output prices, load levels, and equipment degradation, rather than an output based on efficiency by combining plant heat balances with a plant financial model. The optimizer 218 may be tuned to match the degradation of each component individually, and may produce an advisory output 220 and/or may produce a closed feedback loop control output 222. Advisory output 220 recommends to operators where to set controllable parameters of the power plant so to optimize each plant component to facilitate maximizing profitability. In the exemplary embodiment, advisory output 220 is a computer display screen communicatively coupled to a computer executing optimizer module 218. In an alternative embodiment, advisory output is a remote workstation display screen wherein the workstation accesses the optimizer module 218 through a network. Closed feedback loop control output 222 may receive data from optimizer module 218 and calculates optimized set points and/or bias settings for the modules of system 200 to implement real-time feedback control.

Figure 11:
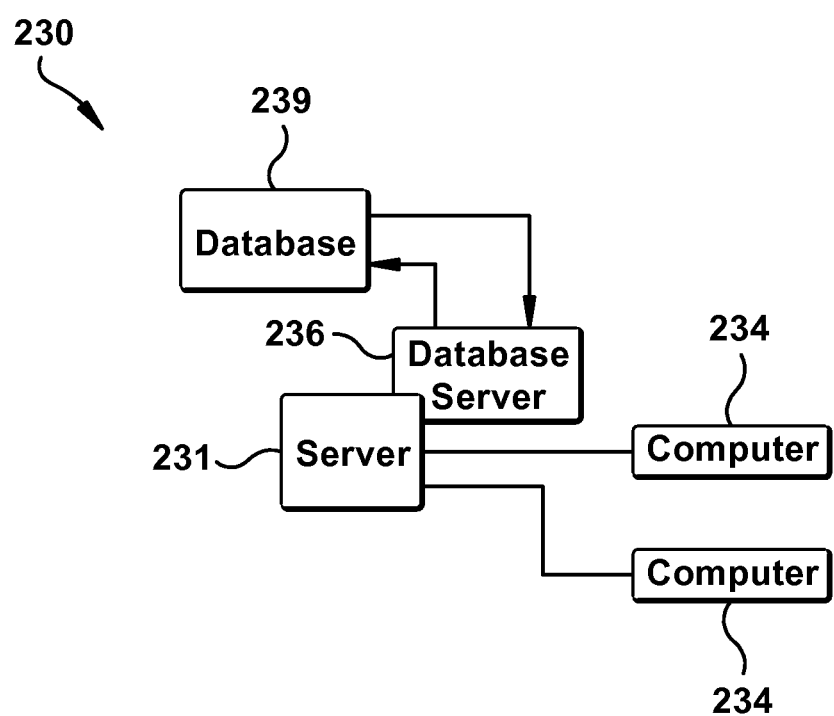
FIG. 11 provides a simplified block diagram of a computer system as may be employed with a real-time optimization system in accordance with aspects of the present invention.

FIG. 11 is a simplified block diagram of a real-time thermal power plant optimization system 230 that, according to aspects of the present invention, includes a server system 231, and a plurality of client sub-systems, also referred to as client systems 234, communicatively coupled to the server system 231. As used herein, real-time refers to outcomes occurring at a substantially short period after a change in the inputs affect the outcome, for example, computational calculations. The period represents the amount of time between each iteration of a regularly repeated task. Such repeated tasks may be referred to herein as periodic tasks or cycles. The time period is a design parameter of the real-time system that may be selected based on the importance of the outcome and/or the capability of the system implementing processing of the inputs to generate the outcome. Additionally, events occurring in real-time, occur without substantial intentional delay. In the exemplary embodiment, calculations may be updated in real-time with a periodicity of one minute or less. Client systems 234 may be computers that include a web browser, such that server system 231 is accessible to client systems 234 via the internet or some other network. Client systems 234 may be interconnected to the internet through many interfaces. Client systems 234 could be any device capable of interconnecting to the internet. A database server 236 is connected to a database 239 containing information regarding a plurality of matters, as described below in greater detail. In one embodiment, a centralized database 239, which includes aspects of data resources 26 discussed above, is stored on server system 231 and can be accessed by potential users at one of client systems 234 by logging onto server system 231 through the client systems 234. In an alternative embodiment database 239 is stored remotely from server system 231 and may be non-centralized.

According to aspects of the present invention, certain of the control methods discussed above may be developed for use in conjunction with system diagrams of FIGS. 10 and 11. For example, one method includes simulating power plant performance using a plant performance module of a software code segment that receives power plant monitoring instrument data. The data may be received through a network from a plant controller or a database/historian software program executing on a server. Any additional plant components, such as an inlet conditioning system or a HRSG duct firing system, may be simulated in a manner similar to that used to simulate power plant performance. Determining the performance of each plant component in the same manner allows the overall power plant to be treated as a single plant to determine optimize setpoints for the power plant rather than determining such setpoints for each component separately. Measurable quantities for each plant component may be parameterized so to express output or power plant efficiency on a component by component basis. Parameterizing plant equipment and plant performance includes calculating efficiency for components, such as, but not limited to, a gas turbine compressor, a gas turbine, a heat recovery steam generator (HRSG), a draft fan, a cooling tower, a condenser, a feed water heater, an evaporator, a flash tank, etc. Similarly, it will be appreciated that heat-rate and performance calculations may be parameterized and the resulting simultaneous equations solved in real-time, such that calculated results are available without intentional delay from the time each parameter was sampled. Solving parameterized simultaneous equations and constraints may also include determining a current heat balance for the power plant, determining an expected performance using present constraints on the operation of the power plant, such as, but not limited to spinning reserve requirements, electrical system demand, maintenance activities, freshwater demand, and component outages. Solving parameterized equations and constraints may also include determining parameters to adjust to modify the current heat balance such that a future heat balance equals the determined expected performance. In an alternative embodiment, solving parameterized simultaneous equations and constraints includes determining inlet conditions to the power plant, predicting an output of the power plant based on the determined inlet conditions and a predetermined model of the power plant, determining a current output of the power plant, comparing the predicted output to the determined output, and adjusting plant parameters until the determined output equals the predicted output. In exemplary embodiments, the method also includes correlating controllable plant parameters, plant equipment, and plant performance using parameterized equations, defining the objective of the optimization using an objective function that includes minimizing the heat rate of the power plant and/or maximizing the profit of the power plant, and defining the physically possible range of operation of each individual piece of equipment, and/or overall limits using constraints wherein the overall limits include maximum power production, maximum fuel consumption, etc.

Figure 12:
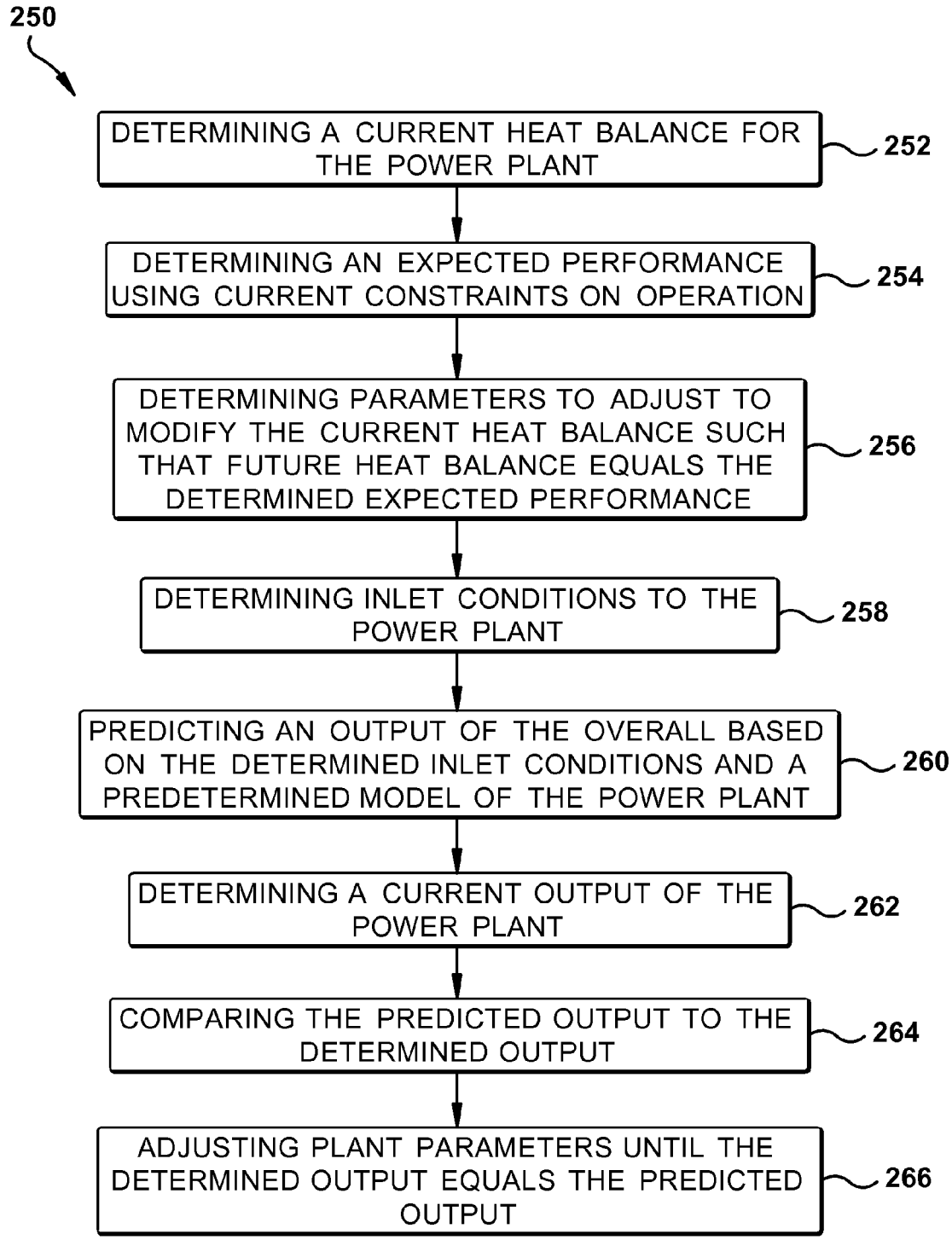
FIG. 12 is a flow diagram of an exemplary method for solving parameterized simultaneous equations and constraints in accordance with the present invention.

FIG. 12 a flow chart of an exemplary method 250 for solving parameterized simultaneous equations and constraints in accordance with the present invention. The method 250 includes determining (at 252) a current heat balance for the power plant, determining (at 254) an expected performance using current constraints on operation, and determining (at 256) parameters to adjust so to modify the current heat balance such that a future heat balance equals the determined expected performance. The method 250 also includes determining 258 inlet conditions to the power plant, predicting 260 an output of the power plant based on the determined inlet conditions and a predetermined model of the power plant, determining 262 a current output of the power plant, comparing 264 the predicted output to the determined output, and adjusting 266 plant parameters until the determined output equals the predicted output. It will be appreciated that the described method, and systems discussed in relation to the FIGS. 10 and 11, provide a cost-effective and reliable means for optimizing combined-cycle power plants.

Turning now to FIGS. 13 through 16, attention will be paid to the several flow diagrams and system configurations that illustrate control methodology according to certain aspects of the present invention. In general, according to an example embodiment, a control system for a thermal generating unit, such as the gas turbine system, or power plant may include first and second instances of a model that models the operation of the turbine, such as by utilizing physics-based models or mathematically modeling (e.g., transfer functions, etc.). The first model (which may also be referred to as the "primary model") may provide present operating parameters of the gas turbine system, which describe the turbines mode of operation and the operating conditions that correspond to it. As used herein, "parameters" refer to items that can be used to define the operating conditions of the turbine, such as, but not limited to, temperatures, pressures, gas flows at defined locations in the turbine, and compressor, combustor, and turbine efficiency levels, etc. Performance parameters may also be referred to as "model correction factors," referring to factors used to adjust the first or second models to reflect the operation of the turbine. Inputs to the first model may be sensed or measured and provided by an operator. In addition to current performance parameters, the method of the present invention may include receiving or otherwise obtaining information on external factors or disturbance variables, such as ambient conditions, that may affect the present or future operation of the gas turbine system.

The second model (also referred to as a "secondary model" or a "predictive model") is generated to identify or predict one or more operating parameters, such as controlled variables, of the gas turbine system, taking into consideration the present operating parameters, such as manipulated variables, and the one or more disturbance variables. Example operating parameters of the turbine include, but are not limited to, actual turbine operating conditions, such as, exhaust temperature, turbine output, compressor pressure ratios, heat rate, emissions, fuel consumption, expected revenues, and the like. Therefore, this second or predictive model may be utilized to indicate or predict turbine behavior at certain operating set points, performance objectives, or operating conditions that differ from present operating conditions. As used herein, the term "model" refers generally to the act of modeling, simulating, predicting, or indicating based on the output of the model. It is appreciated that, while the term "second model" is utilized herein, in some instances there may be no difference between the formulation of the first and second models, such that the "second model" represents running the first model with adjusted parameters or additional or different input.

Accordingly, by modeling the turbine operating behavior utilizing the second or predictive model that considers external factors and/or different operating conditions, turbine control can be adjusted to more efficiently operate under these different operating conditions or in light of the unanticipated external factors. This system therefore allows automated turbine control based on modeled behavior and operating characteristics. In addition, the described modeling system allows creating operator specified scenarios, inputs, operating points, operating objectives, and/or operating conditions to predict turbine behavior and operating characteristics at these operator specified conditions. Predicting such hypothetical scenarios allows operators to make more informed control and operating decisions, such as scheduling, loading, turn-down, etc. As used herein, the term "operating points" refers generally to operating points, conditions, and/or objectives, and is not intended to be limiting. Thus, an operating point may refer to an objective or setpoint, such as base load, turndown point, peak fire, and the like.

One example use of the described turbine modeling system includes adjusting turbine operation to satisfy grid compliance requirements while still operating at the most efficient levels. For example, regional grid authorities typically prescribe requirements that power generation plants be able to support a grid during frequency upsets. Supporting the grid during upsets involves increasing or decreasing turbine load under certain conditions, depending upon the grid state. For example, during an upset, a power plant is expected to increase its power generation output (e.g., by as much as 2%) to compensate for other supply deficiencies. Therefore, turbine operation typically constrains the base load point to allow for the turbine to be operated at a margined output level (also referred to as the "reserved margin") so that the increased load, if necessary, can be provided without incurring the additional maintenance factor associated with over firing. As one example, the reserved margin may be 98% of what base load would typically be, thus allowing increasing load to accommodate grid requirements (e.g., increasing 2%) without exceeding the 100% base load. However, unanticipated external factors, such as temperature, humidity, or pressure, can adversely impact turbine efficiency. As a day heats up, a turbine may not have that 2% reserve that it needs because heat has caused the turbine to operate less efficiently and the turbine cannot reach that 100% load as originally planned for. To compensate, conventional heat-rate curves cause operating the turbine in a more efficient state throughout the entire day in light of the possible machine efficiency loss (e.g., at 96%, etc.). The turbine modeling system described herein, however, allows modeling turbine behavior in real-time according to the current external factors (e.g., temperature, humidity, pressure, etc.), and thus controlling turbine operation to most efficiently operate given the current ambient conditions. Similarly, future turbine behavior can be predicted, such as to predict turbine behavior responsive to a day's heat fluctuation, allowing for turbine operation planning to achieve the most efficient and economically viable operation. As another example, power generation plants typically make decisions whether to shut gas turbines down at night or to simply reduce output levels (e.g., turn down). Turbine operating characteristics, such as emissions, exhaust temperature, and the like, impact this decision. Utilizing the turbine modeling system described herein, decisions can be made on a more intelligent basis, either before-hand or in real-time or near real-time. External factors and expected turbine operating parameters can be supplied to the second model to determine what the turbine operating characteristics would be. Thus, the modeled characteristics may be utilized to determine whether a turbine should be shut down or turned down, considering these characteristics (e.g., efficiency, emissions, cost, etc.).

As yet another example, a turbine modeling system may be utilized to evaluate the benefit of performing turbine maintenance at a given time. The turbine modeling system of the present invention may be utilized to model the operating characteristics of the turbine at its current capabilities based on current performance parameters. Then, an operator specified scenario can be generated that models the operating characteristics of the turbine if maintenance is performed (e.g., improving the performance parameter values to show an expected performance boost). For example, as turbines degrade over time, the performance parameters reflect machine degradation. In some instances, maintenance can be performed to improve those performance parameters and, thus, the operating characteristics of the turbine. By modeling or predicting the improved operating characteristics, a cost-benefit analysis can be performed to compare the benefit gained by performing the maintenance against the costs incurred.

Figure 13:
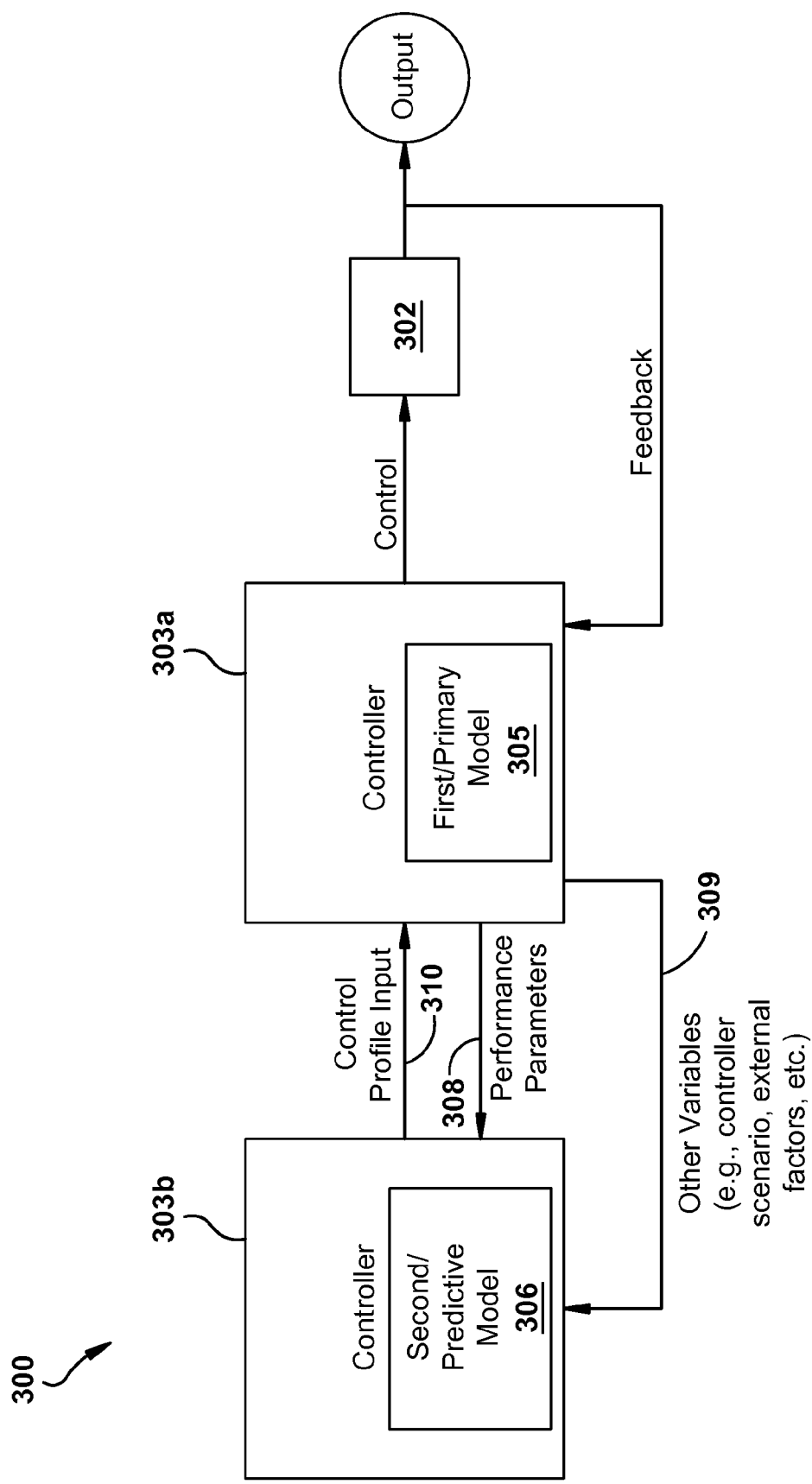
FIG. 13 shows a simplified configuration of a computer system according to control methodology of embodiments of the present invention.

FIG. 13 illustrates an exemplary system 300 that may be used to model turbine operating behavior. According to this embodiment, a power plant 302 is provided that includes a gas turbine having a compressor and a combustor. An inlet duct to the compressor feeds ambient air and possibly injected water to the compressor. The configuration of the inlet duct contributes to a pressure loss of ambient air flowing into the compressor. An exhaust duct for the power plant 302 directs combustion gases from the outlet of the power plant 302 through, for example, emission control and sound absorbing devices. The amount of inlet pressure loss and back pressure may vary over time due to the addition of components to the inlet and exhaust ducts, and due to clogging of the inlet and exhaust ducts.

The operation of the power plant 302 may be monitored by one or more sensors detecting one or more observable conditions, or operating or performance parameters, of the power plant 302. In addition, external factors, such as the ambient environment can be measured by one or more sensors. In many instances, two or three redundant sensors may measure the same parameter. For example, groups of redundant temperature sensors may monitor ambient temperature surrounding the power plant 302, the compressor discharge temperature, the turbine exhaust gas temperature, as well as other temperatures through the power plant 302. Similarly, groups of redundant pressure sensors may monitor the ambient pressure, and the static and dynamic pressure levels at the compressor inlet and outlet, the turbine exhaust, and other locations through the engine. Groups of redundant humidity sensors may measure ambient humidity in the inlet duct of the compressor. Groups of redundant sensors may also comprise flow sensors, speed sensors, flame detector sensors, valve position sensors, guide vane angle sensors, or the like that sense various parameters pertinent to the operation of power plant 302. A fuel control system may regulate the fuel flowing from a fuel supply to the combustor. The fuel controller may also select the type of fuel for the combustor.

As stated, "operating parameters" refer to items that can be used to define the operating conditions of the turbine system, such as temperatures, pressures, compressor pressure ratio, gas flows at defined locations in the turbine, load setpoint, firing temperature, as well as one or more conditions corresponding to the level of turbine or compressor degradation and/or the level of turbine or compressor efficiency. Some parameters are measured directly. Other parameters are estimated by the turbine models or are indirectly known. Still other parameters may represent hypothetical or future conditions and may be defined by the plant operator. The measured and estimated parameters may be used to represent a given turbine operating states. As used herein, "performance indicators" are operating parameters derived from the values of certain measured operating parameters, and represent a performance criteria for the operation of the power plant over a defined period. For example, performance indicators include heat rate, output level, etc.

As illustrated in FIG. 13, the system 300 includes one or more controllers 303a, 303b, which may each be a computer system having one or more processors that execute programs to control the operation of a power plant or generating unit 302. Although FIG. 13 illustrates two controllers, it is appreciated that a single controller 303 by be provided. According to a preferred embodiment, multiple controllers may be included so to provide redundant and/or distributed processing. The control actions may depend on, for example, sensor inputs or instructions from plant operators. The programs executed by the controller 303 may include scheduling algorithms, such as those for regulating fuel flow to the combustor, managing grid compliance, turndown, etc. The commands generated by the controller 303 can cause actuators on the turbine to, for example, adjust valves between the fuel supply and combustors so to regulate fuel flow, splits and type of fuel. Actuators may adjust inlet guide vanes on the compressor, or activate other control setpoints on the turbine. It will be appreciated that the controller 303 may be used to generate the first and/or the second models, as described herein, in addition to facilitating control of the power plant. The controller 303 may receive operator and/or present modeled output (or any other system output). As described previously, the controller 303 may include memory that stores programmed logic (e.g., software) and may store data, such as sensed operating parameters, modeled operating parameters, operating boundaries and goals, operating profiles, and the like. A processor may utilize the operating system to execute the programmed logic, and in doing so, also may utilize data stored thereon. Users may interface with the controller 303 via at least one user interface device. The controller 303 may be in communication with the power plant online while it operates, as well as in communication with the power plant offline while it is not operating, via an I/O interface. It will be appreciated that one or more of the controllers 303 may carry out the execution of the model-based control system described herein, which may include but not be limited to: sensing, modeling, and/or receiving operating parameters and performance parameters; generating a first power plant model reflecting current turbine operation; sensing, modeling, and/or receiving external factor information; receiving operator input, such as performance objectives, and other variables; generating a second power plant model reflecting operation in light of the additional data supplied; controlling present or future turbine operation; and/or presenting modeled operating characteristics. Additionally, it should be appreciated that other external devices or multiple other power plants or generating units may be in communication with the controller 303 via I/O interfaces. The controller 303 may be located remotely with respect to the power plant it controls. Further, the controller 303 and the programmed logic implemented thereby may include software, hardware, firmware, or any combination thereof.

The first controller 303a (which, as stated, may be the same or different controller as the second controller 303b) may be operable so to model the power plant 302 by a first or primary model 305, including modeling the turbine's current performance parameters. The second controller 303b may be operable to model turbine operating characteristics under different conditions via a second or predictive model 306. The first model 305 and the second model 306 may each be an arrangement of one or more mathematical representations of the turbine behavior. Each of these representations may rely on input values to generate an estimated value of a modeled operating parameter. In some circumstances, the mathematical representations may generate a surrogate operating parameter value that may be used in circumstances where a measured parameter value is not available. The first model 305 may then be utilized to provide a foundation and/or input to the second model 306 for determining turbine operating characteristics based on the current performance parameters of the power plant 302 and any other factors, such as external factors, operator supplied commands or conditions, and/or adjusted operating states. As described above, it is appreciated that "the second model 306" may simply be an instance of the same model as the first model 305 that considers additional or different inputs, such as external factors, different operating points, so to model different performance parameters or turbine behavior in light of the different inputs. The system 301 may further include an interface 307.

With continued reference to FIG. 13, a brief description of the interrelation between the system components is provided. As described, the first or primary model 305 models current performance parameters 308 of the power plant 302. These current performance parameters 308 may include, but are not limited to, conditions corresponding to the level of turbine degradation, conditions corresponding to the level of turbine efficiency (e.g., the heat rate or fuel to power output ratio), inlet guide vane angles, amount of fuel flow, turbine rotational speed, compressor inlet pressure and temperature, compressor exit pressure and temperature, turbine exhaust temperature, generator power output, compressor airflow, combustor fuel/air ratio, firing temperature (turbine inlet), combustor flame temperature, fuel system pressure ratios, and acoustic characteristics. Some of these performance parameters 308 may be measured or sensed directly from the turbine operation and some may be modeled based on other measured or sensed parameters. The performance parameters may be provided by the first model 305 and/or may be provided generally by the controller, such as if sensed and/or measured by the controller. Upon generating the first model 305, the performance parameters 308 (which are intended to refer to any turbine behavior provided by the model) are provided for generating the second or predictive model 306. Other variables 309 may be provided to the second model 306, depending upon the its intended use. For example, the other variables may include external factors, such as ambient conditions, that generally are uncontrollable and simply have to be accommodated for. In addition, the other variables 309 may include a controller specified scenario or operating point (e.g., a turbine operating point generated by or otherwise provided via the controller 303, such as turbine control based on the first model 305, etc.), measured inputs, which may be some or all of the same measured inputs as described as possibly being modeled by the first model 305. As described with reference to FIG. 14 below, an operator specified scenario 313 (e.g., one or more operator supplied commands indicating different turbine operating points or conditions) may also be supplied to the second model 306 via operator input. For example, as one exemplary use, the other variables 309 may include a controller specified scenario provided as one or more inputs to the second model 306 when attempting to model in real-time or near real-time current turbine behavior based on additional inputs, such as external factors or measured inputs. By utilizing a controller specified scenario of the first model in addition to one or more of these additional inputs, the expected real-time behavior of the power plant 302 can be modeled by the second model 306 taking into consideration these additional inputs, which may in turn be utilized to control the power plant 302 or adjust the first model 305 by control profile inputs 310.

Figure 14:
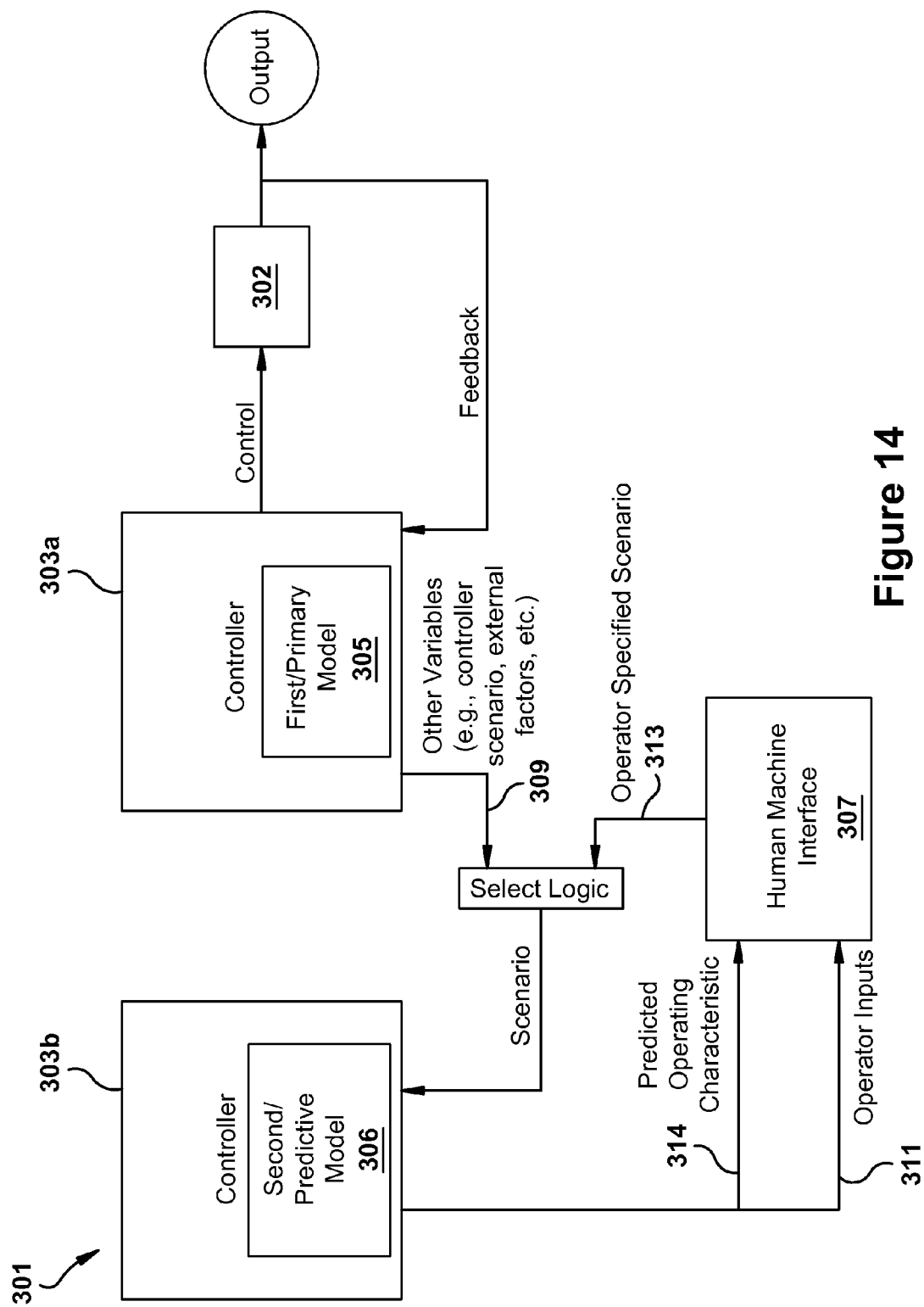
FIG. 14 illustrates an alternative configuration of a computer system in accordance with control methodology of embodiments of the present invention.

With reference to FIG. 14, an operator specified operating mode or scenario 313 is provided as one or more inputs via the interface 307 to the second or predictive model 306, which then models or predicts future turbine behavior under a variety of conditions. For example, an operator may supply commands to the interface 307 to generate a scenario in which the power plant 302 operates at a different operating point (e.g., different loads, configuration, efficiency, etc.). As an illustrative example, a set of operating conditions may be supplied via the operator specified scenario 313 that represent conditions that are expected for the following day (or other future timeframe), such as ambient conditions or demand requirements. These conditions then may be used by the second model 306 to generate expected or predicted turbine operating characteristics 314 for the power plant 302 during that time frame. Upon running the second model 306 under the operator specified scenario, the predicted operating characteristics 314 represent turbine behavior such as, but not limited to, base load output capability, peak output capability, minimum turndown points, emissions levels, heat rate, and the like. These modeled or predicted operating characteristics 313 may be useful when planning and committing to power-production levels, such as for day-ahead market planning and bidding.

Figure 15:
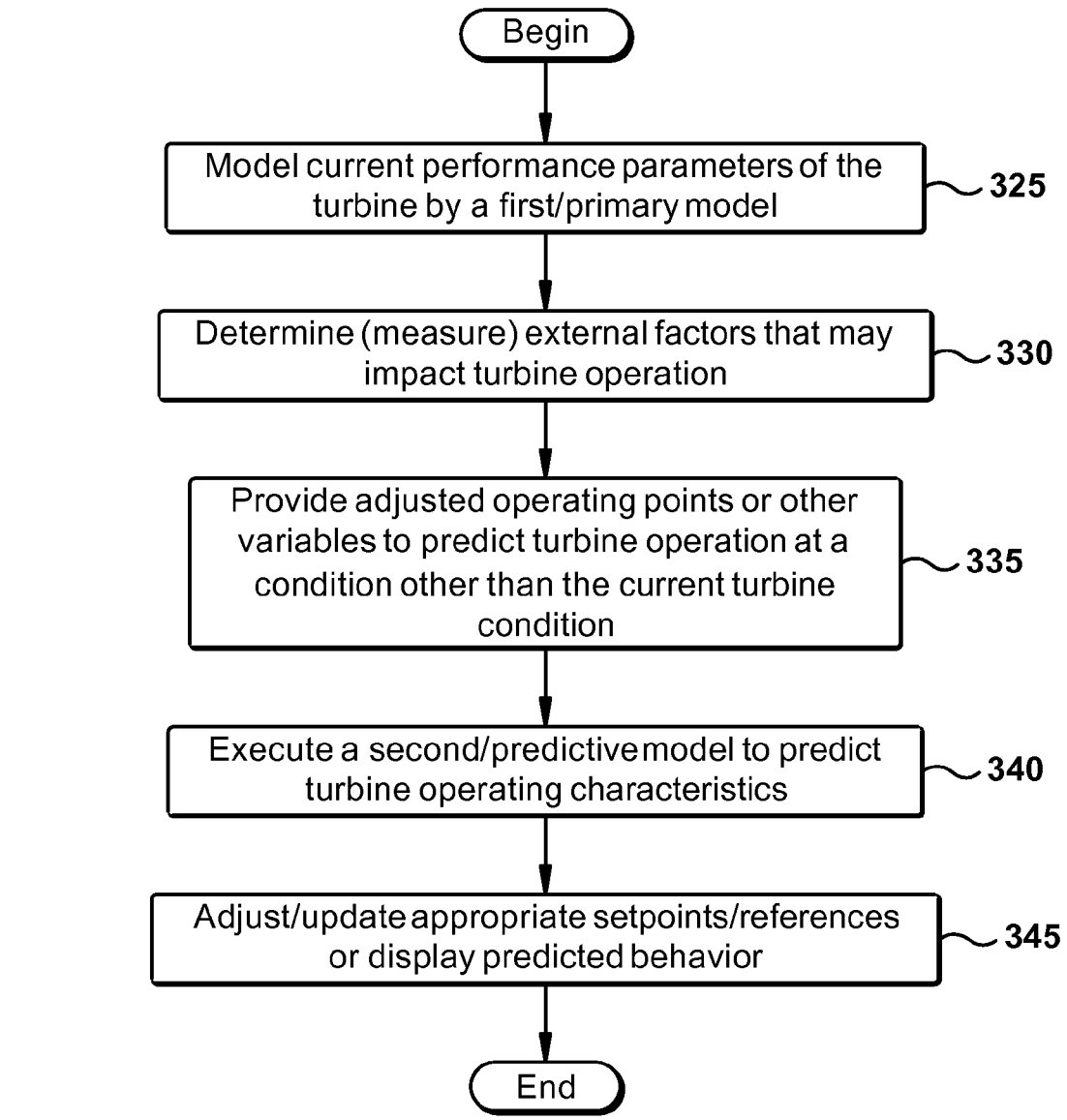
FIG. 15 is a flow diagram of an exemplary control methodology according to exemplary aspects of the present invention.

FIG. 15 illustrates an example method 320 by which an embodiment of the invention may operate. Provided is a flowchart of the basic operation of a system for modeling a turbine, as may be executed by one or more controllers, such as those described with reference to FIGS. 13 and 14. The method 320 may begin at step 325, in which the controller may model, by a first or primary model, one or more current performance parameters of a turbine according to the current operation. In order to generate this first model, the controller may receive as inputs to the model one or more operating parameters indicating the current operation of the turbine. As described above, these operating parameters may be sensed or measured and/or they may be modeled, such as may occur if the parameters cannot be sensed. The current operating parameters may include any parameter that is indicative of current turbine operation, as described above. It is appreciated that the methods and systems disclosed herein do not directly depend on whether the operating parameters are measured or modeled. The controller may include, for example, a generated model of the gas turbine. The model may be an arrangement of one or more mathematical representations of the operating parameters. Each of these representations may rely on input values to generate an estimated value of a modeled operating parameter. The mathematical representations may generate a surrogate operating parameter value that may be used in circumstances where a measured parameter value is not available.

At step 330, the controller may receive or otherwise determine one or more external factors that may impact current and/or future operation. As described above, these external factors are typically (but not required to be) uncontrollable, and therefore incorporating their influence in the second model is beneficial to generate the desired turbine control profile and/or operational behavior. External factors may include, but are not limited to, ambient temperature, humidity, or barometric pressure, as well as fuel composition and/or supply pressure, which may impact the turbine operational behavior. These external factors may be measured or sensed, may be estimated or otherwise provided manually by an operator (such as if the operator requests predicted behavior based on hypothetical scenarios or future conditions), and/or may be provided by third party information sources (e.g., weather services, etc.).

At step 335, the controller may receive adjusted operating points and/or other variables to predict turbine behavior at a condition different than the current turbine condition. Adjusted operating points may include, but are not limited, identifying the desired output level, such as if modeling the turbine at a reserved margin (e.g., 98% of base load), or if modeling the turbine at a peak load or during turndown, for example. Operating points may further include operating boundaries, such as, but not limited to, hot gas path durability (or firing temperature), exhaust frame durability, NOx emissions, CO emissions, combustor lean blow-out, combustion dynamics, compressor surge, compressor icing, compressor aero-mechanical limits, compressor clearances, and compressor discharge temperature. Thus, by providing these adjusted operating points or other variables, the operator may provide hypothetical scenarios for which the turbine model predicts the operating characteristics under those scenarios, which may be useful for controlling future operation of the turbine and/or for planning for future power generation and commitments.

Following step 335 is step 340, in which a second or predictive model of the turbine is generated based on the first model generated at step 325 and, optionally, the external factors and/or adjusted operating points or other variables provided at step 335. This second or predictive model thus may accurately indicate or predict operating parameters and, therefrom, performance indicators for the turbine during a future operating period.

Figure 16:
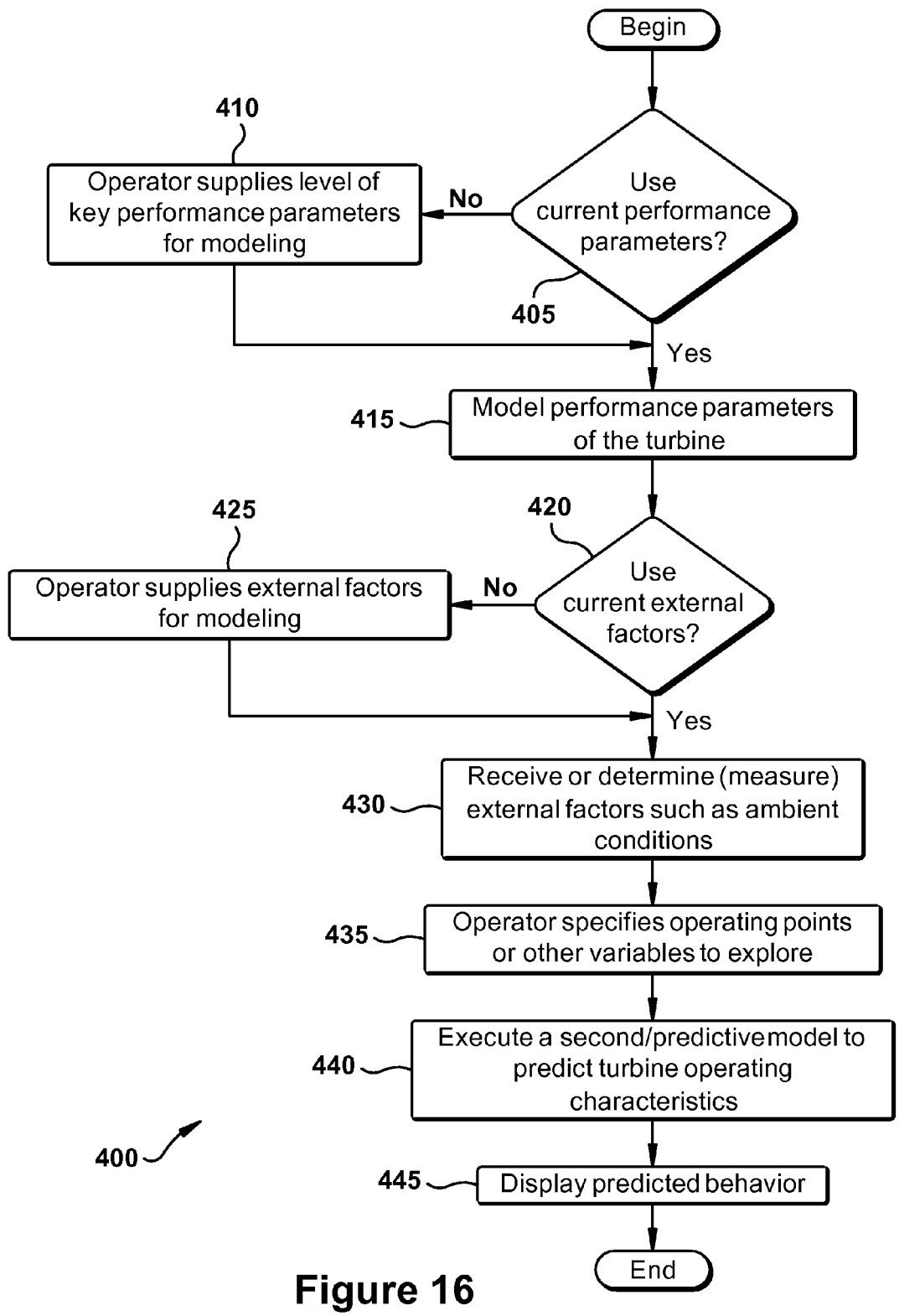
FIG. 16 is a flow diagram of an alternative control methodology according to exemplary aspects of the present invention.

At step 345, the modeled performance may be utilized to adjust current or future turbine operation and/or display to an operator the modeled performance. Accordingly, if adjusting current turbine operation, the turbine controller may receive the modeled performance parameters as inputs to alter a current control model (e.g., the first model) or a current control profile, such as by modifying various setpoints and/or references utilized for current turbine control. It is anticipated that this real-time or near real-time control of the turbine would be performed when the inputs to the second model generated at step 340 are representative of the current turbine conditions or current external factors. For example, real-time or near real-time adjustment at step 345 may be performed when the second model represents performance characteristics considering the current temperature, pressure, or humidity, and/or considering operating parameters or performance parameters of the turbine that more accurately represents turbine degradation and/or efficiency. FIG. 16 describes one example embodiment that may optionally receive operator specific inputs and generate predicted behavior under a different operating condition. The output of the model generated at step 340 may also be displayed or otherwise presented to an operator via an interface. For example, in one embodiment in which the operator provides hypothetical operating scenarios at step 335, the predicted turbine operating characteristics can be displayed for analysis and possible inclusion in future control or planning activities. Accordingly, the method 320 may end after step 345, having modeled the current performance parameters of the turbine by a first model, and then modeled the same turbine in consideration of additional external factors, adjusted operating points, or other additional data so to predict turbine operation based on this additional data.

FIG. 16 illustrates an example method 400 by which an alternative embodiment may operate. Provided is an example flowchart of the operation of a system for modeling a turbine, as may be executed by one or more controllers, such as described with reference to FIGS. 13 and 14. Method 400 illustrates use of the system 301 in which an operator may optionally supply additional variables to utilize the modeling capabilities to predict turbine behavior under hypothetical scenarios. The method 400 may begin at decision step 405, in which it is determined whether the turbine is to be modeled according to current turbine operating parameters and performance parameters, or if operator supplied parameters are to be considered when generating the model. For example, if the system is being utilized to predict hypothetical operating scenarios, then current performance parameters may not be needed as inputs to the model (assuming the model already reflects basic turbine operation and behavior). Accordingly, if it is determined at decision step 405 that current parameters are not to be utilized, then operations proceed to step 410 in which the operator supplies different performance parameters, allowing for modeling the turbine under a different operating point and in a different operating condition (e.g., in a more degraded state, at a different level of efficiency, etc.). Otherwise, the current performance parameters and/or operating parameters are utilized, such as is described with reference to step 325 of FIG. 15, and operations continue to step 415. At step 415, the controller may model, by a first or primary model, one or more performance parameters of a turbine either according to the operator supplied input from step 410 or the turbine's current operation. For example, if the model is generated based at least in part on operator supplied parameters at step 410, then the model generated at step 415 is representative of predicted turbine behavior under those performance parameters.

Following step 415 is decision step 420, in which it is determined whether subsequent modeling (e.g., the "second model" or the "predictive model") is to be based on current external factors, such as current temperature, pressure, or humidity, or on different external factors supplied by the operator. For example, in one scenario, the controller can model turbine operating behavior based on the additional data of one or more current external factors, which would allow further prediction of turbine behavior in light of the current conditions. In another scenario, however, the controller can be utilized to further model the turbine according to operator supplied conditions, which allows the predicting of turbine operating characteristics under various hypothetical scenarios. Accordingly, if it is determined at step 320 that operator supplied external factor data is to be considered when modeling, then operations continue to step 425. Otherwise, operations continue to step 430 utilizing current external factors. At step 430 the controller receives external factors to be considered when generating the second or predictive model, whether they are representative of the current state or hypothetical factors. Following step 430 are steps 435-445, which optionally permit consideration of different operating points, generating the predictive model based on the received data, and displaying the predicted behavior, respectively, in the same or similar manner as is described with respect to steps 325-345 of FIG. 15. The method 400 may end after step 445, having modeled turbine operating behavior optionally based on operator specified scenarios.

Accordingly, embodiments described herein allow utilizing turbine models to indicate turbine behavior and corresponding operating parameters of an actual turbine, in addition to predicting turbine behavior taking into consideration the current performance parameters and one or more external factors identified. These embodiments, therefore, provide a technical effect of indicating or predicting turbine behavior at operating points or operating conditions different than the current turbine operation. Yet an additional technical effect is provided that allows automated turbine control based at least in part on modeled behavior and operating characteristics, which may optionally include creating operator specified scenarios, inputs, operating points, and/or operating conditions to predict turbine behavior and operating characteristics at these operator specified conditions. A further technical effect realized includes the ability to predict various hypothetical scenarios allows operators to make more informed control and operating decisions, such as scheduling, loading, turn-down, etc. As will be appreciated, references made herein to step diagrams of systems, methods, apparatus, and computer program products according to example embodiments of the invention.

Figure 17:
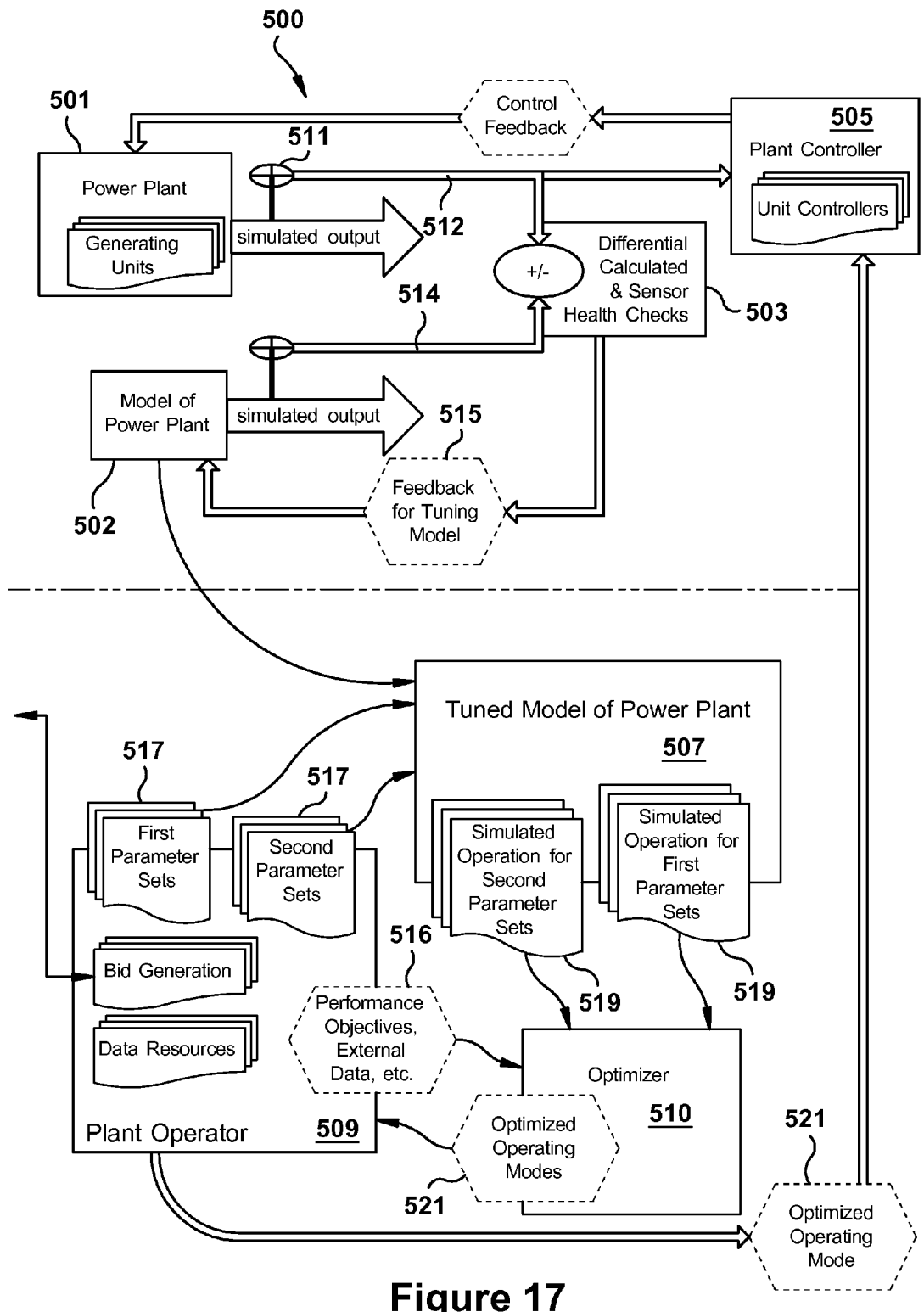
FIG. 17 is a flow diagram of an alternative control methodology according to exemplary aspects of the present invention.

Referring now to FIG. 17, a flow diagram 500 is illustrated in accordance with an alternative embodiment of the present invention. As will be appreciated, flow diagram 500 includes aspects that may be used as a control method or as part of a control system for facilitating the optimization of a power plant 501. The power plant 501 may be similar to any of those discussed in relation to FIGS. 2 and 3, though, unless otherwise restricted in the appended claims, it should be appreciated that the present invention may also be used in relation to other types of power plants. In a preferred embodiment, the power plant 501 may include a plurality of thermal generating units that generate electricity sold within a power system market, such as the one discussed in relation to FIG. 1. The power plant 501 may include many possible types of operating modes, which, for example, include the different ways in which thermal generating units of the plant are engage or operated, the output level of the plant, the ways in which the plant reacts to changing ambient conditions while satisfying a load requirements, etc. It will be appreciated that the operating modes may be described and defined by operating parameters that regard physical properties of particular aspects of the operation of the power plant 501. As further illustrated in FIG. 17, the present invention may include a power plant model 502. The power plant model 502 may include a computerized representation of the power plant that correlates process inputs and outputs as part of a simulation meant to mimic operation of the plant. As shown, the present invention further includes a tuning module 503; a plant controller 505; a tuned power plant model 507; a plant operator module 509; and an optimizer 510, each of which will be discussed individually below.

The power plant 501 may include sensors 511 that measure operating parameters. These sensors 511, as well as the operating parameters that they measure, may include any of those already discussed herein. As part of the present method, the sensors 511 may take measurements of operating parameters during an initial, current, or first period of operation (hereinafter, "first operating period"), and those measurements may be used to tune a mathematical model of the power plant, which, as discussed below, then may be used as part of an optimization process for controlling the power plant 501 in an improved or optimized manner of operation during a subsequent or second period of operation (hereinafter "second operating period"). The measured operating parameters may themselves be used to evaluate plant performance or be used in calculations to derive performance indicators that relate specific aspects of the power plant's operation and performance. As will be appreciated, performance indicators of this type may include heat rate, efficiency, generating capacity, as well as others. Accordingly, as an initial step, operating parameters that are measured by the sensors 511 during the first operating period may be used as (or used to calculate values for) one or more performance indicators. As used herein, such values for performance indicators (i.e., those that are based on measured values of operating parameters) will be referred to herein as "measured values". The measurements of the operating parameters and/or the measured values for the performance indicators, as shown, may be communicated 512 to both the plant controller 505 and the tuning module 503. The tuning module 503, as discussed in more detail below, may be configured to calculate feedback from a data reconciliation or tuning process for use in tuning the power plant model 502 so to configure the tuned power plant model 507.

The power plant model 502, as discussed, may be a computerized model that is configured to simulate the operation of the power plant 501. Pursuant to the present method, the power plant model 502 may be configured to simulate power plant operation that corresponds to the first operating period of the power plant 501. To achieve this, the power plant model 502 may be supplied information and data concerning the operating parameters of the first operating period. While this information may include any of the operating parameters measured during the first operating period, it will be appreciated that the input data for the power plant model 502 may be limited to a subset of the operating parameters measured. In this manner, the power plant model 502 then may be used to calculated values for selected operating parameters that were excluded from the input data set. More specifically, the power plant model may be supplied input data for the simulation that includes many of the values measured for the operating parameters, but from which certain measured values for selected operating parameter are omitted. As an output, the simulation may be configured to predict a simulated value for the selected operating parameter. The present method then may use the simulated values to predict values for the performance indicators. In this case, these values for the performance indicators will be referred to herein as the "predicted values". In this manner, the measured values for the performance indicators that were determined directly from measured power plant operating parameters may have corresponding predicted values. As illustrated, the predicted values for the performance indicators may be communicated 514 to the tuning module 503.

The tuning module 503 may be configured to compare the corresponding measured and predicted values for the performance indicators so to determine a differential therebetween. As will be appreciated, thusly calculated, the differential reflects an error level between actual performance (or measurements thereof) and performance simulated by the power plant model. The power plant model 502 may be tuned based on this differential or feedback 515. In this manner, the tuned power plant model 507 is configured. The tuned power plant model 507, which may also be referred to as an offline or predictive model, then may be used to determine optimized operating modes for a subsequent period of operation by simulating proposed or possible operating modes. The simulations may include estimations or forecasts about future unknown operating conditions, such as ambient conditions. As will be appreciated, the optimization may be based upon one or more performance objectives 516 in which a cost function is defined. As illustrated, the performance objectives 516 may be communicated to the optimizer 510 through the plant operator module 509.

The process of tuning the plant model may be configured as a repetitive process that includes several steps. As will be appreciated, according to certain embodiments, the power plant model 502 may include algorithms in which logic statements and/or parameterized equations correlate process inputs (i.e., fuel supply, air supply, etc.) to process outputs (generated electricity, plant efficiency, etc.). The step of tuning the power plant model 502 may include adjusting one of the algorithms in the power plant model 502, and then simulating the operation of the power plant 501 for the first operating period using the adjusted power plant model 502 so to determine the effect the adjustment had. More specifically, the predicted value for the performance indicator may be recalculated to determine the effect that the adjustment to the power plant model had on the calculated differential. If the differential turns out to be less using the adjusted power plant model 502, then the power plant model 502 may be updated or "tuned" so to include that adjustment going forward. It further will be appreciated that the power plant model 502 may be constructed with multiple logic statements that include performance multipliers used to reflect changes in the way the power plant operates under certain conditions. In such cases, tuning the power plant model 502 based on the calculated differential may include the steps of: a) making adjustments to one or more of the performance multipliers; b) simulating the operation of the power plant for the first operating period with the power plant model 502 having the adjusted performance multiplier; and c) recalculating the predicted value for the performance indicator using the power plant model 502 as adjusted by the performance multiplier so to determine if the recalculation results in reduced differential. These steps may be repeated until an adjustment made to one of the performance multipliers results in reducing the differential, which would indicate that the model is more accurately simulating actual performance. It will be appreciated that the performance multiplier, for example, may relate to expected performance degradation based upon accumulated hours of operation of the plant. In another example, where the performance indicator comprises a generating capacity, the step of tuning the power plant model 502 may include recommending adjustments to factors based on a differential between a measured generating capacity and a predicted generating capacity. Such adjustments may include changes that ultimately result in the predicted generating capacity substantially equaling the measured generating capacity. Accordingly, the step of tuning the power plant model 502 may include modifying one or more correlations within the power plant model 502 until the predicted or simulated value for a performance indicator substantially equals (or is within a margin of) the measured value for the performance indicator.

Once tuned, the method may then use the tuned model 507 to simulate proposed operation of the power plant. According to certain embodiments, a next step of the present method includes determining which simulated operation is preferable given defined performance objectives 516. In this manner, optimized modes of operating the power plant may be determined According to a preferred embodiment, the process of determining an optimized operating mode may include several steps. First, multiple proposed operating modes may be selected or chosen from the many possible ones. For each of the proposed operating modes, corresponding proposed parameter sets 517 may be generated for the second operating period. As used herein, a parameter set defines values for multiple operating parameters such that, collectively, the parameter set defines or describes aspects of a particular mode of operation. As such, the proposed parameter sets may be configured to describe or relate to many of the possible operating modes of the power plant 501, and may be configured as input data sets for tuned power plant model 507 for simulating operation. Once the operating parameters are generated and organized into the proposed parameter sets, the tuned power plant model 507 may simulate operation of the power plant 501 pursuant to each. The optimizer 510 then may evaluate the results of the simulated operation 519 for each of the proposed parameter sets 517. The evaluation may be made pursuant to the performance objectives defined by the plant operator and the cost functions defined therein. The optimization process may include any of the methods described herein.

Cost functions defined by the performance objectives may be used to evaluate an economic performance of the simulated operation of the power plant 501 over the second operating period. Based on the evaluations, one of the proposed parameter sets may be deemed as producing simulated operation that is preferential compared to that produced by the other proposed parameter sets. According to the present invention, the mode of operation that corresponds to or is described by the proposed parameter set producing the most preferable simulated operation is designated as the optimized operating mode. Once determined, as discussed in more below, the optimized operating mode may be passed along to a plant operator for consideration or communicated to the plant controller for automated implementation.

According to a preferred embodiment, methods of the present invention may be used to evaluate specific modes of operation to determine and recommend preferable alternatives. As will be appreciated, the generating units of the power plant 501 are controlled by actuators having variable setpoints that are controllably linked to a control system, such as plant controller 505. The operating parameters of the power plant 501 may be classified into three categories: manipulated variables, disturbance variables, and controlled variables. The manipulated variables regard controllable process inputs that may be manipulated via actuators so to control the controlled variables, whereas, the disturbance variables regard uncontrollable process inputs that affect the controlled variables. The controlled variables are the process outputs that are controlled relative to defined target levels. Pursuant to preferred embodiments, the control method may include receiving forecasted values for the disturbance variables for the second operating period (i.e., the period of operation for which an optimized mode of operation is being calculated). The disturbance variables may include ambient conditions, such as ambient temperature, pressure, and humidity. In such cases, the proposed parameter sets generated for the second operating period may include values for the disturbance variables that relate to the forecasted values for the disturbance variables. More specifically, the generated values for each ambient condition parameter may include a range of values for each of the ambient condition parameters. The range, for example, may include a low case, medium case, and high case. It will be appreciated that having multiple cases may allow a plant operator to plan for best/worst case scenarios. The forecasted values may include likelihood ratings that correspond with the different cases, which may further assist the operator of the plant to plan for different operating contingencies and/or hedge against losses.

The step of generating the proposed parameter sets may include generating target levels for the controlled variables. The target levels may be generated so to correspond to competing or alternative operating modes of the power plant 501, and may include operator input. Such operator input may be prompted by the plant operator module 509. According to a preferred embodiment, such target levels may include a desired output level for the power plant 501, which may be based on likely output levels given past usage patterns for the plant. As used herein, "output level" reflects a load level or level of electricity generated by the power plant 501 for commercial distribution during the second operating period. The step of generating the proposed parameter sets may include generating multiple cases where the output level remains the same or constant. Such a constant output level may reflect a base load for the plant or a set of generating units. Multiple target levels may be generated where each corresponds to a different level of engagement from each of the generating units and these may be drawn toward likely operating modes given historic usage. The method may then determine the most efficient operating mode given the known constraints. Additionally, the proposed parameter sets may be generated so that the disturbance variables maintain a constant level for the multiple cases generated for each target level. The constant level for the disturbance variables may be based upon forecasted values that were received. In such cases, according to one aspect of the present invention, the step of generating the proposed parameter sets includes generating multiple cases wherein the manipulated variables are varied over ranges so to determine an optimized operating mode for achieving a base load level given the forecasted or expected ambient conditions. According to exemplary embodiments, the cost function is defined as a plant efficiency or a heat rate, or may include a more direct economic indicator, such as operating cost, revenue, or profit. In this manner, the most efficient method of controlling the power plant 501 may be determined in situations where a base load is known and disturbance variables may be predicted with a relatively high level of accuracy. The optimized operating mode determined by the present invention in such cases may be configured so to include a specific control solution (i.e., specific setpoints and/or ranges therefore for the actuators that control the manipulated variables of the power plant) that might be used by the plant controller 505 to achieve more optimal function. Calculated in this manner, the control solution represents the optimized operating mode for satisfying a defined or contracted target load given the values forecasted for the various disturbance variables. This type of functionality may serve as an interday or inter-market period optimization advisor or check that analyzes ongoing operation in the background for the purposes of finding more efficient operating modes that still satisfy previously fixed load levels. For example, as the market period covered by the previous dispatch bidding progresses, ambient conditions become known or, at least, the level of confidence in prediction them accurately increases over what was estimated during the bidding process. Given this, the present method may be used to optimized control solutions for meeting the dispatched load given the more certain knowledge of the ambient conditions. This particular functionality is illustrated in FIG. 17 as the second parameter sets 517 and the simulated operation 519 related to the second parameter sets 517. In this manner, the optimization process of the present invention may also include a "fine-tuning" aspect whereby simulation runs on the tuned power plant model 507 advise on more efficient control solutions, which may then be communicated to and implemented by the plant controller.

Another aspect of the present invention involves its usage for optimizing fuel purchases for the power plant 501. It will be appreciated that power plants typically make regular fuel purchases from fuel markets that operates in a particular manner. Specifically, such fuel markets are typically operated on a prospective basis in which power plants 501 predict the amount of fuel needed for a future operating period and then make purchases based on the prediction. In such systems, power plants 501 seek to maximize profits by maintaining low fuel inventories. Power plants 501, though, regularly purchase extra fuel amounts so to avoid the costly situation of having an inadequate supply of purchased fuel to generate the amount of power the plant contracted to provide during the dispatch process. This type of situation may occur when, for example, changing ambient conditions results in less efficient power generation than predicted or the power plants true generating capacity is overestimated. It will be appreciated that several aspects of the present application already discussed may be used to determine an optimized mode of operation and, using that, calculate a highly accurate prediction for the fuel supply needed. That is, the present optimization processes may provide a more accurate prediction regarding plant efficiency and load capabilities, which may be used to estimate the amount of fuel needed for a future operating period. This enables plant operators to maintain a tighter margin on fuel purchases, which benefits the economic performance of the plant.

The present invention, according to an alternative embodiment, includes a method for optimizing plant performance in which a prediction horizon is defined and used in the optimization process. As will be appreciated, a prediction horizon is a future period of operation, which is divided into regularly repeating intervals for the purposes of determine an optimized mode of operation for an initial time interval of the prediction horizon. Specifically, the power plant's operation is optimized by optimizing performance over the entire prediction horizon, which is then used to determine an optimized mode of operation for the initial time interval. As will be appreciated, the process is then repeated so to determine how the power plant should be operated during the next time interval, which, as will be appreciated, becomes the initial time interval relative to that next repetition of the optimization cycle. For this subsequent optimization, the prediction horizon may remain the same, but is redefined relative what is now defined as the initial time interval. This means that the prediction horizon is effectively pushed forward into the future by an additional time interval each repetition. As already mentioned, a "proposed parameter set" refers to a data set that includes values for multiple operating parameters and thereby defines or describes one of the possible operating modes for the power plant 501. Pursuant to a preferred embodiment, the process of determining the optimized operating mode in cases involving a prediction horizon may include one or more of the following steps. First, multiple proposed horizon parameter sets are generated for the prediction horizon. As used herein, a "proposed horizon parameter set" includes a proposed parameter set for each of the time intervals of the prediction horizon. For example, a 24 hour prediction horizon may be defined as including 24 1-hour time intervals, meaning that the proposed horizon parameter set includes proposed parameter sets for each of the 24 time intervals. As a next step, the proposed horizon parameter sets are used to simulate operation over the prediction horizon. Then, for each of the simulation runs, the cost function is used to evaluate an economic performance so to determine which of the proposed horizon parameter sets represents the most favorable or, as used herein, an "optimized horizon simulation run". According to exemplary embodiments, the operating mode described within the optimized horizon simulation run for the initial time interval of the prediction horizon may then be designated as the optimized operating mode for the period of operation that corresponds to the initial time interval. The optimization process then may be repeated for subsequent time intervals. The present invention may include receiving forecasted values for the disturbance variables for each of the time intervals defined within the prediction horizon. The proposed horizon parameter sets then may be generated so that the proposed parameter set that corresponds to each of the time interval includes values for the disturbance variables that relate to the forecasted values received for the disturbance variables.

As will be appreciated, the proposed horizon parameter sets may be generated so to cover a range of values for the disturbance variables. As before, that range may include multiple cases for each of the disturbance variables, and may include high and low values that represent, respectively, cases above and below the forecasted values. It will be appreciated that in accordance with any of the described embodiments, the steps of simulating modes of operation and determining therefrom optimized operating modes may be repeated and configured into a repetitive process. As used herein, each repetition is referred to as an "optimization cycle". It will be appreciated that each repetition may include defining a subsequent or next period of operation for optimization. This subsequent period may occur just after the period of operation optimized by the previous cycle or may include a period of operation that corresponds to a future period, as may be the case, for example, when the present method is used for the purposes of preparing dispatch bids or advising as to the economic impact of alternative maintenance schedules.

The steps of tuning the power plant model 502 may be repeated so to update the tuned power plant model 507. In this manner, a tuned power plant model 507 that reflects a recent tuning may be used with optimization cycles so to produce more effective results. According to alternative embodiments, the optimization cycle and the cycle of tuning the power plant model 502 may be disconnected relative to the each other such that each cycles according to its own schedule. In other embodiments, the power plant model 502 may be updated or tuned after a predefined number of the repetitions of the optimization cycle. The updated tuned power plant model 507 then is used in subsequent optimization cycles until the predefined number of repetitions occur so to initiate another tuning cycle. In certain embodiments, the tuning cycle occurs after each optimization cycle. According to alternative embodiments, the number of optimization cycles that initiate a tuning of the power plant model 502 is related to the number of time intervals of the prediction horizon.

The present invention, as stated, may optimize the operation of power plants 501 according to performance objectives, which may be defined by the plant operator. According to preferred embodiments, the present method is used to economically optimize operation of the power plant. In such cases, the performance objectives include and define a cost function that provides the criteria for the economic optimization. Pursuant to exemplary embodiments, the simulated operation for each of the proposed parameter sets includes, as an output, predicted values for selected performance indicators. The cost function may include an algorithm correlating the predicted values for the performance indicators to an operating cost or some other indication of economic performance. Other performance indicators that may be used in this manner, for example, include a power plant heat rate and/or a fuel consumption. According to alternative embodiments, simulation outputs include predicted values for hot gas path temperatures for one or more of thermal generating units of the power plant 501, which may be used to calculate a consumed component life cost. This cost reflects a predicted degradation cost associated with the hot gas path components that results from the simulated operation. The cost function may further include an algorithm correlating predicted values for the performance indicators to an operating revenue. In such cases, the operating revenue may then be compared to the operating cost so to reflect a net revenue or profit for the power plant 501. The present method may further include the step of receiving a forecasted price for electricity sold within the market for the period being optimized, and the selected performance indicators may include an output level of electricity, which then may be used to calculate expected operating revenue for the upcoming period of operation. In this manner, the present method may be used to maximize economic return by comparing operating costs and revenue.

As will be appreciated, performance objectives may further be defined to include selected operability constraints. According to certain alternative embodiments, the present method includes the step of disqualifying any of the proposed parameter sets that produce simulated operation violating any one of the defined operability constraints. Operability constraints, for example, may include emission thresholds, maximum operating temperatures, maximum mechanical stress levels, etc., as well as legal or environmental regulations, contractual terms, safety regulations, and/or machine or component operability thresholds and limitations.

The present method, as already mentioned, includes generating proposed parameter sets 517 that describe alternative or possible operating modes of the power plant 501. As illustrated, the proposed parameter sets 517 may be generated in the plant operator module 509 and may include input from a plant manager or human operators. Broadly speaking, the possible operating modes may be considered competing modes for which simulation is performed so to determine the mode of operation that best satisfies performance objectives and anticipated conditions. According to exemplary embodiments, these alternative operating modes may be selected or defined several ways. According to a preferred embodiment, the alternative operating modes include different levels of output for the power plant 501. Output level, as used herein, relates to the level of electricity generated by the power plant 501 for commercial distribution within the market during a defined market period. The proposed parameter sets may be configured to define multiple cases at each of the different output levels. Several output levels may be covered by the proposed parameter sets, and the ones chosen may be configured to coincide with a range of possible outputs for the power plant 501. It will be appreciated that the range of possible output levels may not be linear. Specifically, because of the multiple generating units of the power plant and the scalability limitations related thereto, the proposed parameter sets may be grouped or concentrated at levels that are more achievable or preferable given the particular configuration of the power plant 501.

As stated, each of the competing operating modes may include multiple cases. For instances where the competing operating modes are defined at different, the multiple cases may be chosen so to reflect a different manner by which the output level is achieved. Where the power plant has multiple generating units, the multiple cases at each output level may be differentiated by how each of thermal generating units is operated and/or engaged. According to one embodiment, the several generated cases are differentiated by varying the percentage of the output level provided by each of the generating units. For example, the power plant 501 may include a combined-cycle power plant 501 in which thermal generating units include gas and steam turbines. Additionally, the gas and steam turbines may be, respectively, augmented by an inlet conditioning system, such as a chiller, and a HRSG duct firing system. As will be appreciated, the inlet conditioning system, for example, may be configured for cooling inlet air of the gas turbine so to boost its generating capacity, and the HRSG duct firing system may be configured as a secondary heat source to the boiler so to boost the generating capacity of the steam turbine. According to this example, the thermal generating units include the gas turbine or, alternatively, the gas turbine boosted by the inlet conditioning system; and the steam turbine or, alternatively, the steam turbine boosted by the HRSG duct firing system. The multiple cases covered by the proposed parameter sets then may include instances where these particular thermal generating units are engaged in different ways while still satisfying the different output levels that were chosen as competing operating modes. The simulated operation may then be analyzed to determine which reflects an optimized operating mode pursuant to a defined criteria.

According to an alternative embodiment, the proposed parameter sets may be drawn toward different operating modes to calculate economic benefits of maintenance operations. To achieve this, one of the competing operating modes may be defined as one in which the maintenance operation is assumed to be completed before the period of operation chosen for optimization. This operating mode may be defined to reflect a performance boost that is expected to accompany the completion of this maintenance operation. An alternative operating mode may defined as being one in which the maintenance operation is not performed, meaning that the simulation of the multiple cases for this operating mode would not include the expected performance boost. The results from the simulations may then be analyzed so that the economic effects are better understood, and the multiple cases may be used to show how differing scenarios (such as fluctuations in fuel prices or unexpected ambient conditions) affect the outcome. As will be appreciated, using the same principles, the competing operating modes may include a turndown mode and a shutdown mode.

The present invention further includes different ways in which the optimization process may be used by power plant operators to automate processes and improve efficiency and performance. According to one embodiment, as illustrated in FIG. 17, the method includes the step of communicating a calculated optimized mode of operation 521 to the plant operator module 509 for approval by a human operator before the power plant 501 is controlled pursuant to the optimized operating mode. In an advisor mode, the present method may be configured to present alternative modes of operation and the economic ramifications associated with each so to bring such alternatives to the attention of the plant operator. Alternatively, the control system of the present mention may function to automatically implement optimized solutions. In such cases, the optimized operating mode may be electronically communicated to the plant controller 505 so to prompt control of the power plant 501 in a manner consistent therewith. In power systems that include an economic dispatch system for distributing electricity generation among a group of power plants 501, the optimization method of the present invention may be used for generating more accurate and competitive bids for submittal to the central authority or dispatcher. As one of ordinary skill in the art will appreciate, the optimization features already described may be used to generate bids that reflect true generating capacity, efficiency, heat rate, while also providing useful information to plant operators regarding the economic trade-offs the power plant is making in future market periods by choosing between different operating modes. Increased accuracy of this type and the additional analysis helps ensure that the power plant remains competitive in the bid process, while also minimizing the risk of highly unprofitable dispatch results due to unforeseen contingencies.

FIGS. 18 through 21 illustrate exemplary embodiments of the present invention that relate to turndown and/or shutdown operation of a power plant. The first embodiment, as illustrated in flow diagram 600 of FIG. 18—which may be referred to as a "turndown advisor—teaches methods and systems for simulating and optimizing a turndown level for the power plant during a defined or selected period of operation ("selected operating period"). In preferred embodiments, the present method is used with power plants having multiple gas turbines, which may include combined cycle plants having multiple gas turbines and one or more steam turbines. The tuned power plant model may be used to determine an optimized minimum load for operating the power plant at a turndown level during the selected operating period. As previously stated, an "optimized" operating mode may be defined as one that is deemed or evaluated as preferable over one or more other possible operating modes. An operating mode for the purpose of these embodiments may include an assignment of certain power generating units to fulfill a load commitment or other performance objectives, as well as the physical configurations of the generating units within a power plant. Such functionality means that in arriving at an optimized or enhanced operating mode, the present invention may consider a multitude of plant combinations that take into account the different turndown configurations of each generating unit as well as configurations which shutdown one or more of the units, while others remain operating at a full or turndown level. The method may further take into account other constraints such as operability constraints, performance objectives, cost functions, operator input, and ambient conditions in its calculation of an enhanced turndown operating mode for the power plant that enhances performance and/or efficiency. The present method, as described herein and/or delineated in the appended claims, may take into account present and predicted ambient conditions for the optimization of the turndown operating mode, as well as changing the unit configuration and/or control so to dynamically adjust operation of one or more of the generating units when actual conditions deviate from those predicted. According to a preferred embodiment, such performance is defined, at least in part, as the one that minimizes the level of fuel usage or consumption over the proposed turndown operating period.

The turndown advisor of the present invention may take into account several factors, criteria, and/or operating parameters in arriving at an optimized or enhanced turndown solution and/or recommended turndown action. According to preferred embodiments, these include, but are not limited to, the following: gas turbine engine operating boundaries (i.e., temperature, aerodynamic, fuel splits, lean blowout, mechanical, and emission limits); gas turbine and steam turbine control systems; minimum steam turbine throttle temperature; the maintenance of the vacuum seal on the condenser as well as other factors, such as the configuration or lineup of systems or their control. One of the outputs of the optimization may include a recommended operating mode and configuration of the power plant or a plurality of plants, wherein the plurality includes different types of power plants including wind, solar, reciprocating engine, nuclear, and/or other types. It will be appreciated that the recommended operating mode may be automatically initiated or electronically communicated to a plant operator for approval. Such control may be implemented via off-premise or on-premise control systems that are configured to control the operation of the generating units. Additionally, in situations where the power plant includes multiple gas turbine engines, the output of the present method may include identifying which of the gas turbines should continue operating and which should be shutdown during the turndown period, which is a process that is discussed in more detail in relation to FIG. 19. For each of the gas turbines that the advisor recommends for continued operation during the turndown period, the present method may further calculate a load level. Another output may include calculating the total load for the power plant during the turndown period, as well as the hourly target load profile based on the predicted ambient conditions, which, as stated, may be adjusted if conditions change. The present invention may also calculate the predicted fuel consumption and emissions of the power plant during the turndown operating period. The output of the disclosed method may include the operating lineup/configuration given the control setpoints available to the generating units and plant so to achieve the target generating levels more efficiently.

As discussed above, traders and/or plant managers (hereinafter "plant operators" unless distinguishing therebetween), who are not bound by preexisting contractual terms, typically bid their power plants on a prospective market, such as a day ahead market. As an additional consideration, plant operators are tasked with making sure adequate fuel supply is maintained so that the power plant is able to meet target or contracted generating levels. However, in many cases fuel markets operate prospectively such that advantageous pricing terms are available to power plants willing or able to commit to future fuel purchases in advance. More specifically, the further in advance the fuel is purchased, the more advantageous pricing. Given these market dynamics, for a power plant to achieve an optimized or high level of economic return, the plant operator must bid the plant competitively against other generating units so to utilize its generating capacity, while also estimating accurately the fuel required for future generating periods so that: 1) the fuel may be purchased in advance so to secure the lower pricing; and 2) a large fuel buffer is not needed so that a lean fuel inventory may be maintained. If done successfully, the plant operator secures better pricing by committing early to future fuel purchases, while, at the same time, not over-purchasing so that unnecessary and costly fuel reserves are needed, or under-purchasing so to risk a fuel supply shortfall.

Methods of the present invention may optimize or enhance the efficiency and profitability of power generating activities by specifying an IHR profile for a generating unit or plant's particular configuration, especially as these relate to the preparation of a dispatch bid so to secure generating market share. The present method may include specifying optimal generating allocation across multiple generating units within a power plant or across several plants. The present method may take into account the operating and control configurations available to those generating units, permutate the possible arrangements, and thereby achieve a bid that, if selected, enables the generation of power over the bid period at a reduced or minimized cost. In doing this, the present method may consider all applicable physical, regulatory and/or contractual constraints. As part of this overall process, the present method may be used to optimize or enhance turndown and shutdown operation for a power plant having multiple generating units. This procedure may include taking into account anticipated exogenous conditions, such as, for example, weather or ambient conditions, gas quality, reliability of the generating units, as well as ancillary obligations, such as steam generation. The present method may be used to enumerate IHR profiles for a plurality of generating units having multiple configurations, as well as control settings for the selected turndown configuration and then control for the anticipated exogenous conditions in the preparation of the plants dispatch bid.

One common decision for operators relates to whether turndown or shutdown the power plant during off-peak periods, such as overnight, when demand or load requirements are minimal. As will be appreciated, the outcome of this decision depends significantly on the plant operator's understanding of the economic ramifications related to each of these possible modes of operation. In certain cases, the decision to turndown the power plant may be readily apparent, while the optimal minimum load at which to maintain the power plant during the turndown period remains uncertain. That is, while the plant operator has made the decision to turndown the power plant over a certain period, the operator is unsure about the turndown operating points at which to run the several generating units of the power plant in the most cost-effective manner.

Figure 18:
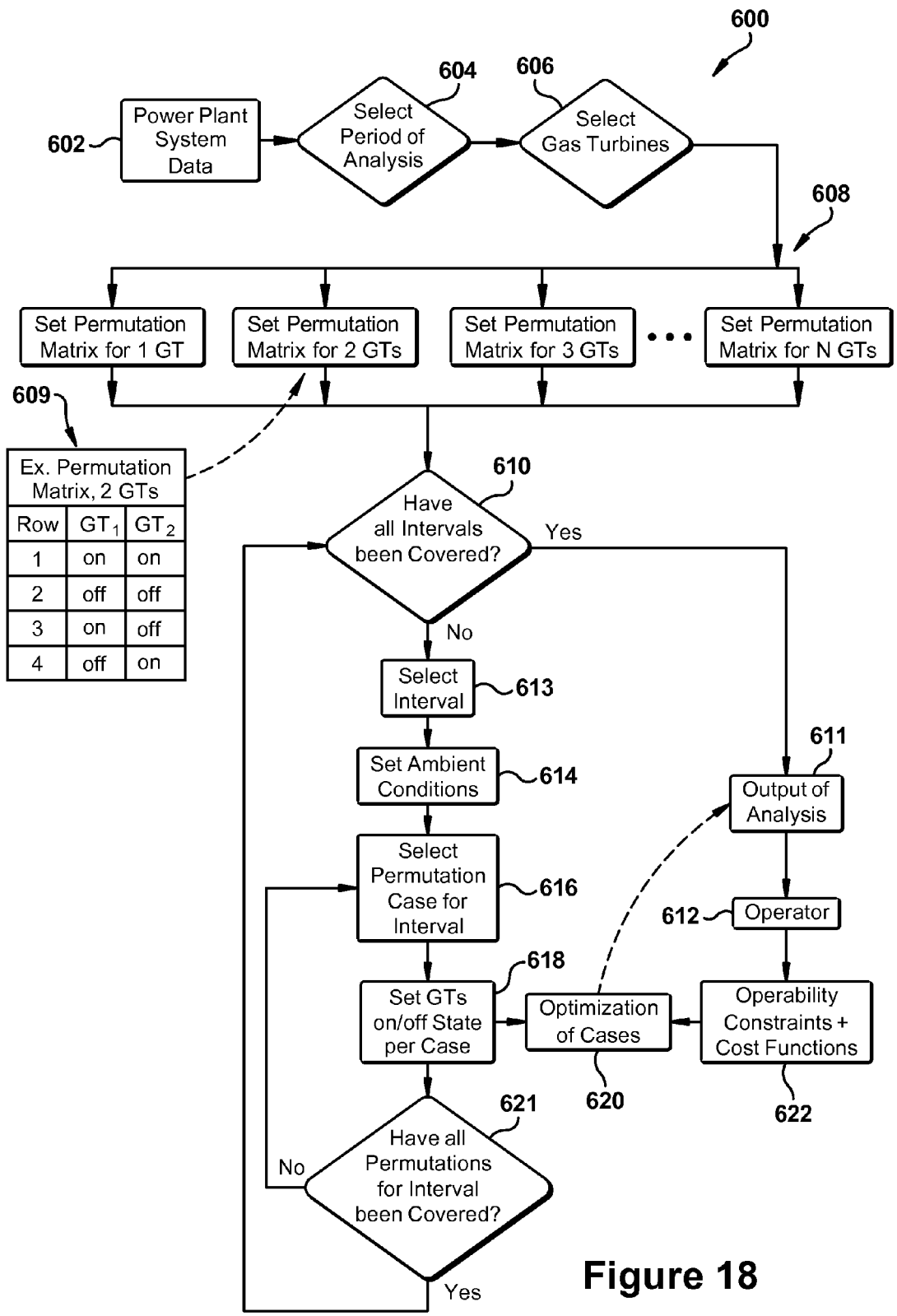
FIG. 18 illustrates a flow diagram in which an alternative embodiment of the present invention is provided that relates to the optimization of turndown operation.

The turndown advisor of FIG. 18 may be used as part of a process to recommend an optimal minimum load at which to operate the power plant. This advisor function may further recommend the best course of action for the power plant given a specific scenario of ambient conditions, economic inputs, and operating parameters and constraints. From these inputs the process may calculate the best operating levels and then may recommend the operating parameters necessary for control of the power plant, as will be discussed in more detail relative to FIG. 19. As will be appreciated, this functionality may result in several ancillary benefits, which include extended part life, more efficient turndown operation, improved economic performance, and improved accuracy in making fuel purchases.

As illustrated in flow diagram 600, certain information and relevant criteria may be gathered during the initial steps. At step 602, data, variables, and other factors associated with power plant systems and generating units may be determined. These may include any of the factors or information listed above. According to a preferred embodiment, an ambient profile may be received, which may include a forecast of ambient conditions during the selected operating period. Relevant emissions data may also be gathered as part of this step, which may include emissions limits as well as emissions to date for the power plant. Another factor includes data related to the potential sale of power and/or steam during the selected operating period. Other variables that may be determined as part of this step include the number of gas turbines at the plant, the combustion and the control systems for each of the gas turbines, as well as any other plant specific limitations that may be relevant to the calculations discussed below.

At step 604, the period of the proposed turndown operation (or "selected operating period") may be defined with particularity. As will be appreciated, this may be defined by an user or plant operation and include a selected operating period during which analysis of available turndown operating modes is desired. The definition of the selected operating period may include it anticipated length, as well as an user-specified start time (i.e., the time of the selected operating period will start) and/or a stop time (i.e., the time the selected operating period will end). This step may further include defining an interval within the selected operating period. The interval may be configured so to subdivide the selected operating period into a plurality of sequential and regularly spaced time periods. For the sake of the example provided herein, the interval will be defined as a hour and the selected operating period will be defined as including a plurality of the one-hour intervals.

At step 606, the number of the gas turbines involved in the optimization process for the selected operating period may be selected. This may include all of the gas turbines at the power plant or some portion thereof. The method may further include the consideration of other generating units at the power plant, such as steam turbine systems, and take into account their operational states during the selected operating period, as described in more detail below. The determination of the gas turbines involved in the turndown operation may include prompting for or receiving input from the plant operator.

At step 608, the present method may configure a permutation matrix given the number of gas turbines that were determined part of the proposed turndown operation during the selected operating period. As will be appreciated, the permutation matrix is a matrix that includes the various ways in which the plurality of gas turbine engines may be engaged or operated during the selected operating period. For example, as illustrated in the exemplary permutation matrix 609 of FIG. 18, the permutation matrix for the case of two gas turbines includes four different combinations that cover each of the possible configurations. Specifically, if the power plant includes a first and a second gas turbine, the permutation matrix includes the following rows or cases: a) both the first and second gas turbines are "on", i.e., are being operated in a turndown state of operation; 2) both the first and second gas turbines are "off", i.e., are being operated in a shutdown state of operation; 3) the first gas turbine is "on", and the second gas turbine is "off"; and 4) the first gas turbine is "off", and the second gas turbine is "on". As will be appreciated, only two permutations are possible in the case of a single gas turbine, while for three gas turbines, seven different rows or cases would be possible, each of which representing a different configuration as to how the three gas turbine engines may be engaged during a particular time frame in terms of the "on" and "off" operating states. In relation to FIG. 17 and the optimization process discussed in the text related thereto, each case or row of a permutation matrix may be thought of as representing a different or competing operating mode.

As part of the steps represented by steps 610, 613, 614, 616, and 618, the present method may configure proposed parameter sets for the proposed turndown operation. As stated, the selected operating period may be divided into the several hour-long time intervals. The process for configuring the proposed parameter sets may begin at step 610 where it is determined if each of the intervals has been addressed. If the answer to this inquiry is "yes," then the process, as illustrated, may continue to an output step (i.e., step 611) wherein the output of the turndown analysis is provided to an operator 612. If all of the intervals have not been covered, the process may continue to step 613 one of the intervals not already covered is selected. Then, at step 614, the ambient conditions may be set for the selected interval based upon received forecasts. Continuing to step 616, the process may select a row from the permutation matrix, and, at step 618, set the on/off state of the gas turbines pursuant to the particular row.

From there, the present method may continue along two different paths. Specifically, the method may continue to an optimization step represented by step 620, while also continuing to a decision step at step 621 where the process determines if all the permutations or rows of the permutation matrix have been covered for the selected interval. If the answer to this is "no," the process may loop back to step 616 where a different permutation row for the interval is selected. If the answer to this is "yes," then the process, as illustrated, may continue to step 610 so to determine if all of the intervals have been covered. As will be appreciated, once all of the rows of the permutation matrix for each interval have been addressed, the process may advance to the output step of step 611.

At step 620, the present method may optimize performance using the tuned power plant model, as previously discussed in FIG. 17. Consistent with this approach, multiple cases may be created for each of the competing operating modes, i.e., each of the rows of the permutation matrix for each of the intervals of the selected operating period. According to one preferred embodiment, the present method generates proposed parameter sets in which several operating parameters are varied so to determine the effect on a selected operating parameter or performance indicator. For example, according to this embodiment, the proposed parameter sets may include manipulating settings for an inlet guide vanes ("IGV") and/or an exhaust temperature of the turbine ("$T_{exh}$") so to determine what combination yields a minimized total fuel consumption rate for the power plant given the on/off state of the particular row and the ambient conditions forecast for the particular interval. As will be appreciated, operation that minimizes fuel consumption while satisfying the other constraints associated with turndown operation represents one manner by which turndown performance may be economically optimized or, at least, economically enhanced relative one or more alternative modes of operation.

As shown, according to certain embodiments, cost functions, performance objectives, and/or operability constraints may be used by the present invention during this optimization process. These may be provide via a plant operator, represented by step 622. These constraints may include limits as to the settings of the IGV, $T_{exh}$ limits, combustion boundaries, etc., as well as those associated with the other thermal systems that may be part of the power plant. For example, in power plants having combined cycle systems, the operation or maintenance of the steam turbine during the turndown operation may present certain constraints, such as, for example, the maintenance of a minimum steam temperature or condenser vacuum seal. Another operability constraint may include the necessary logic that certain ancillary systems may be affected in certain operating modes and/or certain subsystems are mutually exclusive, such as evaporative coolers and chillers.

Once the present method has cycled through the iterations given the intervals and the different rows of the permutation matrix, the results of the optimization may be communicated to the plant operator at step 611. These results may include an optimized case for each of the rows of the permutation matrix for each of the time intervals. According to one example, the output describes an optimized operation that is defined by a cost function of fuel consumption for the power plant for each of the permutations for each of the intervals. Specifically, the output may include the minimum fuel required (as optimized using the tuned power plant model pursuant to methods already described) for each of the possible plant configurations (as represented by the rows of the permutation matrix) for each interval, while also satisfying operability constraints, performance objectives, and anticipated ambient conditions. According to another embodiment, the output includes an optimization that minimizes a generating output level (i.e., megawatts) for the possible plant configurations for each of the intervals in the same way. As will be appreciated, certain of the possible plant configurations (as represented by permutations of the permutation matrix) may be unable to satisfy operability constraints no matter the fuel supply for generating output level. Such results may be discarded and not considered further or reported as part of the output of step 611.

Figure 19:
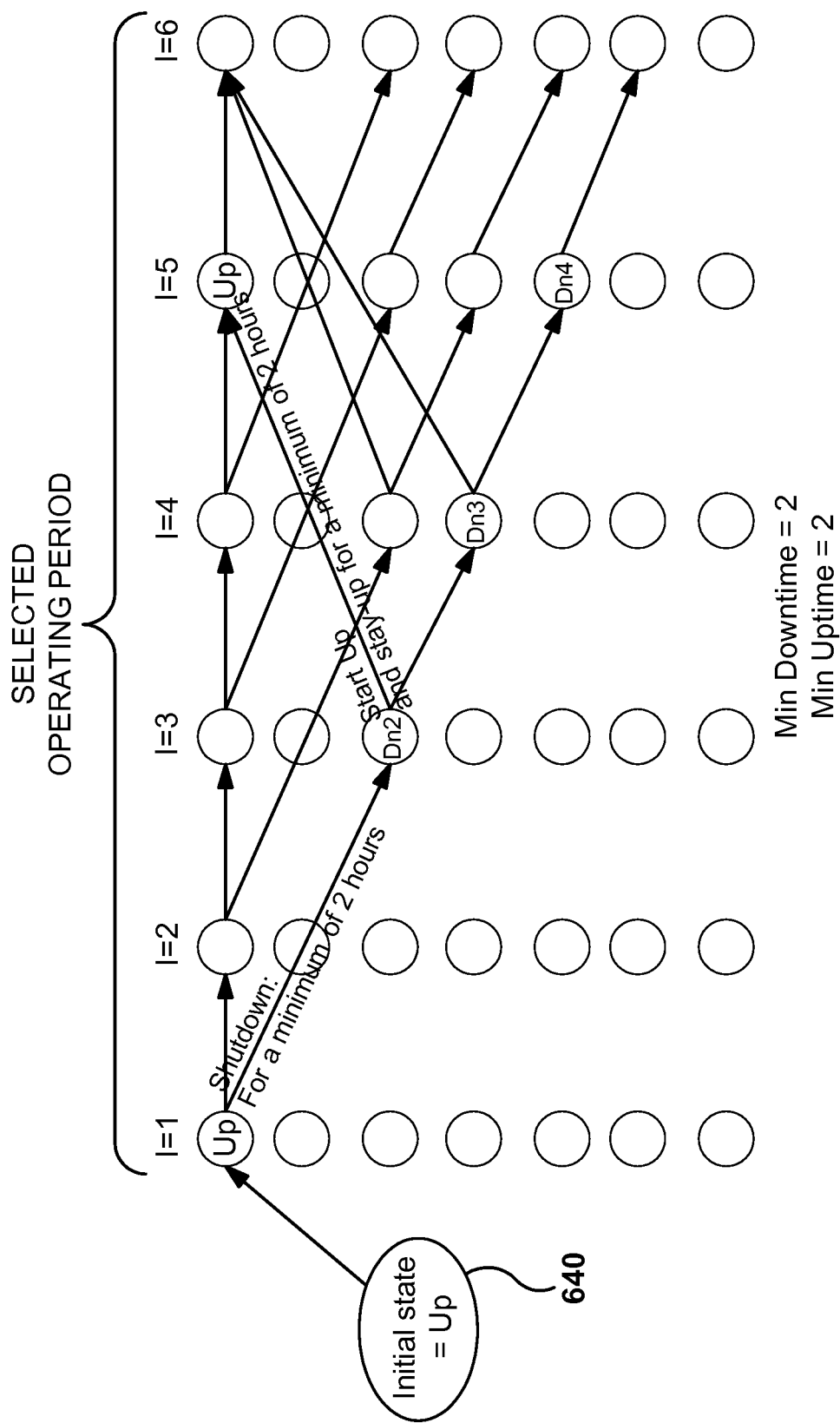
FIG. 19 illustrates a flow diagram in which an alternative embodiment of the present invention is provided that relates to the optimizing between turndown and shutdown operation.
Figure 20:
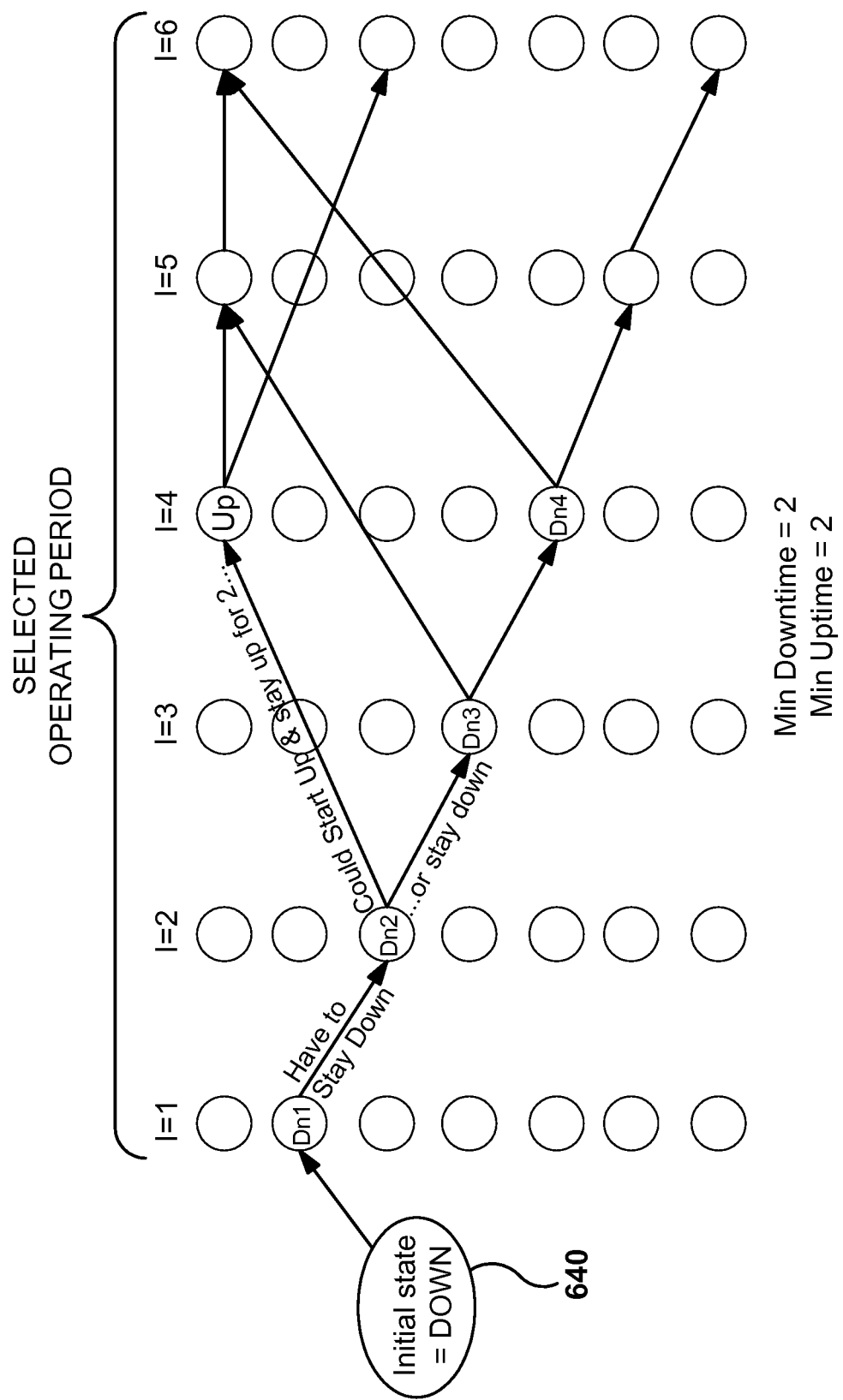
FIG. 20 is a diagram illustrating available operating modes of a gas turbine during a selected operating period having defined intervals according to aspects of an exemplary embodiment of the present invention.

FIGS. 19 and 20 graphically represent ways in which a gas turbine of a power plant may be operated over a selected operating period that includes defined intervals ("I" in the figures) given typical constraints associated with transient operation. As will be appreciated, transient operation includes switching a generating unit between different operating modes, including those involving transitioning to or from a shutdown mode of operation. As shown, multiple operational pathway or sequences 639 may be achieved depending upon: 1) an initial state 640 of the gas turbine; and 2) the decisions made regarding whether to change operating modes at the intervals where changes are possible given the transient operating constraints. As will be appreciated, the several different sequences 639 represent the multiple ways the generating unit may be operated over the intervals shown.

As will be appreciated, the output of the method of FIG. 18 may be used in conjunction with diagrams FIGS. 19 and 20 to configure proposed turndown operating sequences for the generating units of a power plant. That is, FIGS. 19 and 20 illustrate examples as to how a generating unit of a power plant may be engaged and how its operating modes modified as the time intervals pass, which may include instances when the generating unit's operating mode remains unchanged, instances when the unit's operating mode is modified from a shutdown operating mode to a turndown operating mode, as well as instances when the unit's operating mode is modified from a shutdown operating mode to a turndown operating mode. As illustrated, the transient operating constraint used in this example is that modifying an operating modes requires that the unit remain in the modified operating mode for a minimum of at least two of the intervals. The many sequences (or pathways) by which the generating unit arrives at the last interval represents the possible turndown operating sequences available to the unit given the transient operating constraints.

As will be appreciated, the analytical results from FIG. 18—i.e., the optimized turndown operation for each of the matrix permutations—may be used to select from the possible turndown operating sequences, a plurality of preferred cases, which may be referred to as proposed turndown operating sequences. Specifically, given the results of the method described in relation to FIG. 18, the proposed turndown operation sequences may be chosen from cases of turndown operation that satisfy plant performance objectives and constraints, while also optimizing performance according to a selected cost function (such as MW output or fuel consumption). The considerations illustrated in FIGS. 19 and 20 represent a way of determining whether turndown operating sequences are attainable given transient operating constraints. That is, the proposed turndown operating sequences arrived at by of the combined analysis of FIGS. 18 through 20 are operating sequences that comport with temporal limitations associated with transitioning an unit from one operating mode to another.

Figure 21:
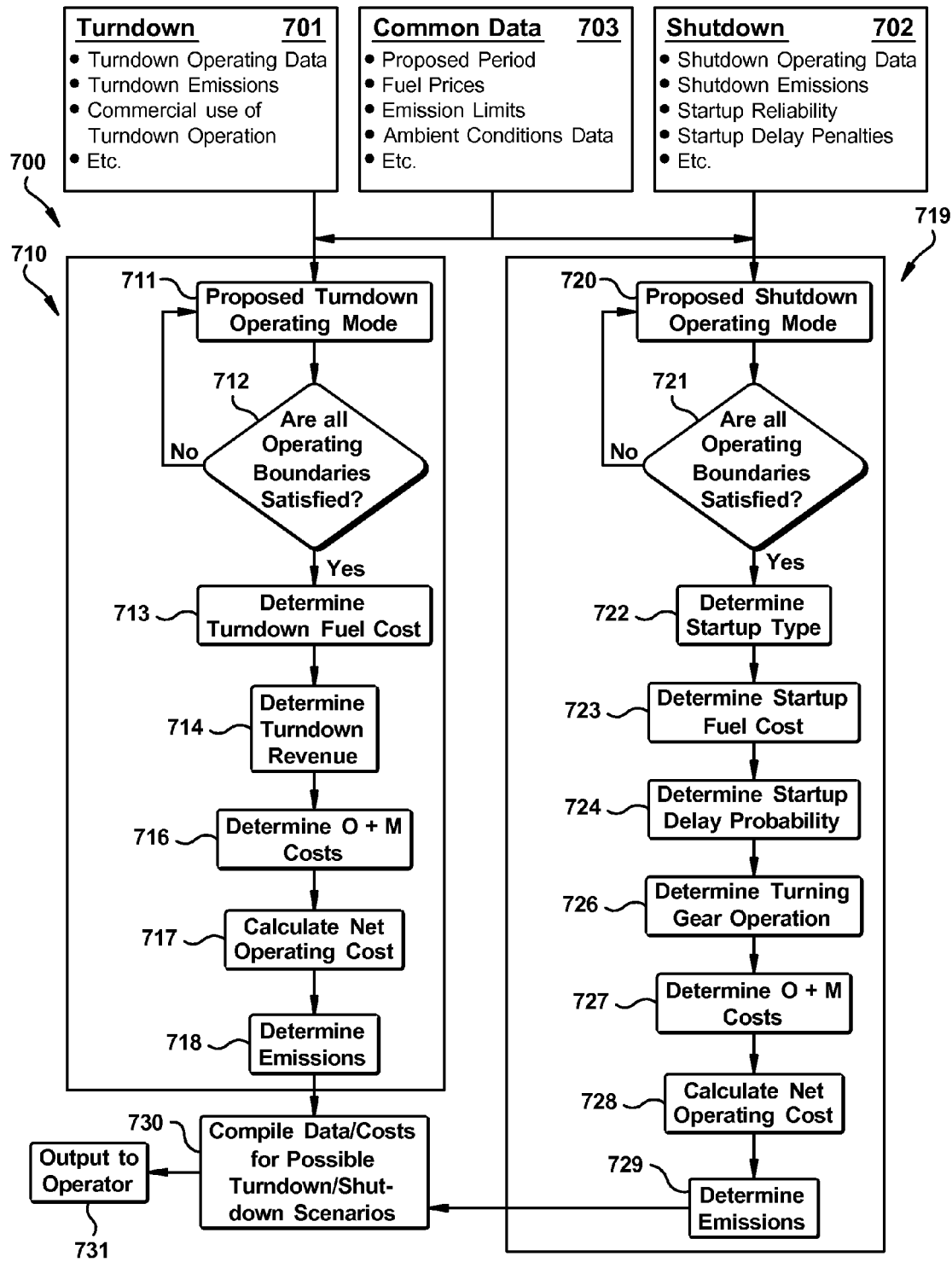
FIG. 21 is a diagram illustrating available operating modes of a gas turbine during a selected operating period having defined intervals according to aspects of an alternative embodiment of the present invention.

Looking now at FIG. 21, a method is provided to further model and analyze turndown operation of a power plant. As will be appreciated, this method may be used to analyze turndown costs versus shutdown costs for specific cases involving a single generating unit over a defined time interval. However, it may also be used to analyze plant level costs in which a recommendation is sought regarding ways in which the operation of several generating units may be controlled over a selected operating period having multiple intervals. In this way, the output of FIGS. 18 and 20 may be assembled so to configure possible operating modes or sequences over the span of multiple intervals, which, as will be demonstrated, then may be analyzed pursuant to the method of FIG. 21 so to provide a more fuller understanding of turndown operation over a broader operating period.

Plant operators, as already discussed, regularly have to decide between turndown and shutdown operating modes during off-peak hours. While certain conditions may make the decision a straightforward one, often times it is difficult, particularly given the increased complexity of the modern power plant and the multiple thermal generating units usual contained within each. As will be appreciated, the decision to turndown versus shutdown a power plant depends significantly on a full appreciation of the economic benefits associated with each mode of operation. The present invention, according to the alternative embodiment illustrated in FIG. 21, maybe used by plant operators to gain an improved understanding of the trade-offs associated with each of these different operating modes so to enhance decision-making. According to certain embodiments, the method of FIG. 21 may be used in tandem with the turndown advisor of FIG. 18 so to enable a combined advisor function that: 1) recommends the best course of action between turndown and shutdown operating modes for the generating units of the power plant given known conditions and economic factors; and 2) recommends, if turndown operation is the best course of action for some of those units, the minimum turndown load level that is optimal. In this manner, plant operators may more readily identify situations when the units of power plants should be turned down versus being shutdown, or vice versa, based upon whichever represents the best economic course of action for the power plant given a specific scenario of ambient conditions, economic inputs, and operational parameters. Ancillary benefits, such as extending component part-life, are also possible. It should also be appreciated that the methods and systems described in relation to FIGS. 18 and 21 may be employed separately.

In general, the method of flow diagram 700—which also may be part of or referred to herein as a "turndown advisor"—applies user inputs and data from analytical operations so to perform calculations that evaluate costs associated with turning down a power plant versus those of shutting it down. As will be appreciated, the flow diagram 700 of FIG. 21 provides this advisor feature by, according to certain preferred embodiments, leveraging the tuned power plant model that is discussed at length above. As part of this functionality, the present invention may advise as to the various outcomes, economic and otherwise, between turning down and shutting down a power plant during off-peak demand periods. The present invention may provide relevant data that clarifies as to whether turning down the power plant is preferable to shutting it down over a specified market period. According to certain embodiments, the operation having the lower costs may be then recommended to the plant operator as the appropriate action, although, as also presented herein, ancillary issues or other considerations may also be communicated to the plant operator that may affect the decision. The present method may put forth potential costs, as well as the probability of incurring such costs, and these considerations may affect the ultimate decision as to which operating mode is preferable. Such considerations may include, for example, a complete analysis of both short-term operating costs as well as long-term operating costs associated with plant maintenance, operating efficiencies, emission levels, equipment upgrades, etc.

As will be appreciated, the turndown advisor may be implemented using many of the systems and methods described above, particularly those discussed in relation to FIGS. 16 through 20. The turndown advisor of FIG. 21 may collect and use one or more of the following types of data: user specified start and stop time for the proposed turndown operating period (i.e., the period for which the turndown operating mode is being analyzed or considered); fuel costs; ambient conditions; time off breaker; alternate power uses; sale/price of power or steam during the relevant period; operating and maintenance cost over the period; user input; calculated turndown load; predicted emissions for operation; current emissions levels spent by the power plant and the limits for defined regulatory periods; specifications regarding the operation of the turning gear; regulation and equipment related to purge processes; fixed cost for modes of power plant operation; costs related to startup operation; plant startup reliability; imbalance charges or penalties for delayed startup; emissions related to startup; fuel rate used for auxiliary boiler if steam turbine present; and historical data regarding how the gas turbines of the power plant have been operating in turndown and shutdown operating modes. In certain embodiments, as discussed below, the outputs from the present invention may include: a recommended operating mode (i.e., turndown and shutdown mode of operation) for the power plant over the relevant period; costs associated with each operating mode; a recommended plant operating load and load profile over time; a recommended time to initiate unit startup; as well as emissions consumed year to date and emissions remaining for the remainder of the year. According to certain embodiments, the present invention may calculate or predict fuel consumption and emissions of the power plant over the relevant period, which then may be used to calculate the cost of turndown versus shutdown for one or more particular gas turbine engines. The present method may use the cost of each gas turbine in the shutdown and turndown mode to determine the combination which has the minimum operating cost. Such optimization may be based on different criteria, which may be defined by the plant operator. For example, the criteria may be based on revenue, net revenue, emissions, efficiency, fuel consumption, etc. In addition, according to alternative embodiments, the present method may recommend specific actions, such as whether or not to take a purge credit; the gas turbine units that should be shutdown and/or those that should be turned down (which, for example, may be based on historical startup reliability and potential imbalance charges that may be incurred due to a delayed start). The present invention may further be used to enhance predictions related to fuel consumption so to make prospective fuel purchases more accurate or, alternatively, enable fuel purchases for market periods farther into the future, which should have a positive effect on fuel pricing and/or maintenance of leaner fuel inventory or margin.

FIG. 19 illustrates an exemplary embodiment of a turndown advisor according to an exemplary embodiment of the present invention, which is in the form of a flow diagram 700. The turndown advisor may be used to advise as to the relative costs over a future period of operation of shutting down a power plant or a portion thereof while operating other of the generating units in a turndown mode. According to this exemplary embodiment, the possible costs associated with the shutdown and the turndown operating mode may be analyzed and then communicated to a plant operator for appropriate action.

As initial steps, certain data or operating parameters may be gathered that affect or may be used to determine operating costs during the selected turndown operating period. These, as illustrated, are grouped accordingly between: turndown data 701; shutdown data 702; and common data 703. The common data 703 includes those cost items that relate to both shutdown and turndown operating modes. The common data 703, for example, includes the selected operating period for which the analysis of the turndown operation mode is being performed. It will be appreciated that more than one selected operating period may be defined and analyzed separately for competing modes of turndown operation so that a broader optimization is achieved over an extended time frame. As will be appreciated, the defining of the selected operating period may include defining the length of the period as well as its starting or end point. Other common data 703, as shown, may include: the price of fuel; the various emission limits for the power plant; and data regarding ambient conditions. In regard to the emission limits, the data collected may include limits that may be accrued during a defined regulatory period, such as a year, and the amounts already accrued by the power plant and the extent to which the applicable regulatory period has already tolled. Further, emissions data may include penalties or other costs associated with exceeding any of the limits In this manner, the present method may be informed as to the current status of the power plant relative to yearly or periodic regulatory limits as well as the likelihood of a possible violation and penalties associated with such non-compliance. This information may be relevant to the decision whether to shutdown or turndown generating units as each type of operation impacts plant emissions differently. In regard to ambient conditions data, such data may be obtained and used pursuant to those processes that have been already described herein.

The turndown operating mode, as will be appreciated, has data uniquely relevant to a determination of the operating costs associated with it. Such turndown data 701, as illustrated, includes revenue that may be earned via the power that is generated while the power plant operates at the turndowned level. More specifically, because the turndown operating mode is one in which power generation continues, albeit at a lower level, there is the potential that that power produces revenue for the power plant. To the extent that this is done, the revenue may be used to offset some of the other operating costs associated with turndown operating mode. Accordingly, the present method includes receiving a price or other economic indication associated with the sale or commercial use of the power that the plant generates while operating in the turndown mode. This may be based on historical data, and the revenue earned may depend upon the turndown level at which the power plant operates.

The turndown data 701 may further include operating and maintenance associated with operating the plant at the turndown level during the selected operating period. This also may be based on historical data, and such costs may be dependent upon the turndown level for the power plant and how the power plant is configured. In some cases, this charge may be reflected as a hourly cost that is dependent on load level and historical records of similar operation. The turndown data 701 may further include data related to plant emissions while operating in the turndown mode The shutdown data 702 also includes several items that are unique to the shutdown operating mode, and this type of data may be gathered at this stage of the current method. According to certain embodiments, one of these is data relating to the operation of the turning gear during the shutdown period. Additionally, data regarding the various phases of shutdown operation will be defined. This, for example, may include data related to: the shutdown operation itself, which may include historical data on length of time necessary to bring the generating units from a regular load level to a state where the turning gear is engage; the length of time that the power plant remains shutdown according to the selected operating period; the length of time the generating unit typically remains on the turning gear; and data regarding the process by which the generating units are restarted or brought back online after being shutdown as well as the time required so to do this, startup fuel requirements, and startup emissions data. In determining the startup time, such information as to the types of startups possible for the generating unit and specifications related thereto may be determined. As one of skill in the art will appreciate, startup processes may depend upon the time that the power plant remains shutdown. Another consideration affecting startup time is whether the power plant includes certain features that may affect or shorten startup time and/or whether the operator of the power plant chooses to engage any of these features. For example, a purge process, if necessary, may lengthen the startup time. However, a purge credit may be available if the power plant was shutdown in a certain manner. Fixed costs associated with shutdown operation, including those associated with startup, may be ascertained during this step, as well as costs particular to any of the relevant generating units. Emissions data associated with the startup and/or shutdown of the power plant also may be ascertained. These may be based on historical records of operation or otherwise. Finally, data related to startup reliability for each of thermal generating units may be ascertained. As will be appreciated, power plants may be accessed fees, penalties, and/or liquidated damages if the process of bringing units back online includes delays that result in the power plant being unable to meet load obligations. These costs may be determined and, as discussed in more detail below, may be viewed in light of the historical data related to startup reliability. In this manner, such charges may be discounted so to reflect the likelihood of incurrence and/or include an expenditure by which the risk of such charges is hedged or insured against.

From the initial data acquisition steps of 701 through 703, the exemplary embodiment illustrated in FIG. 19 may proceed via a turndown analyzer 710 and a shutdown analyzer 719, each of which may be configured to calculate operating costs for the operating mode to which it corresponds. As illustrated, each of these analyzers 710, 719 may proceed toward providing cost, emission, and/or other data to step 730 where data regarding possible turndown and unit shutdown scenarios is compiled and compared so that, ultimately, an output may be made to a power plant operator at step 731. As will be discussed, this output 731 may include cost and other considerations for one or more of the possible scenarios and, ultimately, may recommended a particular action and the reasons therefor.

In regard to the turndown analyzer 710, the method may first determine the load level for the proposed turndown operation during the selected operating period. As discussed more below, much of the costs associated with turndown operation may depend significantly on the load level at which the power plant operates as well as how the plant is configured so to generate that load, which, may include, for example, how the various thermal generating units are engaged (i.e., which ones are turned down and which are shutdown). The turndown load level for the proposed turndown operation may be determined in several different ways according to alternative embodiments of the present invention. First, the plant operator may selected the turndown load level. Second, the load level may be selected via analysis of historical records regarding past turndown levels at which the plant has operated efficiently. From these records, a proposed load level may be analyzed and selected based on operator supplied criteria, such as, for example, efficiency, emissions, satisfaction of one or more site specific objectives, availability of alternative commercial uses for the power generated during the turndown condition, ambient conditions, as well as other factors.

As a third method of selecting the turndown level for the proposed turndown operation, a computer implemented optimization program, such as the one described in relation to FIG. 18, may be used to calculate an optimized turndown level. In FIG. 19, this process is represented by steps 711 and 712. An optimized turndown level may be calculated by proposing turndown operating modes at step 711 and then analyzing at step 712 if the operational boundaries for the power plant are satisfied. As will be appreciated, a more detailed description as to how this is accomplished is provided above in relation to FIG. 18. By using a process such as this to optimize the turndown level, it will be appreciated that the turndown operating modes selected for comparison against the shutdown alternatives for the selected operating period will represent optimized case, and that, given this, the comparison between the turndown and the shutdown alternatives will be a meaningful one. As stated in relation to FIG. 18, the minimum turndown level may be calculated via an optimization process that optimizes the turndown level pursuant to operator selected criteria and/or cost functions. One of the functions may be the level of fuel consumption during the proposed turndown operating period. That is, the optimized turndown level may be determined by optimizing fuel consumption toward a minimal level, while also satisfying all other operational boundaries or site specific performance objectives.

From there, the present method of FIG. 19 may determine the costs associated with the proposed turndown operating mode for the selected operating period according to the characteristics of the turndown operating mode determined via steps 711 and 712. As illustrated, step 713 may calculate fuel consumption and, therefrom, fuel costs for the proposed turndown operation. Pursuant to the exemplary embodiment just discussed that describes an optimization based on minimizing fuel consumption, fuel costs may be derived by simply taking the fuel level calculated as part of the optimization step and then multiplying it by the anticipated or known price for fuel. At a next step (step 715), the revenue derived from the power generated during the selected operating period may be calculated given the proposed turndown level and the availability of commercial demand during the selected operating period. Then, at step 716, operating and maintenance costs may be determined. The operating and maintenance costs associated with the proposed turndown operation may be calculated via any conventional method and may be dependent upon the turndown level. The operating and maintenance costs may be reflected as a hourly charge that is derived from historical records of turndown operation, and may include a component usage charge that reflects a portion of the expected life of various component system that is used during the proposed turndown operation. At a next step, which is indicated by step 717, a net cost for the proposed turndown operating mode for the selected operating period may be calculated by adding the cost (fuel, operating and maintenance) and subtracting the revenue.

The present method may also include step 718 that determines the plant emissions over the selected operating period given the proposed turndown operating mode, which may be referred to as the "emissions impact". The net cost and the emissions impact may then be provided to a compilation and comparison step, which is represented as step 730, so that the cost and emissions impact of different turndown scenarios may be analyzed so that, ultimately, a recommendation may be provided at an output step 731, as discussed more below.

Turning to the shutdown analyzer 719, it may be used to calculate aspects relating to operating one or more of the generating units of the power plant at a shutdown operating mode during the selected operating period. As part of this aspect of the invention, operations including the procedures by which the power plant is shutdown and then restarted at the end of the selected period may be analyzed for cost and emissions. According to a preferred embodiment, the shutdown analyzer 719 may determine as part of initial steps 720 and 721 a proposed shutdown operating mode, which may represent an optimized shutdown operating mode. The proposed shutdown operating mode that includes processes by which one or more of the generating units are shutdown and then restarted so to bring the units back online at the end of the selected operating period. As will be appreciated, the length of the time period during which a generating unit is not operating will determine the type of possible startup processes available to it. For example, whether a hot or cold startup is available depends, respectively, on if the shutdown period is a brief or long one. In determining the proposed shutdown operating mode, the present method may calculate the time necessary for the startup process to bring the generating unit back to an operational load level. At step 721, the method of the present invention may check to make sure that the proposed shutdown operating procedure satisfies all operating boundaries of the power plant. If one of the operational boundaries is not satisfied, the method may return to step 720 so to calculate an alternative startup procedure. This may be repeated until an optimized startup procedure is calculated that satisfies the operational boundaries of the power plant. As will be appreciated, pursuant to the methods and systems discussed above, the tuned power plant model may be used to simulated alternative shutdown operating modes so to determine optimized cases given the relevant operating period and project ambient conditions.

Given the proposed shutdown operating mode of steps 720 and 721, the process may continue by determining the costs associated with it. Initial steps include analyzing the nature of the startup process that the shutdown operating mode includes. At step 722, the process may determine the specific operating parameters of the startup, which may include a determination as to whether or not a purge is required or requested by a plant operator. Given the determined startup, fuel costs may be determined at step 723. According to an exemplary embodiment, the shutdown analyzer 719 then calculates costs associated with the delays that are sometimes incurred during the startup process. Specifically, as indicated in step 724, the process may calculate the probability of such a delay. This calculation may include as inputs the type of startup as well as historical records regarding past startups of the relevant generating units at the power plant as well as data regarding startups of such generating units at other power plants. As part of this, the process may calculate a cost related to the proposed shutdown operating mode that reflects the probability of a start delay occurring and the penalties, such as liquidated damages, that would be incurred. This cost may include any cost associated with a hedging tactic by which the power plant passes a portion of the risk of incurring such penalties to a service provider or other insurer.

At step 726, the current method may determine costs associated with operating the turning gear during the shutdown process. The method may calculate a speed profile for the turning gear given the shutdown period and, using this, a cost for the auxiliary power needed to operate the turning gear is determined. As will be appreciated, this represents the power required to keep the rotor blades of the gas turbine turning as they cool, which is done to prevent the warping or deformation that otherwise would occur if the blades were allowed to cool in a stationary position. At step 727, as illustrated, operating and maintenance costs for the shutdown operation may be determined. The operating and maintenance costs associated with the proposed shutdown may be calculated via any conventional method. The operating maintenance costs may include a component usage charge that reflects a portion of the expected life of various component system that is used during the proposed shutdown operation. At a next step, which is indicated by step 728, a net cost for the proposed shutdown operating mode for the selected operating period may be calculated by adding the determined costs of fuel, turning gear, and operating and maintenance. The present method may also include step 729 in which plant emissions are determined over the selected operating period given the proposed shutdown operating mode, which, as before, may be referred to as the "emissions impact" of the operating mode. The net cost and the emissions impact may then be provided to the compilation and comparison step of step 730.

At step 730, the current method may compile and compare various plant turndown operating modes for the selected operating period. According to one embodiment, the current method may analyze competing turndown operating modes that were identified as part of the methods and processes described in relation to FIGS. 18 through 20. At step 730, the compiled cost data and emissions impact for each of the competing turndown operating modes may be compared and provided as an output as part of step 731. In this manner, according to how the competing operating modes compare, a recommendation may be provided as to how the power plant should be operated during the selected turndown operating period, including which of the turbines should be shutdown and which of the turbines should be turned down and the turndown level at which they should be operated.

Emissions data may also be provided as part of the output of step 731, particular in instances where the competing modes of operation analyzed have similar economic results. As will be appreciated, notification as to how each alternative impacts plant emissions and, given the impact, the likelihood of noncompliance during the present regulatory period may also be provided, as well as an economic result related thereto. Specifically, the accumulated emissions of one or more power plant pollutants during the regulatory period may be compared to the overall limits allowable during that timeframe. According to certain preferred embodiments, the step of communicating the result of the comparison may include indicating an emission rate of the power plant derived by averaging a cumulative emission level for the power plant over a portion of a current regulatory emission period relative to an emission rate derived by averaging a cumulative emission limit over the current regulatory emission period. This may be done to determine how the power plant stands when compared to the average emissions rate allowable without incurring a violation. The method may determine the emissions still available to the power plant during the current regulatory period, and whether or not there is sufficient levels available to accommodate either of the proposed operating modes or, rather, if the emissions impact impermissibly increases the probability of a future regulatory violation.

As an output, the present method may provide a recommended action which advises as to the advantages/disadvantages, both economic and otherwise, between the proposed turndown and shutdown modes of operation. The recommendation may include a reporting of costs as well as a detailed breakdown between the categories in which those costs were incurred and the assumptions made in calculating them. Additionally, the recommended action may include a summary of any other considerations which might affect the decision whereby the most favorable operating mode is selected. These may include information related to applicable emission limits and regulatory periods, as well as where the power plant's current cumulative emissions stand in relation thereto. This may include power plant operators being notified as to any operating mode that unreasonably increases the risk of violating emission thresholds as well as the cost related to such violations.

The present invention may further include an unified system architecture or integrated computing control system that efficiently enables and improves performance of many of the functional aspects described above. Power plants—even those commonly owned—often operate across different markets, governmental jurisdictions, and time zones, include many types of stakeholders and decision-makers participating in their management, and exist under varying types of servicing and other contractual arrangements. Within such varied settings, a single owner may control and operate a number of power plants, each of which having multiple generating units and types, across overlapping markets. Owners also may have different criteria for evaluating effective power plant operation, which, for example, may include unique costs models, response time, availability, flexibility, cyber security, functionality, and differences inherent in the ways separate markets operate. However, as will be appreciated, most current power trading markets rely on various off-line generated files shared by multiple parties and decision-makers, including those transmitted between traders, plant managers, and regulating authorities. Given such complexities, the capabilities of power plants and/or generating unit within a market segment may not be fully understood, particularly across the layered hierarchy that spans, for example, from individual generating units to power plants, or from power plants to fleets of such plants. As such, each successive level of the power trading market typically hedges the performance that is reported by the level below. This translates into inefficiencies and lost revenue for owners, as the successive hedging compounds into systemic underutilization. Another aspect of the present invention, as discussed below, functions to alleviate the disconnections that are at the root of these issues. According to one embodiment, a system or platform is developed which may perform analytics, collect and evaluate historical data, and perform what-if or alternate scenario analyses on an unified system architecture. The unified architecture may more efficiently enable various functions, various components, such as power plant modeling, operational decision support tools, prediction of power plant operation and performance, and optimization pursuant to performance objectives. According to certain aspects, the unified architecture may achieve this via an integration of components local to the power plant with those remote to it, such as, for example, those hosted on a centrally hosted or cloud based infrastructure. As will be appreciated, aspects of such integration may enable enhanced and more accurate power plant models, while not impacting consistency, efficacy, or timeliness of results. This may include utilizing the already discussed tuned power plant models on local and externally hosted computing systems. Given its deployment on an externally hosted infrastructure, the system architecture may be conveniently scale to handle additional sites and units.

Turning now to FIGS. 22 through 25, scalable architecture and control systems are presented which may be used to support the many requirements associated with controlling, managing, and optimizing a fleet of power plants in which multiple generating units are dispersed across several locations. A local/remote hybrid architecture, as provided herein, may be employed based on certain criteria or parameters that are situational or case specific. For example, an owner or operator having a series of power plants may desire that certain aspects of the systems functionality be hosted locally, while others are centrally hosted environment, such as in a cloud based infrastructure, so to pool data from all of the generating units and act as a common data repository, which may be used to scrubbed the data via cross-referencing values from common equipment, configurations, and conditions, while also supporting analytic functions as well. The method of choosing the suitable architecture for each of the various types of owner/operators may focus on the significant concerns that drive the operation of the power plants, as well as the specific characteristics of the power market in which the plants operate. According to certain embodiments, as provided below, performance calculations may be performed locally so to support the closed loop control of a particular power plant, improve cyber security, or provide the response speed needed to accommodate near real-time processing. On the other hand, the present system may be configured such that data flow between local and remote systems includes local data and model tuning parameters that are transferred to the centrally hosted infrastructure for the creation of a tuned power plant model that is then used for analytics, such as alternative scenario analysis. Remote or centrally hosted infrastructure may be used to tailor interactions with a common plant model according to the unique needs of the different user types that require access to it. Additionally, a strategy for scaling may be determined based on response time and service agreements that depend on the unique aspects of a particular market. If faster response times are required on the availability of final results, then the analytic processes may be scaled both in terms of software and hardware resources. The system architecture further supports redundancy. If any system running analytics becomes inoperable, the processing may be continued on a redundant node that includes the same power plant models and historical data. The unified architecture may bring applications and processes together so to promote performance and increase the scope of functionality so to achieve both technical and commercial advantages. As will be appreciated, such advantages include: convenient integration of new power plant models; separation of procedures and models; the enablement of different operators to share the same data in real-time while also presenting the data in unique ways pursuant to the needs of each of the operators; convenient upgrades; and compliance with NERC-CIP limitations for sending supervisory controls.

Figure 22:
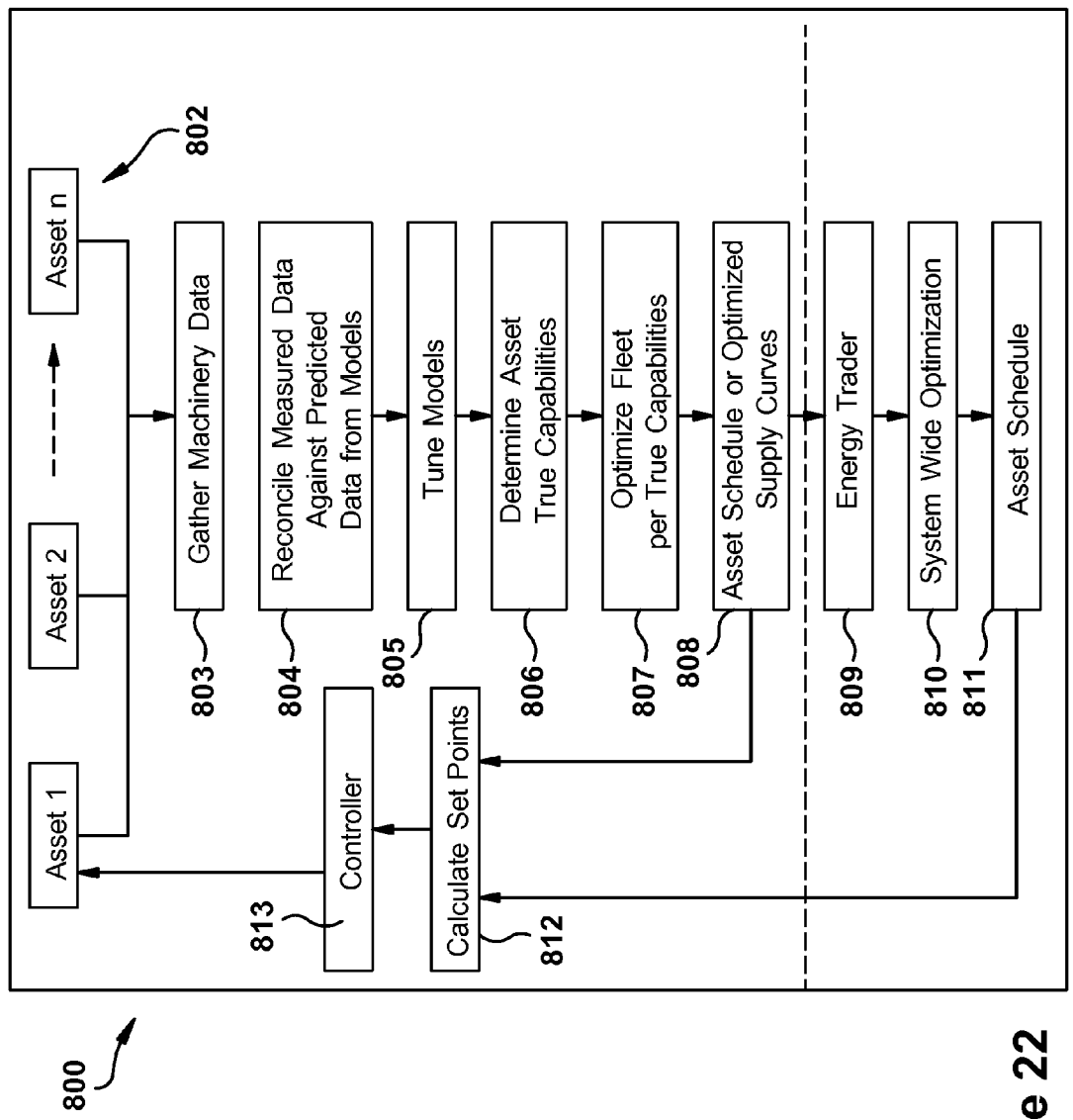
FIG. 22 illustrates a flow diagram according to a power plant fleet optimization process according to an alternative embodiment of the present invention.

FIG. 22 illustrates a high-level logic flow diagram or method for fleet level optimization according to certain aspects of the present invention. As shown, the fleet may include multiple generating units or assets 802, which may represent separate generating units across multiple power plants or the power plants themselves. The assets 802 of the fleet may be owned by a single owner or entity, and compete against other such assets across one or more markets for contract rights to generate shares of the load required by a customer grid. The assets 802 may include multiple generating units that have the same type of configurations. At step 803, performance data that is collected by the sensors at the various assets of the plants may be communicated electronically to a central data repository. Then, at step 804, the measured data may be reconciled or filtered so, as described below, a more accurate or truer indication of the performance level for each asset is determined.

As described in detail above, one way in which this reconciliation may be done is to compare the measured data against corresponding data predicted by power plant models, which, as discussed, may be configured to simulate the operation of one of the assets. Such models, which also may be referred to as off-line or predictive models, may include physics based models and the reconciliation process may be used so to periodically tune the models so to maintain and/or improve the accuracy by which the models represent, via simulation, actual operation. That is, as previously discussed in detail, the method, at step 805, may use the most currently collected data to tune the power plant models. This process may include tuning the models for each of the assets, i.e., each of the generating units and/or power plants, as well as more generalized models covering the operation of multiple power plants or aspects of fleet operation. The reconciliation process also may involve the collected data being compared between similar assets 802 so to resolve discrepancies and/or identify anomalies, particularly data collected from the same type of assets having similar configurations. During this process, gross errors may be eliminated given the collective and redundant nature of the compiled data. For example, deference may be given to sensors having higher accuracy capabilities or those that are known to have been checked more recently and demonstrated to be operating correctly. In this manner, the data collected may be comparatively cross-checked, verified and reconciled so to construct a single consistent set of data that may be used to calculate more accurate actual fleet performance. This set of data may then be used to tune off-line assets models that may then be used to simulate and determine optimized control solutions for the fleet during a future market period, which, for example, may be used to enhance the competitiveness of the power plant during dispatch bidding procedures.

At step 806, as illustrated, the true performance capabilities of the power plant are determined from the reconciled performance data and the tuned models of step 805. Then, at step 807, the assets 802 of the fleet may be collectively optimized given a selected optimization criteria. As will be appreciated, this may involve the same processes already discussed in detail above. At step 808, an optimized supply curve or asset schedule or may be produced. This may describe the manner in which the assets are scheduled or operated as well as the level at which each is engaged so to, for example, satisfy a proposed or hypothetical load level for the power plant fleet. The criteria for optimization may be chosen by the operator or owner of the assets. For example, the optimization criteria may include efficiency, revenue, profitability, or some other measure.

As illustrated, subsequent steps may include communicating the optimized asset schedule as part of a bid for load generating contracts for future market periods. This may include, at step 809, communicating the optimized asset schedule to energy traders who then submit a bid according to the optimized asset schedule. As will be appreciated, at step 810, the bids may be used to take part in a power system wide dispatch process by which load is distributed among multiple power plants and generating units located within the system, many of which may be owned by competing owners. The bids or offers for the dispatch process may be configured pursuant to a defined criteria, such as variable generating cost or efficiency, as determined by the particular dispatcher of the power system. At step 811, the results of the optimization of the power system may be used to generate an asset schedule that reflects how the various assets in the power system should be engaged so to meet predicted demand. The asset schedule of step 811, which reflects the outcome of the system-wide optimization or dispatching process, may then be communicated back to the owners of the assets 802 so that, at step 812, operating setpoints (or particularly operating modes), which may include, for example, the load at which each of the assets is operated, may be communicated to a controller that controls the operation of the assets 802. At step 813, the controller may calculate and then communicate a control solution and/or directly control the assets 802 so to satisfy the load requirements that it contracted for during the dispatch process. Fleet owners may adjust the way one or more power plants operate as conditions change so to optimize profitability.

Figure 23:
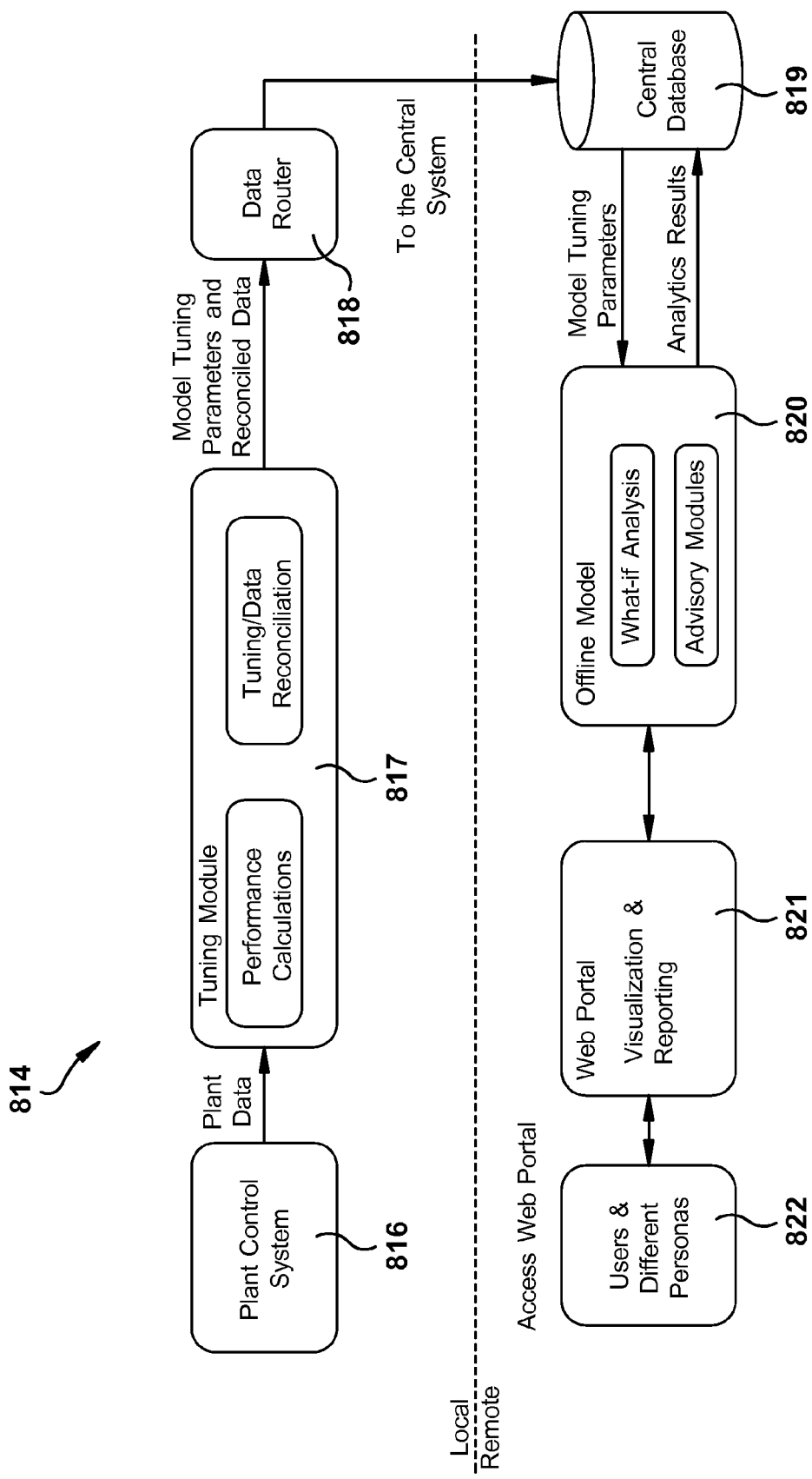
FIG. 23 illustrates a schematic diagram of a power plant fleet optimization system according to aspects of the present invention.

FIG. 23 illustrates the data flow between local and remote systems according to an alternative embodiment. As stated, certain functionality may be locally hosted, while other functionality is hosted off-site in a centrally hosted environment. The method of choosing the suitable architecture according to the present invention includes determining the considerations that are significant drivers of the operation of the assets within the fleet. Accordingly, considerations such as cyber security concerns might require certain systems remain local. Time-consuming performance calculations also may remain locally hosted so that necessary timeliness is maintained. As illustrated in FIG. 23, a local plant control system 816 may take in sensor measurements and communicate the data to a tuning module 817 where, as discussed previously, particularly in relation to FIG. 17, a tuning or data reconciliation process may be completed using performance calculations that compare actual or measured values against those predicted by the plant or asset model. Via data router 818, as illustrated, the model tuning parameters and reconciled data then may be communicated to a centrally hosted infrastructure, such as remote central database 819. From there the model tuning parameters are used to tune the off-line power plant model 820, which then may be used, as described above, to optimize future fleet operation, provide alternate scenario or "what-if" analysis, as well as advise between possible or competing modes of operating the asset fleet.

The results of the analytics performed using the off-line power plant model 820, as illustrated, may be communicated to fleet operators via a web portal 821. The web portal 821 may provide customized access 822 to users for the management of the fleet. Such users may include plant operators, energy traders, owners, fleet operators, engineers, as well as other stakeholders. Pursuant to the user interaction through the web-portal access, decisions may be made regarding the recommendations offered by the analytics performed using the off-line power plant model 820.

Figure 24:
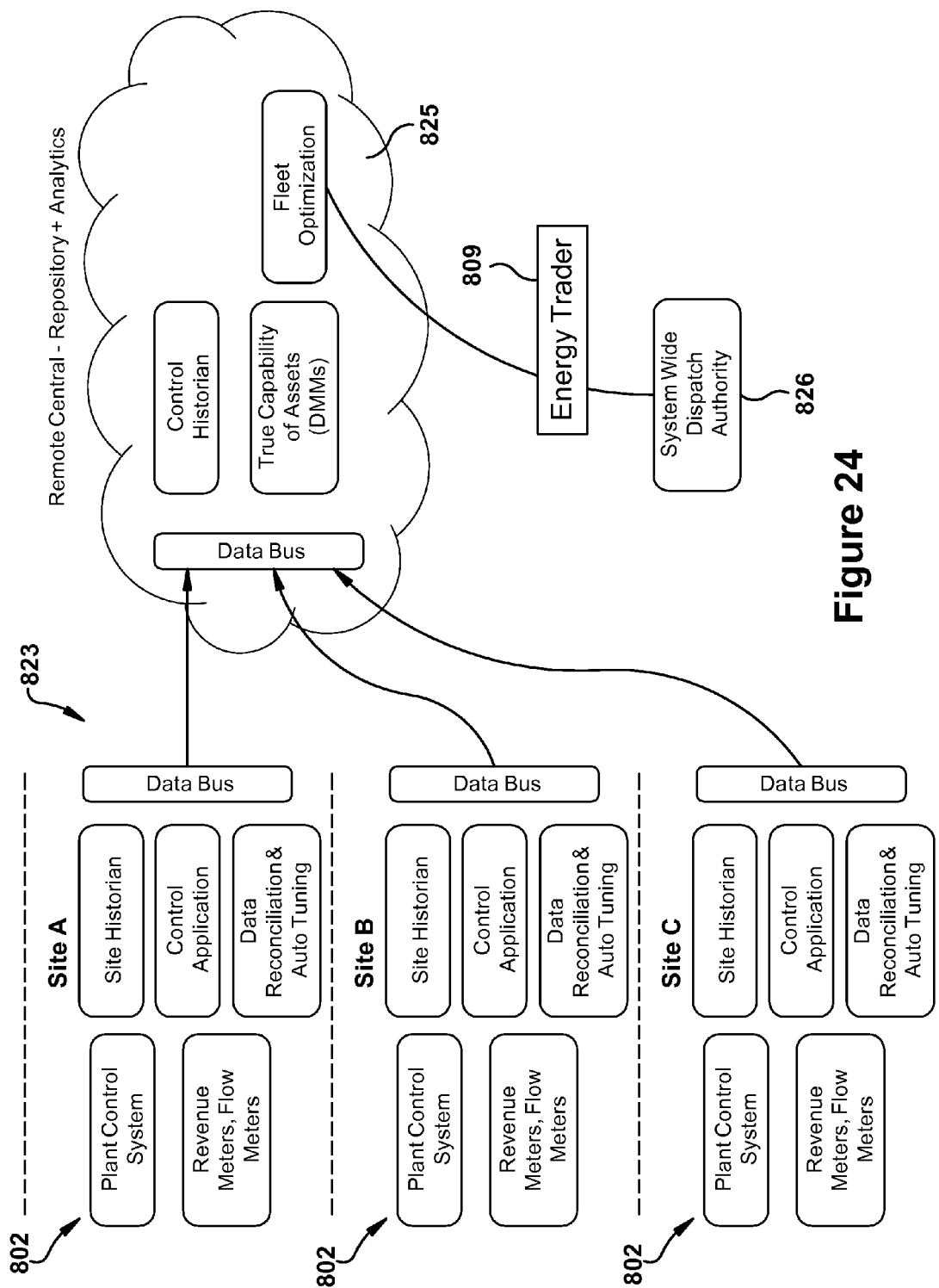
FIG. 24 illustrates a schematic diagram of a power plant fleet optimization system according to alternative aspects of the present invention.
Figure 25:
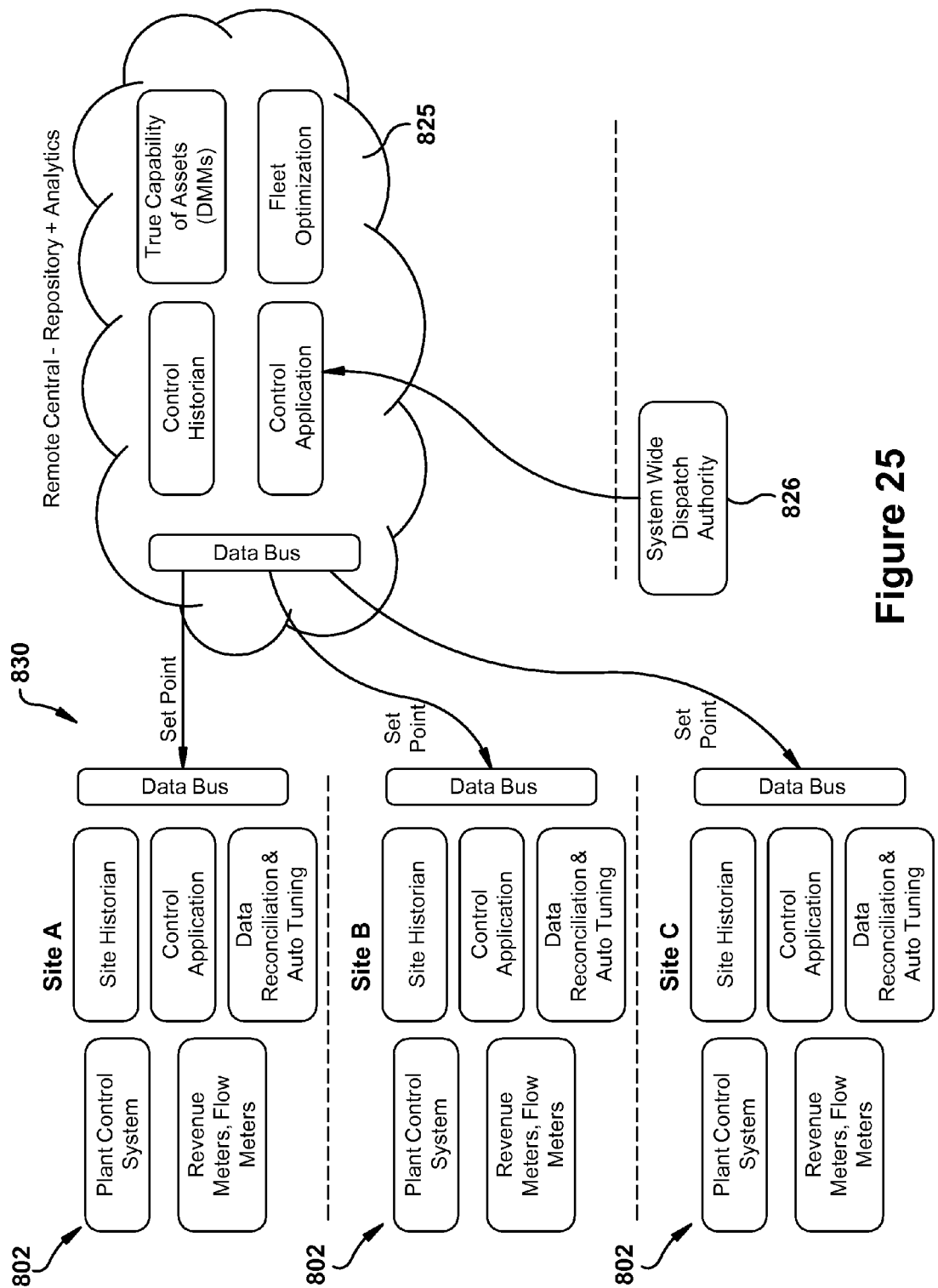
FIG. 25 illustrates a schematic diagram of a power plant fleet optimization system according to alternative aspects of the present invention.

FIGS. 24 and 25 illustrate a schematic system configurations of an unified architecture according to certain alternative aspects of the present invention. As illustrated in FIG. 25, a remote central repository and analytics component 825 may receive performance and measured operating parameters from several assets 802 so to perform a fleet level optimization. The fleet level optimization may be based on additional input data, which, for example, may include: the current fuel amounts stored and available at each power plant, the location specific price for fuel for each power plant, the location specific price for electricity generated at each power plant, current weather forecasts and the dissimilarities between remotely located assets, and/or outage and maintenance schedules. For example, a scheduled component overhaul for a gas turbine may mean that short-term operation at higher temperatures is more economical. The process may then calculate a supply curve, which includes an optimized variable generating cost for the fleet of power plants. Additionally, the present invention, as illustrated, may enable more automated bid preparation so that, at least in certain circumstances, the bid may be transferred directly to the system wide dispatch authority 826, and thereby bypass energy traders 809. As illustrated in FIG. 25, the results of the optimization of the power system (via the system wide dispatch authority) may be used to produce an asset schedule that reflects how the various assets in the power system should be engage so to meet predicted demand. This asset schedule may reflect a system-wide optimization, and, as illustrated, may be communicated back to the owners of the fleet of assets 802 so that operating setpoints and operating modes for the assets may be communicated to the controller that controls each asset in the system.

Accordingly, methods and systems may be developed pursuant to FIGS. 22 through 25 by which a fleet of power plants operating within a competitive power system is optimized toward enhanced performance and bidding related to future market periods. Current data regarding operating conditions and parameters may be received in real-time from each of the power plants within the fleet. The power plant and/or fleet models may then be tuned pursuant to the current data so that the models accuracy and range of prediction continue to improve. As will be appreciated, this may be achieved via the comparison between measured performance indicators and corresponding values predicted by power plant or fleet models. As a next step, the tuned power plant models and/or fleet level models may be used to calculate true generating capabilities for each of the power plants within the fleet based upon competing operating modes that are simulated with the tuned models. An optimization then is performed using the true plant capabilities and optimization criteria defined by the plant or fleet operator. Upon determining an optimized mode of operation, an asset schedule may be produced that calculates optimal operating points for each of the power plants within the fleet. As will be appreciated, the operating points may be then transferred to the different power plants for controlling each consistent therewith, or, alternatively, the operating points may serve as the basis on which bids for submission to the central dispatch authority are made.

Figure 26:
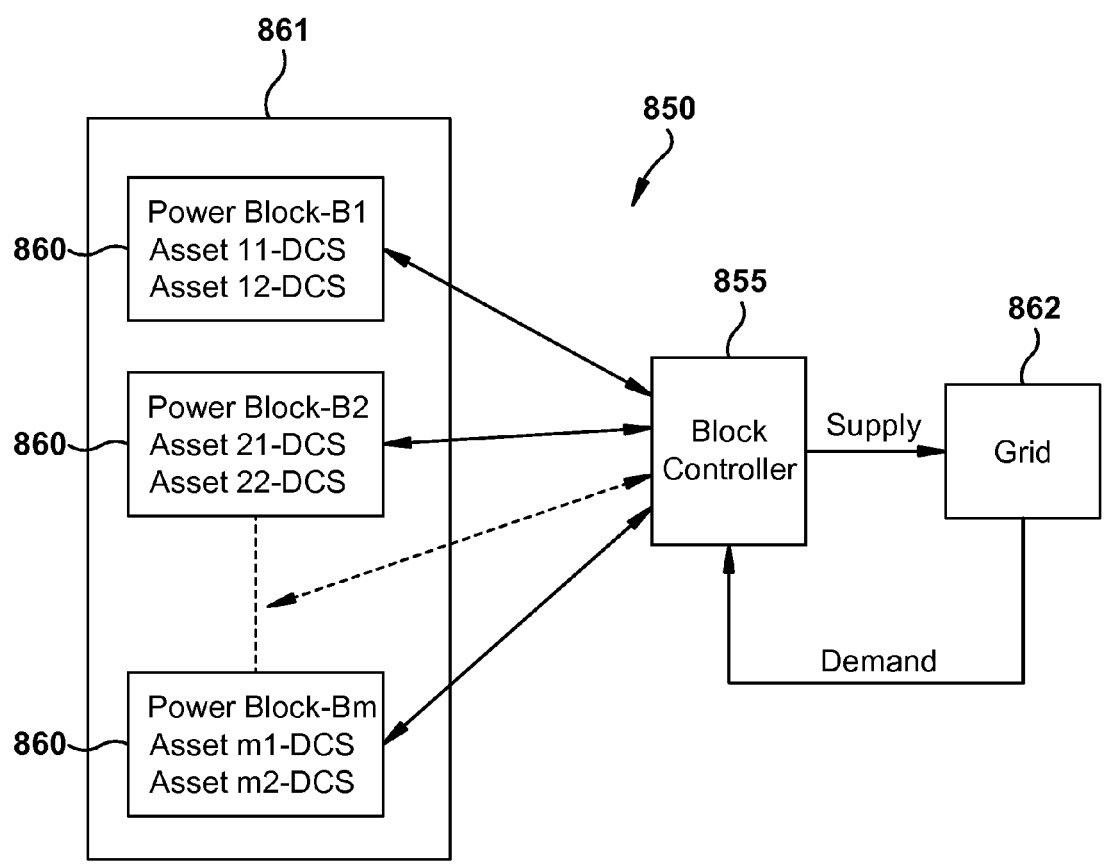
FIG. 26 illustrates a schematic diagram of a power block optimization system that includes a block controller.
Figure 27:
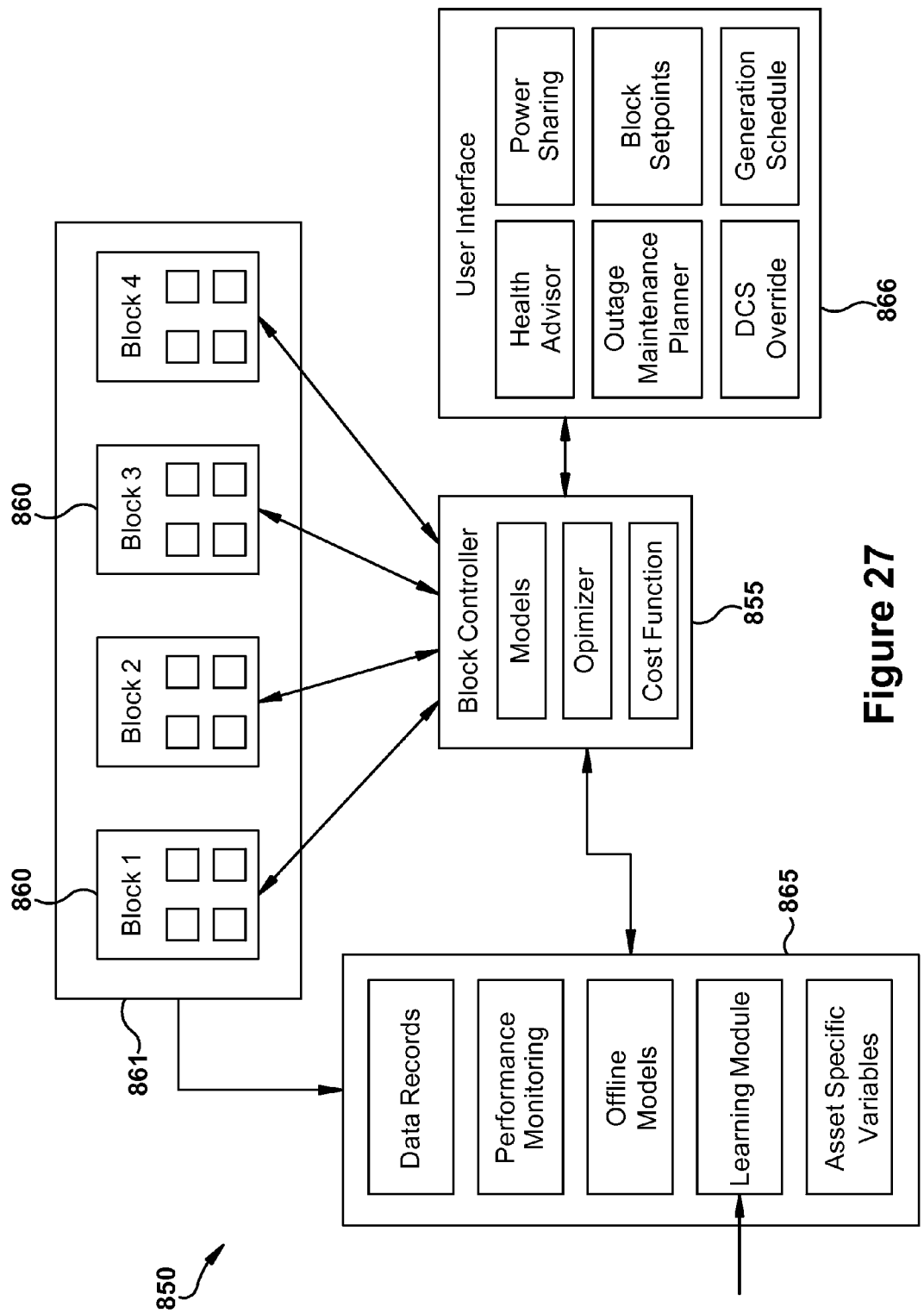
FIG. 27 illustrates a schematic diagram of an alternative power block optimization system that includes a block controller.

Also related to centralize control and optimization of multiple power units, FIGS. 26 and 27 illustrates a power system 850 in which a block controller 855 is used to control a plurality of power blocks 860. The power blocks 860, as indicated, may define a fleet 861 of the generating assets ("assets"). As will be appreciated, these embodiments provide another exemplary application of the optimization and control methods described in more detail above, though include broadening the optimization perspective to a fleet level. In so doing, the present invention may further offer ways of reducing certain inefficiencies that still impact modern power generating systems, particularly those having a large number of remote and varied thermal generating units. Each of the assets may represent any of the thermal generating units discussed herein, such as, for example, gas and steam turbines, as well as related subcomponents, like HRSGs, inlet conditioners, duct burners, etc. The assets may be operable pursuant to multiple generating configurations according to how the subcomponents are engaged. The power generation from the multiple power blocks 860 may be centrally controlled by a block controller 855. With respect to the system in FIG. 27, which will be discussed in more detail below, the block controller 855 may control the system pursuant to optimization processes that take into consideration asset and power block health, as well as generation schedules, maintenance schedules, as well as other factors that might be particular to one of the assets or power blocks 860, including location dependent variables. In addition, learning from operational data collected from similarly configured assets and power blocks, but not part of the fleet, may be utilized so to further refine control strategies.

Typically, conventional asset controllers (which are indicated in FIG. 26 as "DCS") are local to the generating assets and operate in substantial isolation. Because of this, such controllers fail to take into account the current health of the other assets that make up the power block 860 and/or fleet 861. As will be appreciated, this lack perspective leads to less than optimal power generation for the fleet 861 when considered from that perspective. With continued reference to the methods and systems already described, particularly those pertaining to FIGS. 3, 4, and 17 through 25, the present exemplary embodiment teaches a fleet level control system that enables several system-wide benefits, including enhanced power sharing strategies, cost-effectiveness, and improved efficiencies across grouped assets or power blocks.

As indicated, the control system, as represented by the block controller 855, may interact with the asset controllers. The block controller 855 also may communicate with the grid 862, as well as with a central dispatch or other governing authority that is associated with its management. In this manner, for example, supply and demand information may be exchanged between the fleet 861 and a central authority. According to an exemplary embodiment, supply information, such as dispatch bids, may be based on the block controller's optimization of the fleet 861. The present invention may further include optimization processes that occur between bid periods, which may be used periodically to optimize the way in which the fleet 861 is configured so to satisfy an already established load level. Specifically, such inter-bid optimization may be used to address dynamic and unanticipated operating variables. Appropriate control actions for the assets of the power blocks 860 may be communicated by the block controller 855 to the control systems within each of the power blocks 860 or, more directly, to the assets. According to preferred embodiments, implementation of control solutions of the block controller 855 may include enabling it to override asset controllers when certain predefined conditions are met. Factors affecting such override may include variable generating cost for each of the power blocks/assets, remaining useful part-life of hot gas path components, changing levels of demand, changing ambient conditions, as well as others.

The block controller 855, as illustrated, may be communicatively linked to the several power blocks 860 of the fleet 861 as well as directly to the assets, and thereby may receive many data inputs upon which the control solutions described herein are based. The optimization procedures may consider one or more of the following inputs: health and performance degradation; power generation schedules; grid frequency; maintenance and inspection schedules; fuel availability; fuel costs; fuel usage patterns and predictions; past issues and equipment failures; true performance capabilities; lifing models; startup and shutdown features; measurement operating parameter data, past and present; weather data; cost data; etc. As discussed in more detail in relation to other embodiments, inputs may include detailed present and historical data regarding measured operating parameters for each of the generating assets of the fleet 861. All such inputs, past and present, may be stored pursuant to conventional methods in, for example, a central database, and thereby made available upon query from the block controller 855 as might be necessary according to any of the procedural steps described herein.

A cost function may be developed according to the preferences of a fleet operator. According to a preferred embodiment, a weighted average sum of a fleet robustness index may be used to determine preferable or optimized power sharing configurations. The fleet robustness index may include, for example, an optimization according to several factors that is applicable to a given demand or fleet output level. These factors may include: thermal and mechanical stresses; degradation or losses, including rate of degradation; cost of generation; and/or fuel consumption. In this manner, the present embodiment may be used to address several ongoing issues relating to fleet control, particularly, optimizing performance across several power blocks having multiple and varied generating assets.

Data inputs may include the types already discussed herein, including those related to computer modeling, maintenance, optimization, and model-free adaptive learning processes. For example, according to the present embodiment, computer models, transfer functions, or algorithms may be developed and maintained so that the operation (or particular aspects of the operation) of the assets and/or, collectively, the power blocks or the fleet, may be simulated under a variety of scenarios. Results from the simulations may include values for certain performance indicators, which represent predictions as to aspects of the operation and performance of the assets, power block, or fleet performance over the selected operating period. The performance indicators may be selected because of a known or developed correlation to one or more cost results, and thus may be used to compare the economic aspects of each simulation. A "cost result", as used herein, may include any economic ramification, positive or negative, associated with the operation of the fleet 861 over the selected operating period. Cost results, thus, may include any revenue earned from the generation of power over the period, as well as any operating and maintenance costs incurred by the fleet. These operating and maintenance costs may include resulting degradation to the assets of the fleet given the scenarios and the simulated operation resulting from each. As will be appreciated, data extracted from the simulation results may be used to calculate which of the alternative operating modes for the fleet is/are more desirable or cost-effective.

The models for the assets, blocks or fleet may include algorithms or transfer functions developed through physics-based models, adaptive or learned "model free" process input/output correlations, or combinations thereof. Baseline degradation or loss models may be developed that correlate process inputs/outputs to degradation or loss data for each asset type. The degradation or loss data and the cost result related thereto, thus, may be calculable based on the predicted values for the operating parameters of proposed, alternative or competing operating modes of the fleet, which, according to certain embodiments, may be differentiated by the manner in which the assets and power blocks are engaged, the way in which generation is shared across the fleet assets, as well as other factors described herein. As stated, learning from similarly configured assets may be used to inform or further refine the models used as part of this process. For example, degradation model may be developed that calculate accrued equipment degradation and losses given the values for selected performance indicators. Such degradation then may be used to calculate the economic ramifications or cost result for each of the competing operating modes. Those economic ramifications may include degradation to asset performance, wear to components, expended useful part-life (i.e., the portion of the useful life of a component that is expended during a period of operation), as well as other measures of value, such as, for example, costs related to emissions, regulatory fees, fuel consumption, as well as other variable costs that are dependent upon output level. As will be appreciated, because the degradation and the expenditure of useful part-life for a particular asset may accrue in a nonlinear fashion as well as being dependent on dynamic and/or location specific variables, significant cost savings may be achieved over time by distributing the output level of the fleet so to minimize overall fleet degradation, particularly if that minimization is shared across the assets so to minimally impact overall fleet generating capacity and efficiency.

Thus, taking into account conditions predicted for a future market period, which may include anticipated demand and ambient conditions forecasts, a plurality of competing operating modes for the fleet may be selected for analysis and/or simulation so to determine an optimized, or, at least, preferred fleet operating mode. Each of the competing fleet operating modes may describe an unique generating configuration for the fleet 861. The competing fleet operating modes may be developed so to include parameter sets and/or control settings that define the unique generating configurations by which a particular fleet output level is reached. As mentioned, the fleet output level may be selected in a number of ways. First, it may be selected to reflect an already known fleet output level, for example, an output level established via a recently concluded dispatch process such that the optimization process may be used to determine an optimized fleet configuration by which that particular output level is satisfied. The fleet output level also may be selected pursuant to an expected load level given historical generation records, expected customer demand and/or other forecasted conditions. Alternatively, the fleet output level may also be varied over a chosen range. In this way a variable generating cost for the fleet 861 may be calculated and then, for example, used as part of a bidding procedure so to inform the preparation of a competitive bid. Thus, the manner in which the fleet output level is defined by the fleet operator may be used so that, in one instance, activities around preparing a competitive bid is supported, while, at other times, the output level may be selected so to support an advisor function that operates to optimize fleet performance as actual conditions might stray from those anticipated.

According to exemplary operation, as indicated by the more detailed system of FIG. 27, parameter sets may be developed that describe each of the competing fleet operating modes, and, for each of the competing fleet operating modes, different scenarios or cases may be developed within which manipulable variables are varied over a selected range so to determine the effect of the variation on the overall operation of the fleet. The different cases for the competing fleet operating modes may be configured so to cover alternative ways in which the fleet output level is shared across the power blocks 860 and/or assets. According to another example, the different cases may be selected based on alternative configurations available to certain of the assets, including the various ways by which each of the assets is engaged. For example, some cases may include the engagement of certain subcomponents of the assets, such as duct burners or inlet conditioners, so to augment power generation capabilities, while recommending that other assets operate at shutdown or turndown levels. Other scenarios may explore situations in which those asset configurations are varied somewhat or altogether reversed.

As illustrated in FIG. 27, the block controller 855 may communicate with a data and analytics component 865, which may include several modules by which relevant data is collected, normalized, stored, and made available upon query to the block controller 855. A data records module may receiving real-time and historical data inputs from a monitoring system associated with generating assets. A module related to performance monitoring may also be included, and related thereto one or more off-line models may be maintained. Each of these modules may function substantially consistent with other embodiments discussed herein. A learning module may also be included for the collection of operating data from similarly configured assets or power blocks that are not operating within the fleet 861. This data, as will be appreciated, may support a learning function by which a deeper and more thorough operational understanding of the assets is obtained. Such data may also be used to normalize measured data collected from the fleet 861 so that performance degradation of the generating assets may be calculated accurately, which may include accounting for the effects of other variables, such as fuel characteristics, ambient conditions, etc., that also may affect output capacity and efficiency.

As described in relation to FIGS. 24 and 25, fleet level optimization may be based on locality-dependent variables. These variables may reflect conditions that are unique and apply to certain particular assets or power blocks, and, for example, may include: the current fuel amounts stored and available at each asset; the location specific price for fuel for each asset; the location specific market price for electricity generated at each asset; current weather forecasts and the dissimilarities between remotely located assets within the fleet; and outage and maintenance schedules for each asset. For example, a scheduled component overhaul for a gas turbine asset may mean that short-term operation at higher temperatures is more economically beneficial. As illustrated, the data and analytics component 865 may include a module for accounting for these differences.

The block controller 855, as indicated, further may include modules directed toward power generation models (which may include asset models, block models, fleet models, as well as degradation or loss models), an optimizer, and a cost function. The asset, power block, and/or fleet models may be created, tuned and/or reconciled and maintained according to the methods already described herein. These models may be used to simulate or otherwise predict the operation of the fleet, or a selected portion thereof, over the selected operating period such that the optimizer module is able to determine a preferred scenario according to a defined cost function. More specifically, the results from the simulations may be used to calculate a cost result for each, which may include a summation across the power blocks and/or fleet assets of revenue, operating costs, degradation, expended useful part-life, and other costs mentioned herein. The revenue, as will be appreciated, may be determined via a projected output level multiplied by a market unit price. The calculation of the costs, as stated, may include degradation models or algorithms that correlate an economic result to the manner in which the assets operate within the simulations. Performance data from the simulation results may be used to determine fleet-wide operating costs, degradation, and other losses as already described. As will be appreciated, certain cost considerations, such as fixed aspects of operating costs, may not be appreciable different between the competing fleet operating modes and, thus, be excluded from such calculations. Additionally, the simulations described herein may be configured so to include the entire fleet of assets or a portion thereof, and may be focused on limited aspects of asset operation that, as provided herein, have been found particularly relevant at predicting cost results.

According to certain embodiments, the cost function module may include a fleet robustness index so to efficiently differentiate between alternative operating modes. The fleet robustness index may represent an averaged summation of losses accrued within the power blocks. The robustness index may include a factor indicating costs related to expended useful part-life, which may be a summation of the part-life expended across the assets, such as hot gas path parts and compressor blades in gas turbines. For example, a generating asset that is scheduled to be shutdown during the selected operating period pursuant to one of the competing fleet operating modes will incur an economic loss corresponding to the useful part-life expended per each shutdown/startup procedure. Whereas, a generating asset scheduled to operate at full load during the same operating period may incur a loss commensurate to those hours of operation. As will be appreciated, such losses may be further calibrated to reflect specific the thermal and mechanical loads that are expected given the load level and the operating parameters predicted to satisfy a particular load level, which, for example, may depend upon such factors as forecasted ambient conditions, fuel characteristics, etc. Other economic losses may be included within the summation of fleet losses so to derive a cost result for each of the competing fleet operating modes. These may include a summation of fuel consumption for the fleet assets, as well as, for example, the economic impact of predicted emission levels given the simulation results.

Once the summation of fleet-wide revenue and/or losses is complete for each of the simulated scenarios, the present method may include the step of calculating one or more preferred or optimized cases. The present method then may include one or more outputs that relate to the preferred or optimized cases. For example, the preferred or optimized cases may be electronically communicated to a fleet operator, such as through user interface 866. In such cases, outputs of the present method may include: a power block block/asset health advisor; a power sharing recommendation; an outage planner; an optimal setpoints control solution for the power blocks; DCS override; and/or an expected generation schedule. The output also may include an automated control response, which may include automatically overriding one of the asset controllers. According to another alternative, an output may include generating a dispatch bid according to one or more of the preferred or optimized cases. As will be appreciated, the outputs of the method, as indicated on the user interface 866, may enable fleet savings in a number of ways. First, for example, preferred power-sharing configurations may minimize, reduce, or advantageously apportion fleet degradation, which may significantly impact generating capacity and efficiency over future operating periods. Second, an adviser function may be configured using the described components so to optimize or, at least, enhance maintenance intervals by which degradation losses, both recoverable and non-recoverable, are mitigated. Monitoring and predicting the rate of degradation and scheduling/conducting maintenance procedures effectively, such as compressor washes or filter cleanings, will ensure that the gas turbine operates most efficiently.

Figure 28:
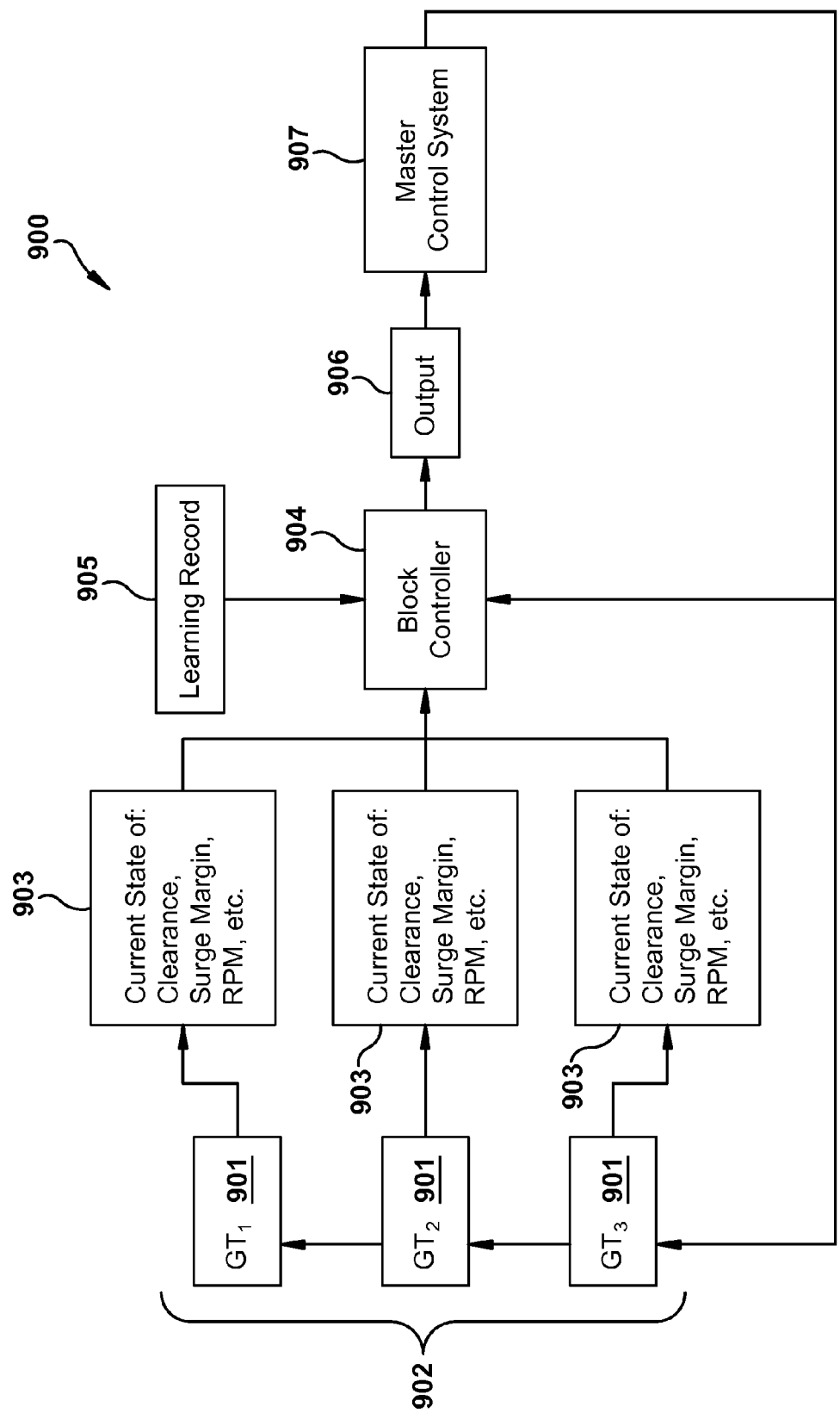
FIG. 28 is a flowchart depicting an embodiment of a process for optimizing a shutdown of a combined cycle power plant.

Turning now to FIG. 28, another related aspect of the present invention is discussed, which describes the more specific example of controlling the operation of multiple gas turbine engines operating as a power block. The gas turbine engines, as will be appreciated, may be located at a particular power plant or across several remote power plants. As already discussed, controlling a block of gas turbines so to optimize or enhance power sharing is a challenge. Current control systems do not effectively synchronize across a block of multiple engines and, instead, substantially engage each of the engines individually based upon unsophisticated apportioning of the output level for which the power block is collectively responsible. As will be appreciated, this often leads to imbalances and inefficient rates of degradation. Accordingly, there is a need for more optimal control strategies and, in particular, a system controller that provides for efficient power sharing strategies across multiple gas turbines that promote a more cost-effective loss or degradation rate when the units are collectively considered as a power block. For example, if a gas turbine block has several engines having the same ratings, the present invention may make recommendations based on the engines current degradation state as to which of units should operate at higher output levels and which should operate at reduced levels. The present invention may accomplish this in accordance with aspects already discussed herein, particularly those discussed relative to FIGS. 24 through 27. As one of ordinary skill in the art will appreciate, the advantages of such functionality include: increased life and performance of the gas turbines; improved life prediction, which may enable more competitive and/or risk sharing service agreements; greater operational flexibility for the power block as a whole; and robust multi-objective optimization that efficiently takes into account operational trade-offs, which may relate, for example, to hot gas path useful part-life expenditures, current degradation levels, and rates of degradation, and present power generating performance, such as demand, efficiency, fuel consumption, etc.

One way in which this may be accomplished is pursuant to a system 900, which will now be described with respect to FIG. 28. As indicated, a plurality of gas turbines 901 may be operated as part of a power block or "block 902". As discussed as part of the systems above, operating parameters 903 for each of the assets 901 may be gathered and electronically communicated to a block controller 904. According to a preferred embodiment, the operating parameters may include a rotor speed, compressor surge margin, and a blade tip clearance. As will be appreciated, the compressor surge margin may be calculated relative to measured rotor speed, and the blade tip clearance may be measured pursuant to any conventional method, including, for example, microwave sensors. As a further input, the block controller may receive records 905 from a database component, such as any of those already discussed, which may record current and past operating parameter measurements, including rotor speed, surge margin, blade tip clearance, control settings, ambient conditions data, etc., so to adaptively correlated process inputs and outputs.

According to preferred embodiments, the block controller 904 may be configured to operate as a model-free adaptive controller. The model-free adaptive controller may include a neural network based setup that has inputs (for example, via the records 905) from each of the gas turbines corresponding to demand, heat rate, etc. As will be appreciated, model-free adaptive control is a particularly effective control method for unknown discrete-time nonlinear systems with time-varying parameters and time-varying structures. The design and analysis of model-free adaptive control places an emphasis on process inputs and outputs so to "learn" predictive correlations or algorithms that explain the relationships therebetween. Correlations between measured inputs and outputs of the system being controlled. Functioning in this manner, the block controller 904 may derive control commands or recommendations, and these may be communicated as an output 906 to a master control system 907 for implementation. According to a preferred embodiment, the output 906 from the block controller 904 includes a preferred or optimized power sharing command or recommendation. According to other embodiments, the output 906 may include commands or recommendations related to modulated coolant flow for hot gas path components of the gas turbines 901 and/or modulated IGV settings for the compressor units of the gas turbines 901.

The master control system 907 may be communicatively linked to the gas turbines 901 of the power block 902 so to implement control solutions given the output 906. As illustrated, the master control system 907 may also communicate such information to the block controller 904. Thusly configured, the control system of FIG. 28 may operate to control the several gas turbines of the power block 902 so to generate a combined load or output level—such as, for example, a contract output level as might be determined by a dispatch bid process, for which the gas turbines collectively are responsible—in an enhanced or optimized manner according to a defined cost function. This control solution may include recommending a percentage of the combined output level that each of the gas turbines should contribute. In addition, the master control system 907 may include a physics based model for controlling the gas turbines pursuant to the optimized operating mode, as discussed previously.

According to an exemplary embodiment, for example, clearance and surge margin data may be tracked for each of the gas turbines. If clearance or surge margin data for any of the gas turbines is determined to be above a predefined threshold, that particular turbine may be operated at a reduced load. If operating that gas turbine at a reduced level is not possible, other recommendations may be made such as modulating IGV settings or coolant flow to hot gas path components. On the other hand, if one of the gas turbines is selected to operate at a reduced level, the optimized generating configuration may include recommending that one or more of the other gas turbines operate at a higher/peak load so to make up for any deficit. The method may select the higher/peak load turbines based upon surge margin and clearance data, with the desired effect of balancing current degradation levels and rate of degradation among the gas turbines of the power block so to collectively extend operating life, while maintaining higher a higher block output level and efficiency. As mentioned, because performance degradation rates and useful part-life expenditures may accrual nonlinearly as well as be dependent upon parameters that are variable across geographically dispersed units, savings may be achieved by using the block level perspective described herein to apportion load in a way that optimizes a cost result for the block. Power generation thus may be apportioned so to optimize costs across the block 902 by taking into account real time data (particularly, surge margin and clearance data) that has been determined to be highly dispositive and efficient at evaluating performance degradation levels, rates of degradation, remaining part-life, and true performance capacity for the gas turbines of the block.

Figure 29:
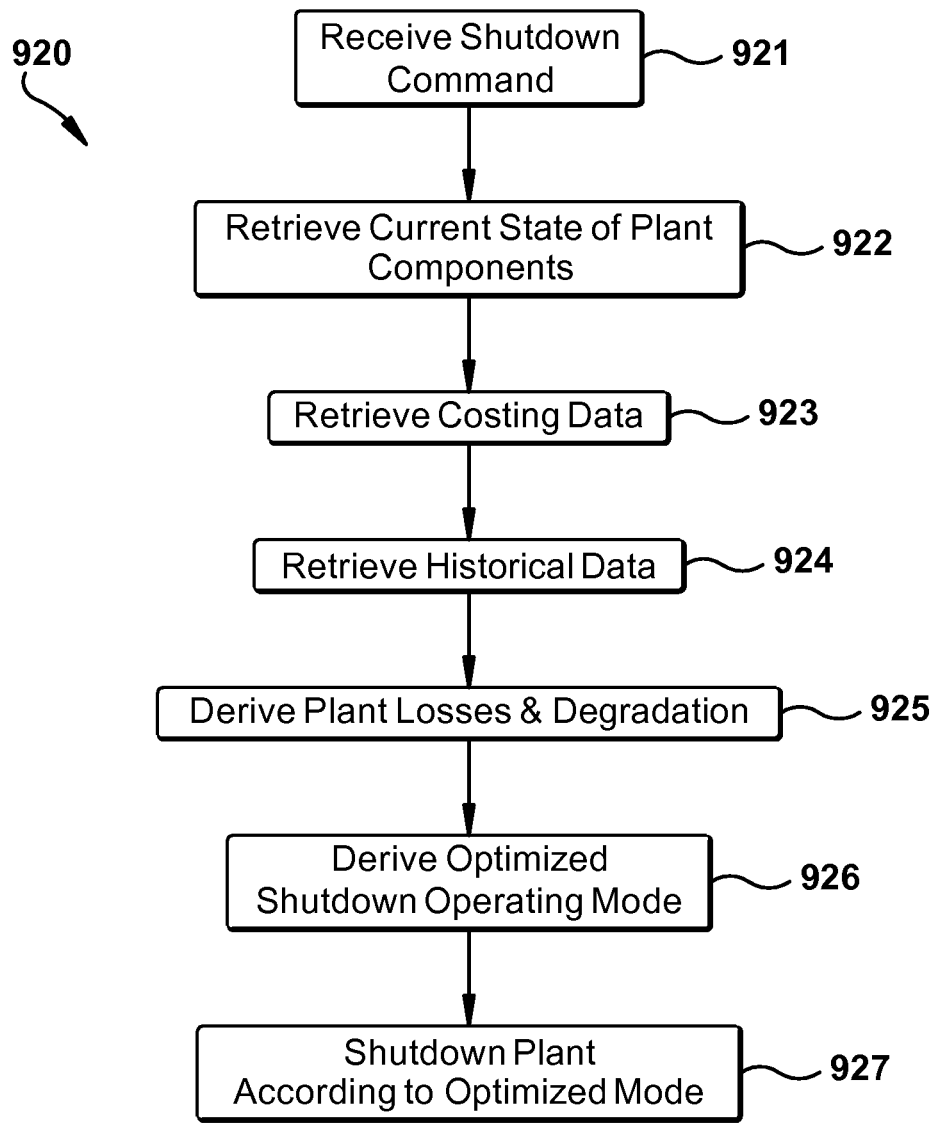
FIG. 29 illustrates an exemplary control system in which a model-free adaptive controller is used according to aspects of the present invention.

Referring now to FIG. 29, another exemplary embodiment of the present invention includes systems and methods that provide for more efficient and/or optimized shutdown of combined cycle power plants. As will be appreciated, during shutdown of a combined cycle plant, a controller typically reduces fuel flow to the gas turbine gradually so to reduce rotor speed toward a minimum speed. This minimum speed may be referred to as the "turning gear speed" because it represents the speed at which the rotor is engaged by a turning gear and thereby rotated so as to prevent thermal bowing of the rotor during the shutdown period. Depending upon the nature of the gas turbine engine, the fuel flow may be stopped at about twenty percent or so of typical full speed, with the turning gear engaged at about one percent of full speed. Reducing the flow of fuel in this gradual manner, however, does not provide a direct relationship with the reduction of the rotor speed. Rather, large and unyielding variations in the speed of the rotor over the shutdown period is typical. The variations in rotor speed may then cause significant differences in the fuel to air ratio, which is due to the fact that air intake is a function of the rotor speed, while fuel flow is not. Such variations then may lead to significant and abrupt variations in firing temperatures, transient temperature gradients, emissions, coolant flow, as well as others. The variations in shutdown behavior may have an impact on turbine clearances and, hence, overall turbine performance and component lifetime.

There is, therefore, a desire for a combined cycle shutdown controller that improves plant shutdown by rectifying one or more of these issues. Preferably, such a controller would control the rate of deceleration of the turbine rotor and related components over time so as to minimize uneven shutdown variations and, thereby, minimize the negative impact to the engine systems and components. According to certain embodiments, a more effective controller functions so to optimize rotor stresses and the slew rate of rotor speed and torque. The shutdown controller also may correct variability in subsystems such that, for example, coolant flow and wheelspace temperature remain at preferred levels. According to preferred embodiments, the present method may control the rate of the deceleration of the rotor and related components over time so as to minimize shutdown variations in a way that reduces costs, plant losses, and other negative effects. Pursuant to the systems and methods already described, the control methodology may function so that factors impacting shutdown costs are optimized according to operator-defined criteria or cost functions. One way in which this may be accomplished is pursuant to a process 920, which will now be described with respect to FIG. 29. As will be apparent to one of ordinary skill in the art, aspects of the process 920 draw upon subject matter already discussed herein—particularly with reference to the discussion related to FIGS. 3 and 4—which, for the sake of brevity, will be summarized, but not entirely repeated.

According to one embodiment, the shutdown procedures and/or the combined cycle shutdown controller of the present invention is configured as a conventional loop-shaping controller. The controller of the present invention may include aspects of model-free adaptive control as well as model-based control, as delineated in the appended claims. The combined cycle shutdown controller may include target shutdown time controller, and an actual shutdown time controller, and may control most if not all aspects of the plant shutdown. The controller may receive inputs such as exhaust spread, wheel-space temperature, clearance, surge margin, steam and gas turbine rotor stresses, gas turbine rotor rate of deceleration, demand, fuel flow, current power production, grid frequency, secondary firing, drum levels, and so on. Based on these inputs, the shutdown controller may compute a time range for shutdown (e.g., rate of shutdown), slew rate of rotor deceleration (i.e., a response time for rotor deceleration), corrected coolant flow, and corrected inlet guide vane profile, and/or a generator reverse torque desired during shutdown, as described in more detail below. According to certain embodiments, each of these outputs may be used to offset potentially harmful shutdown variations detected by one of the power plant sensors. The combined cycle shutdown controller may provide a trajectory of RPM/slew rate versus time profile, and rate of deceleration versus current power production profile more suitable for shutdown operations, and both may take into account combined cycle systems, such as the HRSG, steam turbines, boilers, and the like. The shutdown controller may control the components described herein until turning gear speed is achieved, thus providing for more optimal steam turbine and HRSG operability conditions, while also lowering component stresses.

FIG. 29 is a flow chart depicting an embodiment of a process 920 suitable for shutting down a combined cycle power plant, such as the power plant 12 described in relation to FIG. 3. The process 920 may be implemented as computer code executable by the combined cycle shutdown controller, and may be initiated after receiving (step 921) a shutdown command. The shutdown command may be received, for example, based on a maintenance event, a fuel change event, and so on. The process 920 may then retrieve (step 922) a current state of plant components, which may be sensed, gathered, stored, and retrieved per any of the sensors, systems, and/or methods already described herein. The current state of plant components, for example, may include turbine rotor speed, temperature of components, exhaust temperature, pressures, flow rates, clearances (i.e., distances between rotating and stationary components), vibration measurements, and the like. The state of the plant may additionally include current power production, and costing data such as, for example, cost of not producing power, cost of power at market rates, green credits (e.g., emission credits), and the like.

At a next step, costing or loss data may be retrieved (step 923), for example, by querying a variety of systems, including accounting systems, futures trading systems, energy market systems, or a combination thereof. Historical data may additionally be retrieved (step 924). The historical data may include log data for performance of systems, maintenance data, fleet-wide historical data (e.g., logs from other components in plants disposed in various geographic localities), inspection reports, and/or historical cost data.

The process may then derive algorithms regarding plant shutdown degradation or losses (step 925) related to shutdown operation. Such derivations may be determined using several input types, including, for example, historical operating data related to gas turbine systems, steam turbine systems, HRSG units, as well as for any other subcomponents as may be present. According to certain embodiments, a variety of models or algorithms may be developed by which combined cycle shutdown losses are derived. As discussed more fully in the discussion related to FIG. 4, such algorithms may function to provide a summation of power plant shutdown losses based on values for selected operating parameters or performance indicators, such as temperatures, pressures, flow rates, clearances, stresses, vibration, shutdown time, and the like. As will be appreciated, consistent with the other embodiments described herein, alternative, proposed or competing shutdown modes for the combined cycle power plant may be simulated in a combined cycle power plant model. That is, a combined cycle power plant model may be developed, tuned, and maintained, and then used to simulate alternative or competing shutdown operating modes so to derive predicted values for certain predefined performance indicators. The predicted values for the performance parameters then may be used to calculate shutdown costs pursuant to the derived loss algorithms.

For example, algorithms may be developed that correlate shutdown losses and a predicted thermal stresses profile, which may be determined from the predicted values for certain performance parameters given the operating parameters related to one of the competing shutdown operating modes. According to certain embodiments, such losses may reflect an overall economic consequence of the competing shutdown operating mode, and, for example, may take into account degradation to hot gas path components and/or a percentage of useful part-life expended given the shutdown mode, as well as any resulting performance degradation to the plant, and may be calculated from initiation of shutdown until an achieved time of shutdown, which, for example, may be when the turning gear speed is achieved. Similarly, loss algorithms may be developed so to determine losses related to: compressor and turbine mechanical stresses; clearances between stationary and rotating parts; shutdown emissions; shutdown fuel consumption; steam turbine rotor/stator thermal stresses; boiler drum pressure gradients; etc.

The process 920 may then derive (step 926) an enhanced or optimized shutdown operating mode, which may include a RPM/slew rate versus time profile, and/or a rate of deceleration versus current power production profile that is particularly well-suited for the shutdown of the combined cycle power plant. For example, the optimized shutdown operating mode may be determined as the one that best accommodates and takes into account the operation of the steam turbine, HRSG unit, the boiler, and/or other components of the combined cycle plant. According to one embodiment, the controller takes in the aforementioned inputs and derive therefrom expected conditions at various RPM/slew time parameters so to derive a RPM/slew curve plotted along an time axis that minimizes stresses and/or optimizes shutdown costs. Likewise, rate of deceleration versus current power production profiles may include a fuel flow that more desirably (as compared to other proposed shutdown modes) improves current power production based on deceleration of the shaft. According to other embodiments, cost functions may be defined by which other preferable or optimized shutdown operating modes are derived and selected. As will be appreciated, scenarios may be derived that, for example, minimizes stresses and/or losses for the gas turbine, minimizes stresses and/or losses for the steam turbine, minimizes stresses and/or losses for the HRSG, or a combination thereof. Depending on how the cost function is defined, further optimized shutdown operating modes may be determined based on criteria, such as, costs for power production during the shutdown period, plant emissions, fuel consumption, and/or combinations thereof without limitation.

The combined cycle shutdown controller may further include a control system for shutting down the power plant according to the optimized shutdown mode. According to a preferred embodiment, this control system may include a physics-based modeler or a model based controller that then derives a control solution given the optimized shutdown mode. The model based controller may derive control inputs and settings for controlling actuators and control devices so that the combined cycle power plant is operated during the shutdown period in accordance with the preferred or optimized shutdown operating mode. For example, the shutdown controller may actuate fuel valves to conform to a desired fuel flow rate while also controlling inlet guide vanes of the gas turbine exhaust to control exhaust flow into the HRSG, while additionally controlling steam valves of the steam turbine to control steam turbine shutdown. By combining control of a variety of components approximately simultaneously with each other, the shutdown for the plant may be improved and may conform with desired scenarios.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A combined cycle power plant system comprising:
 a gas turbine operably connected to a heat recovery steam generator;
 a first controller for optimizing a shutdown operation defined between an initiating shutdown command and a terminating event, the terminating event comprising a rotor of the gas turbine reaching a predetermined speed, wherein the first controller is configured to execute the steps of:
  receiving the initiating shutdown command;
  receiving operating parameters measured by sensors for each of a first component and a second component of the combined cycle power plant, and, based thereupon, determining a current state for each of the first and the second component;

based on the current state, deriving an optimized shutdown operating mode for transitioning the first component and the second component from the current state to a shutdown state; and a second controller configured to:
transform the optimized shutdown operating mode into commands configured to actuate mechanical control devices of the first component and the second component so that the shutdown operation proceeds according to the optimized shutdown operating mode;

wherein the heat recovery steam generator comprises a steam turbine and is configured such that exhaust from the gas turbine comprises a heat source for producing steam that drives the steam turbine;

wherein the first component comprises the gas turbine and the second component comprises the heat recovery steam generator, the steam turbine, or a combination thereof;

wherein the optimized shutdown operating mode comprises a plurality of reference parameters configured so to establish a baseline for transitioning the first component and the second component of the combined cycle power plant from the current state to the shutdown state;

wherein the reference parameters comprise:
a time range for shutdown;
a slew rate for rotor deceleration; and
at least one of a corrected coolant flow for a turbine of the gas turbine and a corrected inlet guide vane setting for a compressor of the gas turbine.

2. The combined cycle power plant system according to claim 1, wherein the terminating event comprises the rotor of the gas turbine reaching a minimum speed so to engage a turning gear, the turning gear comprising a mechanical drive for turning the rotor of the gas turbine so to prevent thermal bowing once the gas turbine achieves the shutdown state.

3. The combined cycle power plant system according to claim 1, wherein the first controller comprises a model free adaptive controller.

4. The combined cycle power plant system according to claim 1, wherein the first controller comprises a loop shaping controller.

5. The combined cycle power plant system according to claim 3, wherein the second controller comprises a physics model-based controller.

6. The combined cycle power plant system according to claim 1, wherein the first controller is further configured to execute the steps of:
storing the operating parameters measured for the first component and the second component so to configure a historic record of process inputs versus process outputs for the combined cycle power plant system; and
deriving relational expressions between the process inputs and the process outputs of the historic record.

7. The combined cycle power plant system according to claim 1, wherein the corrected coolant flow and the corrected inlet guide vane setting comprise modulated amounts for offsetting a detected variation during the shutdown period.

8. A combined cycle power plant system comprising:
a gas turbine operably connected to a heat recovery steam generator;

a first controller for optimizing a shutdown operation defined between an initiating shutdown command and a terminating event, the terminating event comprising a rotor of the gas turbine reaching a predetermined speed, wherein the first controller is configured to execute the steps of:
receiving the initiating shutdown command;
receiving operating parameters measured by sensors for each of a first component and a second component of the combined cycle power plant, and, based thereupon, determining a current state for each of the first and the second component;
based on the current state, deriving an optimized shutdown operating mode for transitioning the first component and the second component from the current state to a shutdown state; and a second controller configured to:
transform the optimized shutdown operating mode into commands configured to actuate mechanical control devices of the first component and the second component so that the shutdown operation proceeds according to the optimized shutdown operating mode;

wherein the heat recovery steam generator comprises a steam turbine and is configured such that exhaust from the gas turbine comprises a heat source for producing steam that drives the steam turbine;

wherein the first component comprises the gas turbine and the second component comprises the heat recovery steam generator, the steam turbine, or a combination thereof;

wherein the optimized shutdown operating mode comprises a plurality of reference parameters configured so to establish a baseline for transitioning the first component and the second component of the combined cycle power plant from the current state to the shutdown state;

wherein the reference parameters comprise:
a time range for shutdown; and
a trajectory slew rate versus time, which comprises a curve of a response time of a rotor versus time.

9. A combined cycle power plant system comprising:
a gas turbine operably connected to a heat recovery steam generator;

a first controller for optimizing a shutdown operation defined between an initiating shutdown command and a terminating event, the terminating event comprising a rotor of the gas turbine reaching a predetermined speed, wherein the first controller is configured to execute the steps of:
receiving the initiating shutdown command;
receiving operating parameters measured by sensors for each of a first component and a second component of the combined cycle power plant, and, based thereupon, determining a current state for each of the first and the second component;
based on the current state, deriving an optimized shutdown operating mode for transitioning the first component and the second component from the current state to a shutdown state; and a second controller configured to:
transform the optimized shutdown operating mode into commands configured to actuate mechanical control devices of the first component and the second component so that the shutdown operation proceeds according to the optimized shutdown operating mode;

wherein the heat recovery steam generator comprises a steam turbine and is configured such that exhaust from the gas turbine comprises a heat source for producing steam that drives the steam turbine;

wherein the first component comprises the gas turbine and the second component comprises the heat recovery steam generator, the steam turbine, or a combination thereof;

wherein the optimized shutdown operating mode comprises a plurality of reference parameters configured so to establish a baseline for transitioning the first component and the second component of the combined cycle power plant from the current state to the shutdown state;

wherein the reference parameters comprise:
 a time range for shutdown; and
 a generator reverse torque desired over the shutdown period.

* * * * *